(12) United States Patent
Takenaka et al.

(10) Patent No.: US 8,567,535 B2
(45) Date of Patent: Oct. 29, 2013

(54) INVERTED PENDULUM TYPE MOVING BODY

(75) Inventors: Toru Takenaka, Wako (JP); Kazushi Akimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 12/884,454

(22) Filed: Sep. 17, 2010

(65) Prior Publication Data
US 2011/0067936 A1 Mar. 24, 2011

(30) Foreign Application Priority Data

Sep. 18, 2009 (JP) .................. 2009-217792

(51) Int. Cl.
*B62D 57/00* (2006.01)
*B62D 61/00* (2006.01)

(52) U.S. Cl.
USPC .............................. 180/7.1; 180/21; 280/205

(58) Field of Classification Search
USPC .................. 180/21, 7.1; 280/205, 47.3, 47.32
See application file for complete search history.

(56) References Cited

U.S. PATENT DOCUMENTS

| | | | |
|---|---|---|---|
| 7,980,336 B2* | 7/2011 | Takenaka et al. ............. | 180/7.1 |
| 8,342,270 B2* | 1/2013 | Takenaka et al. ............. | 180/7.1 |
| 2010/0038960 A1 | 2/2010 | Takenaka et al. | |
| 2010/0096905 A1 | 4/2010 | Takenaka et al. | |
| 2010/0219011 A1* | 9/2010 | Shimoyama et al. ......... | 180/218 |
| 2011/0067939 A1* | 3/2011 | Takenaka ........................ | 180/21 |
| 2011/0068738 A1* | 3/2011 | Gomi et al. .................... | 320/108 |
| 2012/0277907 A1* | 11/2012 | Kim et al. ...................... | 700/245 |

FOREIGN PATENT DOCUMENTS

| | | |
|---|---|---|
| JP | 4-201793 | 7/1992 |
| JP | 07-052687 A | 2/1995 |
| JP | 11-240462 A | 9/1999 |
| JP | 3070015 B2 | 5/2000 |
| JP | 2008-056067 A | 3/2008 |
| JP | 2009-136057 A | 6/2009 |
| WO | 2008-132778 A1 | 11/2008 |
| WO | 2008-132779 A1 | 11/2008 |

OTHER PUBLICATIONS

JP Office Action, issued in corresponding JP Patent Application 2009-217792, mailing date of Jun. 4, 2013.

* cited by examiner

*Primary Examiner* — Joseph Rocca
*Assistant Examiner* — Laura Freedman
(74) *Attorney, Agent, or Firm* — Carrier Blackman & Associates, P.C.; William D. Blackman; Michael J. McCandlish

(57) ABSTRACT

An inverted pendulum type moving body comprising: a base body; a moving behavior unit movable in all directions on a floor surface; an actuator driving the moving behavior unit; and a control unit controlling the actuator so that at least a tilt angle of the base body equals a predetermined target angle, the control unit also controlling the actuator so that the moving behavior unit moves along a predetermined trajectory.

9 Claims, 25 Drawing Sheets

HOWEVER,
$Ki\_x = (1-Kr\_x) \cdot Ki\_a\_x + Kr\_x \cdot Ki\_b\_x$
$(i=1, 2, 3, 4, 5, 6)$

INVERTED PENDULUM TYPE MOVING BODY

BACKGROUND OF THE INVENTION

The present application claims priority on Japanese Patent Application No. 2009-217792, filed Sep. 18, 2009, the content of which is incorporated herein by reference.

FIELD OF THE INVENTION

The present invention relates to an inverted pendulum type moving body, which can move in all directions on a floor surface.

DESCRIPTION OF THE RELATED ART

An omnidirectional vehicle (an inverted pendulum type moving body) which can move in all directions (i.e., all directions in two dimensional space) on a floor surface has been suggested by the applicant, for example, in PCT International Publication No. WO 08/132778 (hereinafter referred to as "Patent Document 1") and in PCT International Publication No. WO 08/132779 (hereinafter referred to as "Patent Document 2"). According to the omnidirectional vehicle described in Patent Documents 1 and 2, a drive unit, which can move in all directions on a floor surface while contacting the floor surface and is spherically shaped, wheel shaped, or a crawler shaped, and an actuator device comprising an electric motor and the like driving the drive unit are assembled to a base body of a vehicle. This vehicle moves over the floor surface by driving the drive unit with an actuator device.

Further, a technology controlling a moving operation of this type of omnidirectional vehicle is suggested by the applicant, for example, in Japanese Patent No. 3070015 (hereinafter referred to as "Patent Document 3"). According to this technology, a base body of a vehicle is provided on a spherical drive unit so that the base body can freely tilt in a fore-and-aft and lateral directions. Further, by measuring the tilt angle of the base body, and by controlling the torque of an electric motor driving the drive unit so that this tilt angle is maintained to be a predetermined angle, the vehicle is moved according to tilting movement of the base body.

A desirable characteristic of such an omnidirectional vehicle is a characteristic such that the vehicle follows another omnidirectional vehicle running in front of the vehicle, by moving along the track of the omnidirectional vehicle running ahead.

However, there has never been such an omnidirectional vehicle (i.e., an inverted pendulum type moving body) which can move along a certain path in an inverted pendulum position.

Further, the following problems may occur when such an omnidirectional vehicle is actually configured:

For example, when a first omnidirectional vehicle runs along a track of another omnidirectional vehicle running ahead, and the omnidirectional vehicle running ahead turns, it is necessary that the first omnidirectional vehicle follow the omnidirectional vehicle running ahead without deviating from the track which is bent due to the turning of the omnidirectional vehicle running ahead. When the first omnidirectional vehicle does not follow the omnidirectional vehicle running ahead, the first omnidirectional vehicle may, for example, hit an obstacle that the omnidirectional vehicle running ahead has averted.

Furthermore, when a plurality of omnidirectional vehicles run by being connected in one line by a cord member, and the omnidirectional vehicle running in front makes a turn, the resultant force of the tensional force of the cord member faces the center around which the omnidirectional vehicle running in front turns. Therefore, the omnidirectional vehicle following the omnidirectional vehicle running in front may slip laterally due to the resultant force, and may deviate from the track of the omnidirectional vehicle running ahead.

SUMMARY OF THE INVENTION

The present invention is made considering the problems described above. Accordingly, an object of the present invention is to provide an inverted pendulum type moving body which can move along a predetermined track while being positioned as an inverted pendulum.

(1) Namely, an inverted pendulum type moving body according to an aspect of the present invention comprises: a base body; a moving behavior unit movable in all directions on a floor surface; an actuator driving the moving behavior unit; and a control unit. The control unit controls the actuator so that at least a tilt angle of the base body equals a predetermined target angle. The control unit also controls the actuator so that the moving behavior unit moves along a predetermined trajectory.

As a result, the control unit may control the actuator so that at least the tilt angle of the base body may be a predetermined target angle. The control unit may also control the actuator so that the drive unit may move along a predetermined track.

(2) In addition, the inverted pendulum type moving body may be configured as follows: when the moving behavior unit is deviating from the predetermined trajectory, the control unit controls the actuator so that the moving behavior unit is translated in a direction orthogonal to the predetermined trajectory, and so that the moving behavior unit is placed onto the predetermined trajectory.

As a result, when the inverted pendulum type moving body is deviating from a predetermined track, the control unit may move the drive unit in a direction perpendicular to a predetermined track.

(3) In addition, the inverted pendulum type moving body may be configured as follows: the inverted pendulum type moving body comprises a cord member attaching member attachable to a cord member; and a tensional force sensor outputting a signal according to a tensional force of the cord member attached to the cord member attaching member and a signal indicating a direction in which the tensional force is applied. Here, the control unit controls the actuator based on the signal according to the tensional force and based on the signal indicating a direction in which the tensional force is applied, so that the tensional force acting on the base body through the cord member attaching member balances out a force acting on the cord member due to a tilting of the base body.

As a result, the control unit may control the actuator so that a tensional force, acting on the base body via a cord member affixing unit, and a force, acting on the cord member due to a tilting of the base body, balances out one another.

(4) In addition, the inverted pendulum type moving body may be configured as follows: the inverted pendulum type moving body further comprises a position calculator computing a position of an another moving body based on a signal according to a tensional force and based on a direction in which the tensional force is applied. The inverted pendulum type moving body also comprises a memory unit storing a plurality of different positions computed by the position calculator as the predetermined trajectory. Here, the control unit controls the actuator so that the moving behavior unit moves along the predetermined trajectory stored in the memory unit.

As a result, the control unit may compute the position of another moving body which is moving ahead based on a tensional force of the cord member connecting an inverted pendulum type moving body and the another moving body moving ahead, as well as the direction in which the tensional force applies. In this way, the control unit may determine the track by connecting the plurality of positions which were computed.

According to the inverted pendulum type moving body described in (1) above, the control unit controls the actuator so that at least the tilt angle of the base body may be a predetermined target angle. The control unit also controls the actuator so that the drive unit moves along a predetermined track. As a result, the inverted pendulum type moving body may move along a predetermined track in a condition in which the base body is positioned as an inverted pendulum.

According to the inverted pendulum type moving body described in (2) above, when the inverted pendulum type moving body is deviating from a predetermined track, the control unit moves the drive unit in a direction perpendicular to a predetermined track. As a result, the inverted pendulum type moving body may return to the predetermined track by moving a minimum amount of distance without spinning the base body, and can move along the track.

According to the inverted pendulum type moving body described in (3) above, the control unit controls the actuator so that a tensional force, acting on the base body via a cord member affixing unit, and a force, acting on the cord member due to a tilting of the base body, balances out one another. As a result, even if the track is curved due to the turning of the another moving body moving ahead, the inverted pendulum type moving body may move without deviating from the curved track.

According to the inverted pendulum type moving body described in (4) above, the control unit computes the position of another moving body which is moving ahead based on a tensional force of the cord member connecting an inverted pendulum type moving body and the another moving body moving ahead, as well as the direction in which the tensional force applies. Thus, the control unit determines the track by connecting the plurality of positions which were computed. Hence, the inverted pendulum type moving body may move along a track determined by connecting the plurality of computed positions in chronological order.

BRIEF DESCRIPTION OF THE DRAWINGS

FIG. 21 is a diagram showing a relative position of an omnidirectional vehicle 1b, an omnidirectional vehicle 1a running ahead of the omnidirectional vehicle 1b, and a trajectory 400 of the omnidirectional vehicle 1a.

FIG. 22 is a diagram showing a relative position of a vehicle 1b, which ran at a center-of-gravity point velocity of Vb between time ΔT, and a vehicle 1a.

DETAILED DESCRIPTION OF THE PREFERRED EMBODIMENTS

Hereunder, a first embodiment of the present invention is described with reference to the diagrams. First, a configuration of an omnidirectional vehicle according to the present embodiment is described with reference to FIGS. 1-6.

Figure 1:
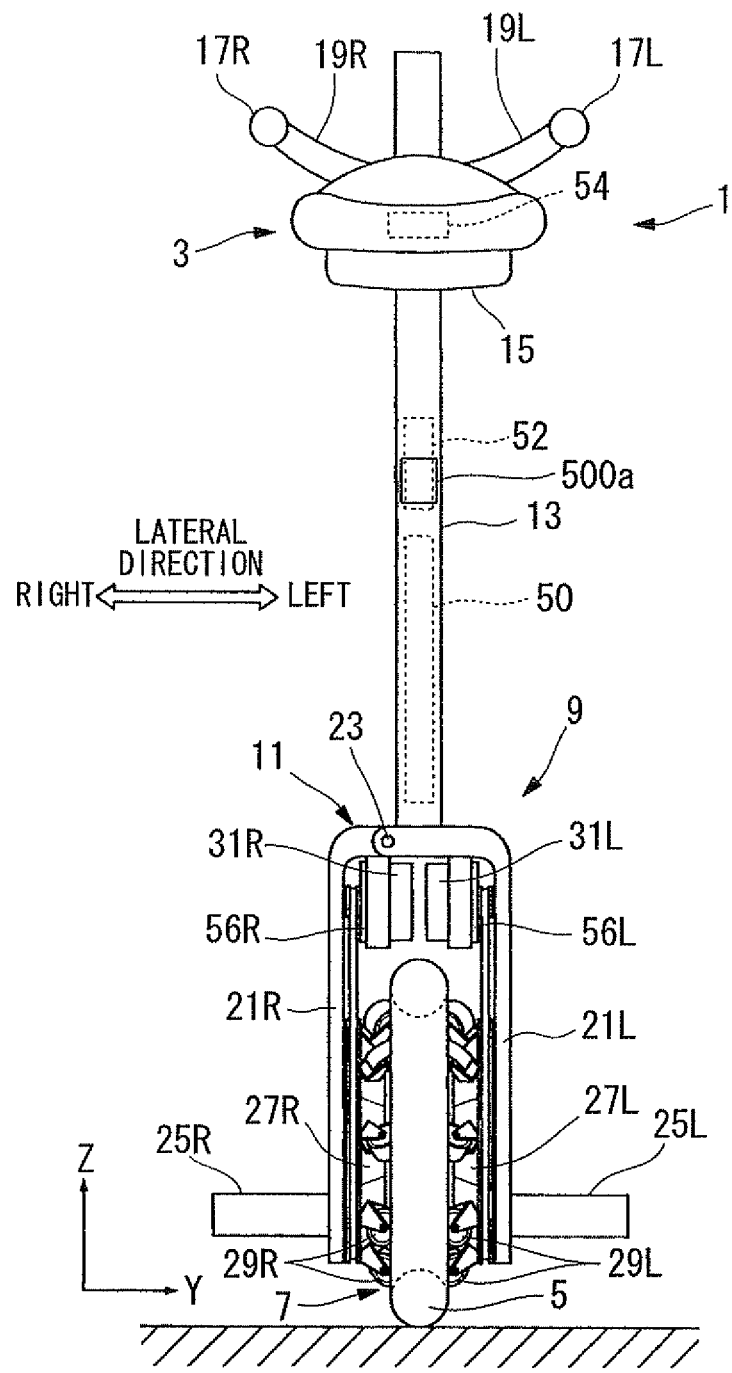
FIG. 1 is a frontal view of an omnidirectional vehicle according to an embodiment of the present invention.
Figure 2:
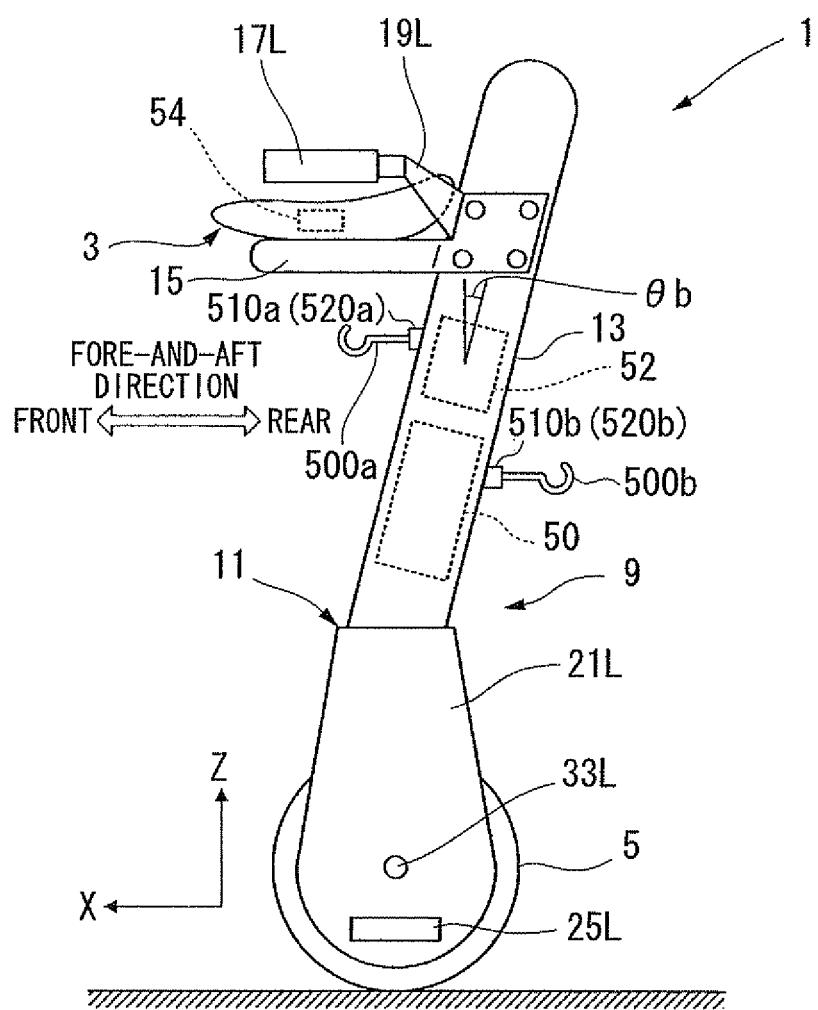
FIG. 2 is a side view of an omnidirectional vehicle according to an embodiment of the present invention.

As shown in FIGS. 1 and 2, the omnidirectional vehicle 1 (hereinafter may also be referred to as an inverted pendulum type moving body) according to the present embodiment comprises a payload supporting part 3 of an occupant, who may also be a driver, a drive unit 5, which can move in all directions (i.e., all directions in two dimensional space including the fore-and-aft direction and a lateral direction) on a floor surface while contacting the floor surface, an actuator 7 which supplies to the drive unit 5, a power for driving the drive unit 5, a base body 9 assembled with the payload supporting part 3, the drive unit 5, and the actuator 7, a hook 500*a*, a hook 500*b*, a hook base body 510*a*, a hook base body 510*b*, a tensional force sensor 520*a*, and a tensional force sensor 520*b*.

Here, in the description regarding the present embodiment, the "fore-and-aft direction" and the "lateral direction" respectively refer to a direction which is equal to or approximately matches the fore-and-aft direction and the lateral direction of an upper body of an occupant riding in a standard posture in the payload supporting part 3. Incidentally, a "standard posture" refers to a posture which can be estimated based on a configuration of the payload supporting part 3. This "standard posture" is such that the axis of the upper body of the occupant is aligned roughly in an upper-lower direction. Further, the upper body of the occupant is not twisted and the like.

Here, in FIG. 1, the "fore-and-aft direction" and the "lateral direction" respectively refer to a direction perpendicular to the paper and a lateral direction of the paper. In FIG. 2, the "fore-and-aft direction" and the "lateral direction" respectively refer to a lateral direction of the paper and a direction perpendicular to the paper. Further in the description regarding the present embodiment, a suffix "R" or a suffix "L" are appended to a reference numeral. The suffix "R" is used to refer to a component or a concept corresponding to a right side of the vehicle 1. The suffix "L" is used to refer to a component or a concept corresponding to a left side of the vehicle 1.

The base body 9 comprises a lower part frame 11, which is assembled to the drive unit 5 and the actuating unit 7, and a supporting frame 13, which is provided to extend upwards from an upper end of the lower part frame 11.

A seat frame 15 is fixed to an upper part of the supporting frame 13. The seat frame 15 protrudes towards the front from the supporting frame 13. In addition, a seat 3 is provided on the seat frame 15. A occupant sits on the seat 3. According to the present embodiment, this seat 3 is the riding unit of the occupant. Therefore, the omnidirectional vehicle 1 (hereinafter may also be referred simply as a "vehicle 1") according to the present embodiment moves over a floor surface while the occupant is seated on the seat 3.

In addition, a grip 17R and a grip 17L are placed on the left and right portions of the seat 3. The occupant seated on the seat 3 holds on to the grips 17R, or 17L, if necessary. Each of these grips 17R, 17L fixed respectively on a tip part of a bracket 19R, and a bracket 19L, which extend from the supporting frame 13 (or the seat frame 15).

The lower part frame 11 comprises a pair of cover members 21R and 21L. Each of the cover members 21R and 21L are placed to face one another in a two-pronged form while being separated in a lateral direction. The upper part of these cover members 21R and 21L (i.e., a branching portion of the two-pronged form) are connected via a hinge shaft 23 comprising a shaft center in the fore-and-aft direction. One of the cover members 21R and 21L can move around the hinge shaft 23 relative to the other one of the cover members. In this case, the cover members 21R and 21L are biased towards a direction by a spring (not diagramed) in a direction in which that the lower end portion of the cover members 21R and 21L (i.e., a tip portion of the two-pronged form) narrows towards one another.

Further, a step 25R at an external surface portion of each of the cover members 21R and 21L, a step 25R, on which the right foot of the occupant seated on the seat 3 is placed, and a step 25L, on which the left foot of the occupant is placed, are provided so as to protrude respectively towards the right and the left directions.

In addition, a hook base body 510*a* is provided at a frontal direction of the supporting frame 13. Further, a hook 500*a* is provided on the hook base body 510*a*. Meanwhile, a hook base body 510*b* is provided at a rear direction of the supporting frame 13. Further, a hook 500*b* is provided on the hook base body 510*b*. The hook base body 510*a* and 510*b* may be a hinge.

A cord member may be attached to the hook 500*a* and the hook 500*b*. Hereinafter, the hook 500*a* and the hook 500*b* are collectively referred to as the hook 500. Incidentally, the cord member attached to the hook 500 may be elastic.

A tensional force sensor 520*a* is provided on the hook base body 510*a*. The tensional force sensor 520*a* outputs a signal corresponding to a tensional force of a cord member attached to the hook 500*a* and a signal indicating a direction in which the tensional force applies. In addition, a tensional force sensor 520*b* is provided on the hook base body 510*b*. The tensional force sensor 520*b* outputs a signal corresponding to a tensional force of a cord member attached to the hook 500*b* and a signal indicating a direction in which the tensional force applies. Incidentally, the tensional force sensor 520*a*, 520*b* may be a single axial sensor detecting an absolute value of the tensional force. In addition, a contact sensor is provided on the hook base body 510*a* and 510*b*, which detects a contact. Thus, a signal indicating the direction in which the tensional force is applied may be outputted from the contact sensor. Moreover, the tensional force sensor 520*a*, 520*b* may be a hexaxial force sensor and the like. Further, the tensional force sensor 520*a*, 520*b* may also be capable of detecting other loads at the same time as detecting a tensional force of a cord member.

The drive unit 5 and the actuator 7 are placed between the cover members 21R, 21L of the lower part frame 11. A configuration of the drive unit 5 and the actuator 7 are described with reference to FIGS. 3-6.

According to the present embodiment, the drive unit 5 is a wheel assembly being a ring-shaped component comprising a rubber elastic material. The cross section of the drive unit 5 is approximately a circle. This drive unit 5 (hereinafter may also be referred to as a wheel assembly 5) can rotate around a center C1 of the circular cross section as indicated in arrow Y1 in FIGS. 5 and 6 due to the elastic deformation of the wheel assembly 5. In particular, the wheel assembly 5 rotates around a circumferential line which passes through the center C1 of the circular cross section and becomes concentric with the shaft core of the wheel assembly 5.

This wheel assembly 5 is placed between the cover members 21R and 21L while the shaft center C2 (a shaft center C perpendicular to the diameter direction of the wheel assembly 5 in general) faces the lateral direction. In addition, the wheel assembly 5 contacts the floor surface with the lower end part of the outer peripheral surface of the wheel assembly 5.

Figure 5:
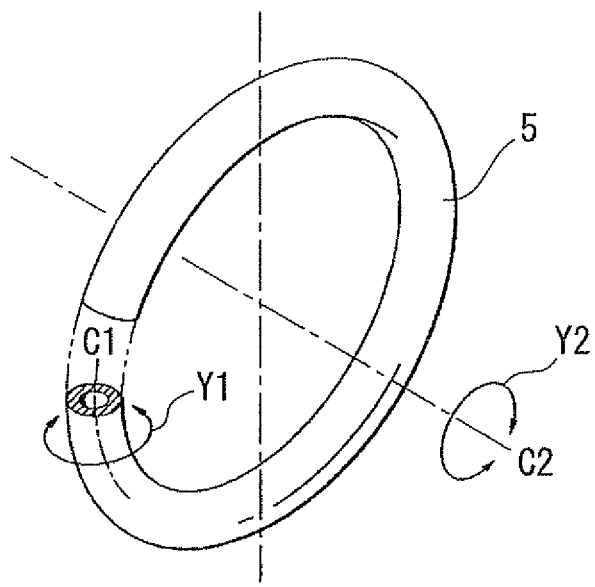
FIG. 5 is a perspective view of a drive unit (wheel assembly) of an omnidirectional vehicle according to an embodiment of the present invention.

Further, the wheel assembly 5 may perform a movement rotating around the shaft center C2 of the wheel assembly 5 as indicated in arrow Y2 in FIG. 5 (a movement rolling around the floor surface), and a movement rotating around the shaft center C1 of the cross section of the wheel assembly 5. As a result, the wheel assembly 5 may move in all directions on the floor surface by a combination of these rotating movements.

The actuator 7 comprises a free roller 29R and a rotating part 27R, provided between the wheel assembly 5 and the right cover member 21R, a free roller 29L and a rotating part 27L, provided between the wheel assembly 5 and the left cover member 21L, an electric motor 31R placed as an actuator above the rotating part 27R and the free roller 29R, and an electric motor 31L placed as an actuator above the rotating part 27L and the free roller 29L.

A housing of each of the electric motors 31R and 31L is attached respectively to the cover members 21R and 21L.

Although not diagrammed, the power source (capacitor) of the electric motors 31R, 31L is provided on appropriate places on the base body 9 such as on the supporting frame 13 and the like.

The rotation member 27R is rotatably supported by the cover member 21R via the supporting axis 33R comprising a shaft center in the lateral direction. Similarly, the rotation member 27L is rotatably supported by the cover member 21L via the supporting axis 33L comprising a shaft center in the lateral direction. In this case, rotational shaft center of the rotation member 27R (the shaft center of the supporting axis 33R) and a rotational shaft center of the rotation member 27L (the shaft center of the supporting axis 33L) are coaxial.

Figure 3:
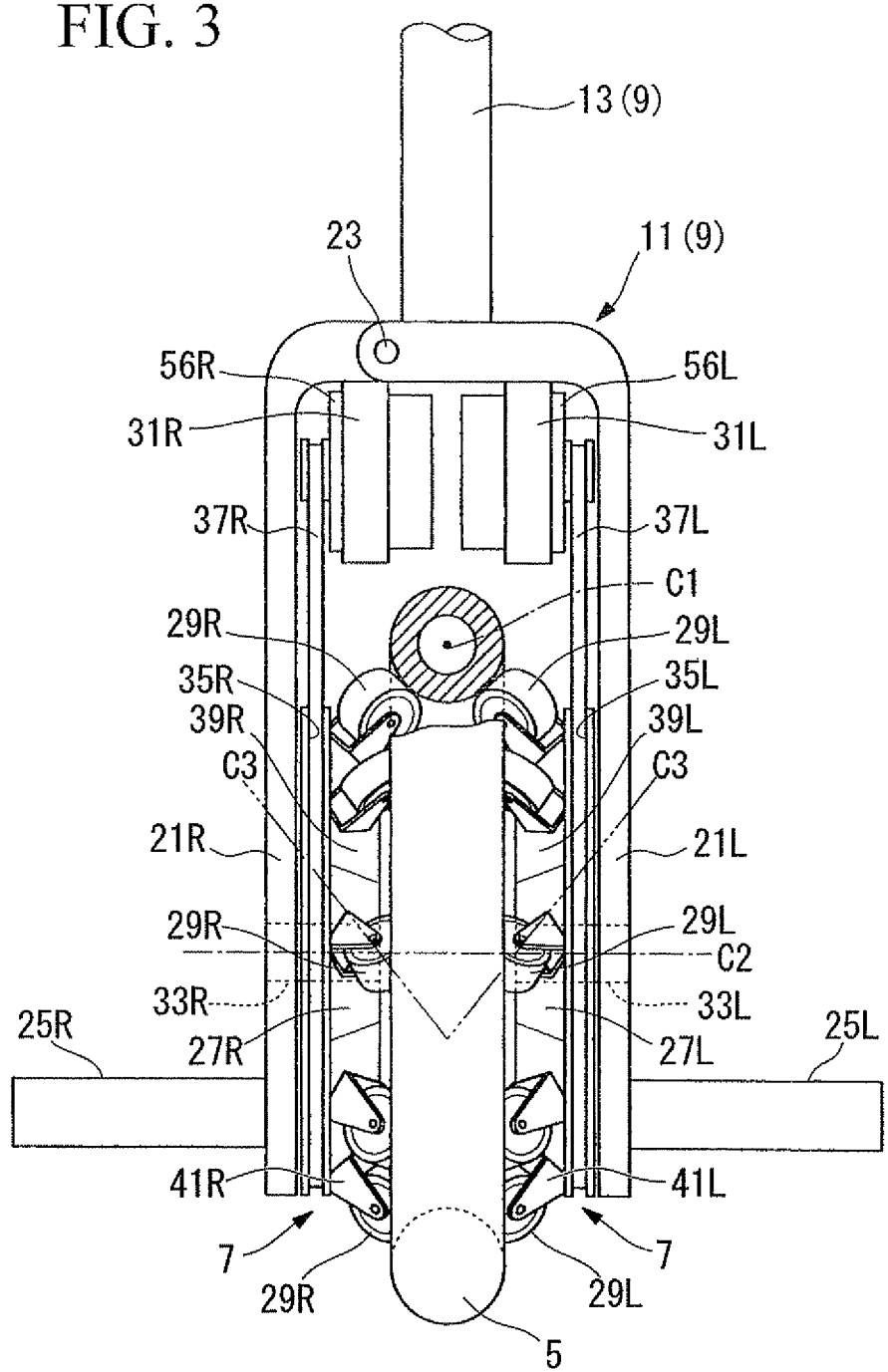
FIG. 3 is an expanded view of a lower portion of an omnidirectional vehicle according to an embodiment of the present invention.
Figure 4:
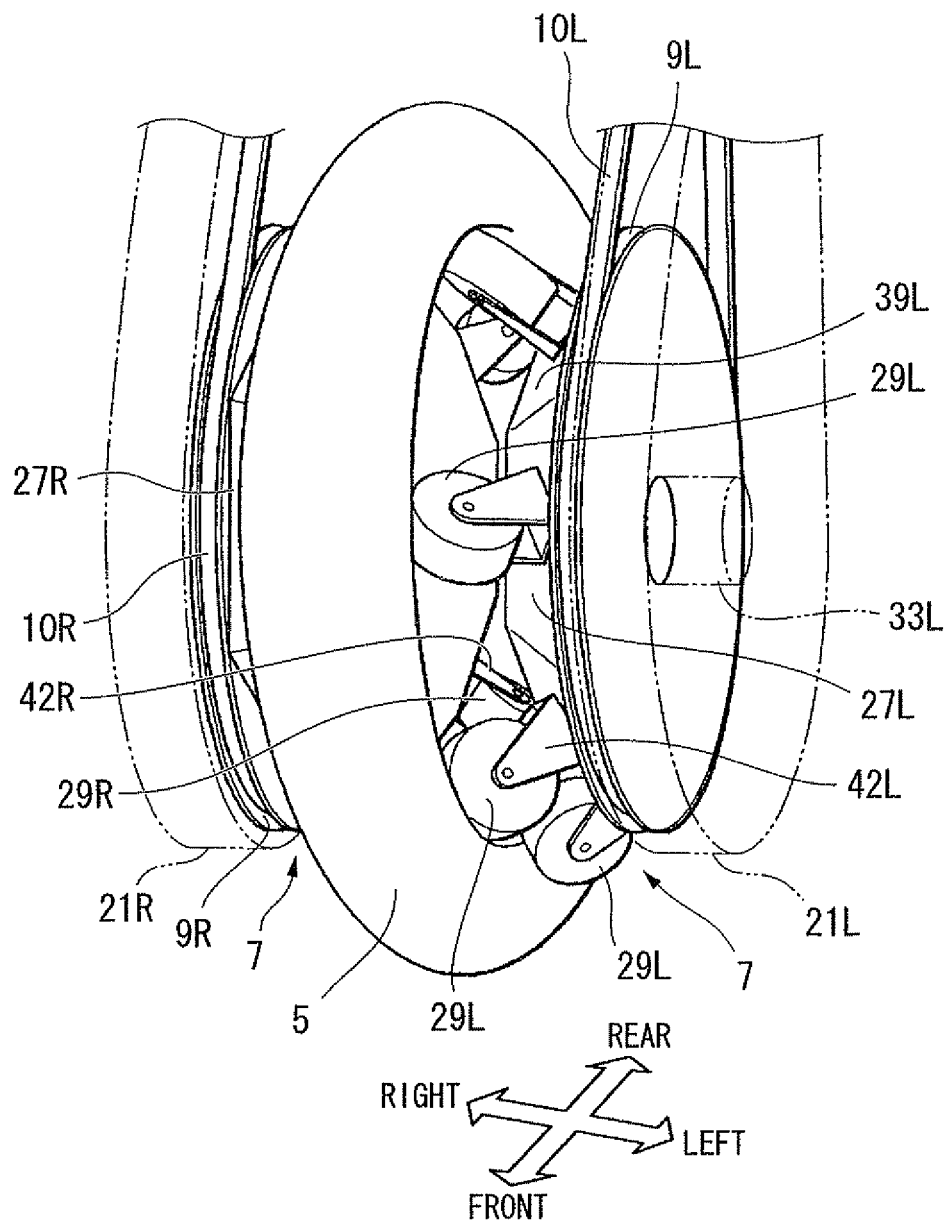
FIG. 4 is a perspective view of a lower portion of an omnidirectional vehicle according to an embodiment of the present invention.

The rotation members 27R, 27L are connected respectively to the output axis of the electric motors 31R, 31L via a power transmission mechanism comprising a decelerating mechanism. The rotation members 27R, 27L are rotated by a power (torque) transmitted by each of the electric motors 31R, 31L. Examples of the power transmission mechanism includes a pulley-type/belt-type device. In other words, as shown in FIG. 3, the rotation member 27R is connected to the output axis of the electric motor 31R via the pulley 35R and the belt 37R. Similarly, the rotation member 27L is connected to the output axis of the electric motor 31L via the pulley 35L and the belt 37L.

Further, the power transmission mechanism may, for example, be a device comprising a sprocket and a linking chain, or, a device comprising a plurality of gears. Further, for instance, the electric motors 31R and 31L may be placed so as to face the rotation members 27R and 27L respectively, so that the output axis of each of the electric motors 31R and 31L is coaxial with the rotation members 27R and 27L respectively. In addition, the output axis of each of the electric motors 31R, 31L may be connected to the rotation members 27R, 27L respectively, via a decelerating device such as a planetary gear drive and the like.

Each of the rotation members 27R and 27L are configured to be the same shape as a circular cone, the diameter of which decreases towards the side of the wheel assembly 5. The outer peripheral surface of the rotation members 27R and 27L are the tapered outer peripheral surfaces 39R and 39L respectively.

A plurality of free rollers 29R are aligned around the tapered outer peripheral surface 39R of the rotation member 27R. Here, the plurality of free rollers 29R are aligned at equal intervals along the circumference of a circle which is coaxial with the rotation member 27R. Further, these free rollers 29R are attached respectively to the tapered outer peripheral surface 39R via the bracket 41R. Moreover, the free rollers 29R are rotatably supported by the bracket 41R.

Similarly, a plurality of free rollers 29L are aligned around the tapered outer peripheral surface 39L of the rotation member 27L. Here, the plurality of free rollers 29L are aligned at equal intervals along the circumference of a circle which is coaxial with the rotation member 27L. Further, these free rollers 29L are attached respectively to the tapered outer peripheral surface 39L via the bracket 41L. Moreover, the free rollers 29L are rotatably supported by the bracket 41L. The number of free rollers 29L is equal to the number of free rollers 29R.

The wheel assembly 5 is placed coaxial with the rotation member 27R and 27L so as to be sandwiched between the free roller 29R at the rotation member 27R side and the free roller 29L at the rotation member 27L side.

Figure 6:
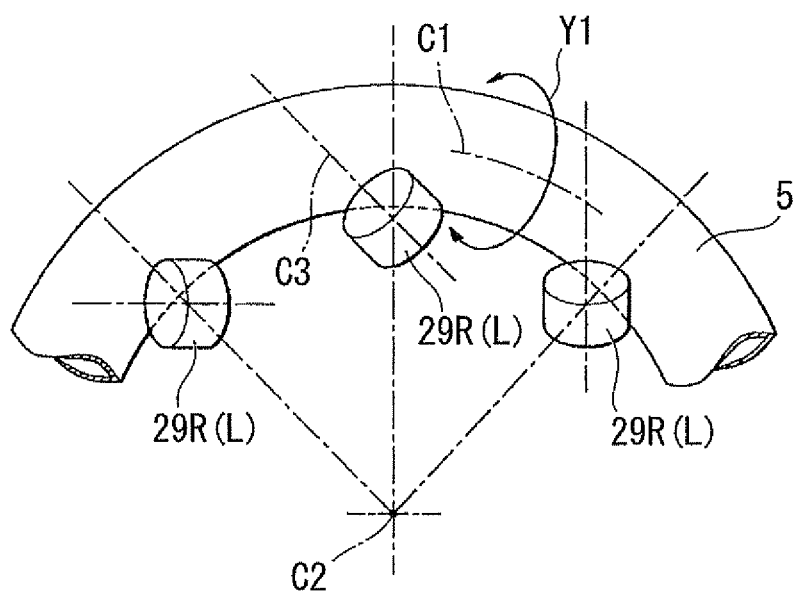
FIG. 6 is a view showing a relative position of a drive unit (wheel assembly) of an omnidirectional vehicle and a free roller according to an embodiment of the present invention.

In this case, as shown in FIGS. 1 and 6, the shaft center C3 of each of the free rollers 29R and 29L is tilted with respect to the shaft center C2 of the wheel assembly 5. At the same time, the shaft center C3 is placed so as to be tilted with respect to the diameter direction of the wheel assembly 5. Here, the "diameter direction" refers to a radial direction connecting the shaft center C2 and each of the free rollers 29R, 29L, viewing the wheel assembly 5 from a direction of the shaft center C2 of the wheel assembly 5. Further, in this position, the outer peripheral surface of each of the free rollers 29R, 29L are pressed against the inner peripheral surface of the wheel assembly 5 in a diagonal direction.

In more general terms, the free roller 29R at the right side is pressed against the inner peripheral surface of the wheel assembly 5 so that, when the rotation member 27R is driven to rotate around the shaft center C2, a frictional force element in a peripheral direction of the shaft center C2, and a frictional force element in a peripheral direction of the center C1 of the cross section of the wheel assembly 5, may be applied to the wheel assembly 5 at a surface at which the free roller 29R contacts the wheel assembly 5. Here, the frictional force element in the peripheral direction of the shaft center C2 refers to a frictional force element in a direction of a tangential line of an inner circumference of the wheel assembly 5. In addition, the frictional force element in a peripheral direction of the center C1 refers to a frictional force element in a direction of a tangential line of a circular cross section of the wheel assembly 5. The free roller 29L at the left side is configured in a similar manner.

As described above, the cover members 21R and 21L are biased towards a direction by a spring (not diagramed) in a direction in which that the lower end portion of the cover members 21R and 21L (i.e., a tip portion of the two-pronged form) narrows towards one another. Due to this biasing force, the wheel assembly 5 is held between the free roller 29R at the right side and the free roller 29L at the left side. At the same time, the condition of the free rollers 29R and 29L being pressed against the wheel assembly 5 is maintained. In particular, the condition in which frictional force may be applied between each of the free rollers 29R, 29L and the wheel assembly 5.

According to the vehicle 1 configured as described above, when the rotation members 27R, 27L are driven to rotate in the same direction at a same velocity by the electric motors 31R and 31L, the wheel assembly 5 rotates around the shaft center C2 in the same direction as the rotation member 27R, 27L. Therefore, the wheel assembly 5 rolls in a fore-and-aft direction on the floor surface. Thus, the entire vehicle 1 moves in a fore-and-aft direction. Incidentally, in this case, the wheel assembly 5 does not rotate around the center C1 of the lateral cross section.

Further, when the rotation members 27R, 27L are driven to rotate in directions opposite to one another and at a same speed, the wheel assembly 5 rotates around the center C1 of the lateral cross section. As a result, the wheel assembly 5 moves in a direction of the shaft center C2 (i.e., the lateral direction). Further, the entire vehicle 1 moves in the lateral direction. In this case, the wheel assembly 5 does not rotate around the shaft center C2.

Further, when the rotation members 27R, 27L are driven in different velocities in the same direction or in opposite directions, the vehicle wheel 5 rotates around the shaft center C2, and, at the same time, rotates round the center C1 of the lateral cross section of the vehicle wheel 5.

At this time, due to the combination of these rotational movements, the wheel assembly 5 moves in a direction tilted with respect to the fore-and-aft direction and a lateral direction. Moreover, the entire vehicle 1 moves in the same direction as the wheel assembly 5. The direction in which the wheel assembly 5 moves in this case varies depending on the difference between a rotational velocity of the rotation members 27R, 27L. Here, the rotational velocity refers to a rotational velocity vector such that the polarity is defined based on the rotational direction.

Since the moving operation of the wheel assembly 5 is conducted as described above, the velocity with which the vehicle 1 moves and the direction in which the vehicle 1 moves may be controlled by controlling the rotational velocity of each of the electrically operated motors 31R and 31L, and by controlling the rotational velocity of the rotation members 27R and 27L.

Next, a configuration for the moving operation of the vehicle 1 according to the present embodiment is described. In the following description, an xyz coordinate system is envisioned comprising the x axis, referring to the horizontal axis in the fore-and-aft direction, the y axis, referring to the horizontal axis in the lateral direction, and the z axis, referring to the orthogonal axis, as shown in FIGS. 1 and 2. The fore-and-aft direction may also be referred to as the x axis direction. The lateral direction may also be referred to as the y axis direction.

First, a moving operation of the vehicle 1 is described below in general terms. According to the present embodiment, when an occupant who sits on the seat 3 tilts his or her upper body, the base body 9 and the seat 3 tilts towards the direction that the occupant's upper body was tilted. In particular, the tilting of the occupant's upper body refers to a displacement of the position of the center-of-gravity point of a combination of the occupant and the vehicle 1 projected on a horizontal plane. Further, at this time, the moving operation of the wheel assembly 5 is controlled so that the vehicle 1 moves in a direction in which the base body 9 is tilted. For example, when the occupant tilts his or her upper body forward, and also tilts the base body 9 and the seat 3 forward, the moving operation of the wheel assembly 5 is controlled so that the vehicle 1 moves forward.

In other words, according to the present embodiment, the motion of the occupant moving his or her upper body and tilting the base body 9 along with the seat 3 is considered to be a basic maneuvering operation with respect to the vehicle 1. This motion is referred to as an operation request of the vehicle 1. According to this maneuvering operation, the moving operation of the wheel assembly 5 is controlled via the actuator 7.

Here, according to the vehicle 1 based on the present embodiment, a surface at which the wheel assembly 5 contacts the floor surface is a surface at which the entire vehicle 1 contacts the floor surface. This surface at which the wheel assembly 5 contacts the floor surface is a single local region and has a small area (i.e., size) compared to a region obtained by projecting the vehicle 1 and the occupant riding the vehicle 1 in their entirety to the floor surface. A floor reaction force applies only on this single local region. Therefore, in order to prevent the base body 9 from tilting and falling down, it is necessary to move the wheel assembly 5 so that the center-of-gravity point of the occupant and the vehicle 1 in their entirety is positioned approximately right above the surface at which the wheel assembly 5 touches the ground.

Therefore, according to the present embodiment, a target position is referred to as a position of the base body 9 under a condition in which the center-of-gravity point of the occupant and the vehicle 1 in their entirety is positioned approximately right above the center point of the wheel assembly 5 (i.e. the center point along the shaft center C2). In more accurate terms, the center-of-gravity point of the occupant and the vehicle 1 in their entirety is positioned approximately right above the surface at which the wheel assembly 5 contacts the ground. The moving operation of the wheel assembly 5 is controlled so that the actual position of the base body 9 converges with the target position.

Further, when the vehicle 1 is started to move forward and the like, and when the vehicle 1 receives a propulsion force due to the actuator 7 along with an additional external force such as a propulsion force provided by the occupant kicking the floor with his or her foot when necessary in order to increase the velocity at which the vehicle 1 moves, the moving operation of the wheel assembly 5 is controlled so that the velocity of the vehicle 1 increases along with the application of the propulsion force and an additional external force. In more precise terms, the moving operation of the wheel assembly is controlled so that the velocity of the center-of-gravity point of the occupant and the vehicle 1 in their entirety increases. Here, the additional external force provided by the occupant is a propulsion force due to the frictional force created by the back side of the occupant's foot and the floor.

Incidentally, in a condition in which the additional external force is not provided as a propulsion force, the moving operation of the wheel assembly 5 is controlled so that the velocity of the vehicle 1 is once retained at a certain velocity, the velocity of the vehicle 1 then decreases, and the vehicle 1 comes to a halt.

Further, in a condition in which the occupant is not riding the vehicle 1, a target position is referred to as a position of the base body 9 such that the center-of-gravity point of the vehicle 1 in its singular form is positioned approximately right above the center point of the wheel assembly 5 (i.e., the center point of the shaft center C2). In more precise terms, this center-of-gravity point is positioned approximately right above the surface at which the wheel assembly 5 contacts the floor. The moving operation of the wheel assembly 5 is controlled so that the actual posture of the base body 9 converges to the target position, and that the vehicle 1 may stand on its own without the base body 9 tilting.

According to the present embodiment, in order to control the movement of the vehicle 1 as described above, the vehicle 1 comprises a control unit 50, a tilting sensor 52, a load sensor 54, and a rotary encoder 56R, 56L at appropriate places, as indicated in FIGS. 1 and 2. The control unit 50 comprises an electric circuit unit comprising, for example, a micro computer and a drive circuit unit of the electric motor 31R, 31L. The tilting sensor 52 measures a tilt angle θb with respect to an orthogonal direction (gravitational direction) of a predetermined component of the base body 9. The tilting sensor 52 also measures a rate of change of the tilt angle (=dθb/dt). The load sensor 54 detects whether or not an occupant is boarding the vehicle 1. The rotary encoder 56R, 56L acts as an angle sensor to detect a rotational angle and a rotational angular velocity of an output axis of each of the electric motors 31R and 31L.

In this case, the control unit 50 and the tilting sensor 52 are, for example, assembled to the supporting frame 13 in a condition such that the control unit 50 and the tilting sensor 52 are contained inside the supporting frame 13 of the base body 9. In addition, the load sensor 54 is embedded in the seat 3. Further, each of the rotary encoders 56R and 56L are integrated respectively with the electrically motors 31R and 31L. In addition, each of the rotary encoders 56R and 56L may be integrated respectively with the rotating parts 27R and 27L.

In more detail, the tilting sensor 52 comprises a rate sensor (angular velocity sensor) such as an acceleration sensor and a gyro sensor and the like. The tilting sensor 52 outputs the detection signal of these sensors to the control unit 50. In addition, the control unit 50 carries out a predetermined a predetermined measurement and computation procedure based on an output by the acceleration sensor and the rate sensor of the tilting sensor 52. The predetermined measurement and computation procedure may be a known computation. In this way, the control unit 50 computes a measured value of a tilt angle θb of the component equipped with the tilting sensor 52 with respect to an orthogonal direction and a measured value of a tilting angular velocity θbwdot, which is a rate of change, i.e., a differential of the tilt angle θb. According to the present embodiment, the component equipped with the tilting sensor 52 is the supporting frame 13.

In this case, the measured tilt angle θb (hereinafter, may be referred to as a base body tilt angle θb) each comprises an element θb_x in the y axis rotational direction (the pitch direction) and an element θb_y in the x axis rotational direction (the rolling direction). Similarly, the measured tilting angular velocity θbdot (hereinafter, may be referred to as a base body tilting angular velocity θbdot) also comprises an element θbdot_x (=dθb_x/dt) in the y axis rotational direction (the pitch direction) and an element θbdot_y dθb_y/dt) in the x axis rotational direction (the rolling direction).

Further, in the description of the present embodiment, a variable representing a quantity of a movement condition comprising an element in the x axis direction and in the y axis direction or a direction rotating around each of the axes such as the base body tilt angle θb is used. In addition, a variable representing a coefficient and the like relating to the quantity of a movement condition is used. When each element of these variables are expressed separately, a subscript "_x" or "_y" are appended to the reference numeral indicating these variables.

In this case, for variables concerning a translational movement, such as a translational velocity and the like, a subscript "_x" is appended to an element in the x axis direction, while a subscript "_y" is appended to an element in the y axis direction.

Meanwhile, for variables concerning a rotational movement such as an angle, a rotational velocity, i.e., an angular velocity, and an angular acceleration, a subscript "x" is appended to an element in the y axis direction, while a subscript "_y" is appended to an element in the x axis direction, as a matter of convenience, in order to make the subscripts consistent with the subscripts of the variables concerning a translational movement.

Furthermore, when a variable is represented as a pair of elements in the x axis direction and in the y axis direction, or as a pair of elements rotating around the y axis and around the x axis, a subscript "_xy" is appended to the reference numeral indicating these variables. For example, when the base body tilt angle θb is represented as a pair of an element θb_x around the y axis and an element θb_y around the x axis, the subscript "_xy" is used as follows: "base body tilt angle θb_xy."

The load sensor 54 is embedded in the seat 3 so that, when the occupant sits on the seat 3, the load sensor 54 receives a load due to the weight of the occupant. Thus, the load sensor 54 outputs to the control unit 50, a detection signal according to the load. Further, the control unit 50 determines whether or not the occupant is riding the vehicle 1 based on a measured value of a load represented by an output of this load sensor 54.

By the way, instead of the load sensor 54, a switch type sensor may be used such that the sensor is turned on when the occupant sits on the seat 3.

The rotary encoder 56R generates a pulse signal every time the output axis of the electric motor 31R rotates by a predetermined angle. Thus, the rotary encoder 56R outputs the pulse signal to the control unit 50. Further, the control unit 50 measures the rotational angle of the output axis of the electric motor 53R based on the pulse signal. Further, the control unit 50 measures the temporal rate of change, i.e., the differential of the measured value of the rotational angle as a rotational angular velocity of the electric motor 53R. The rotary encoder 56L at the side of the electric motor 31L is configured in a similar manner as well.

The control unit 50 determines a velocity command, which is a target value of the rotational angular velocity of each of the electric motors 31R and 31L by executing a predetermined computation procedure using the above measured values. The control unit 50 performs a feedback control of the rotational angular velocity of each of the electric motors 31R and 31L according to the velocity command.

Further, the relation between the rotational velocity of the output axis of the electric motor 31R and the rotational velocity of the rotating part 27R is a proportional relation according to a certain value of a deceleration ratio between the output axis and the rotation member 27R.

In the description of the present embodiment, the rotational angular velocity of the electric motor 31R refers to a rotational angular velocity of the rotation member 27R. Similarly, the rotational angular velocity of the electric motor 31L refers to a rotational angular velocity of the rotation member 27L.

Hereinafter, a controlling process of the control unit 50 is further described in detail.

Figure 7:
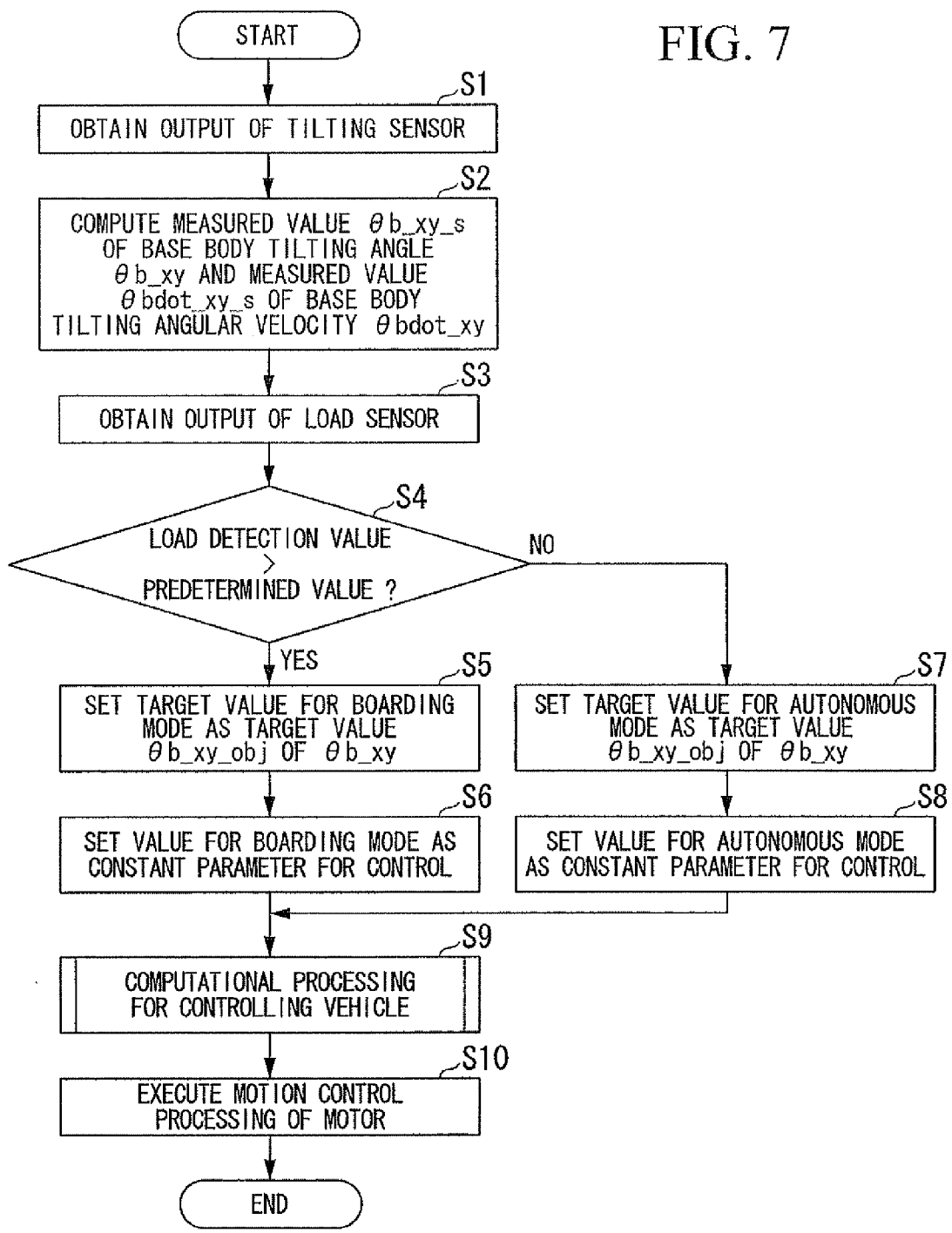
FIG. 7 is a flowchart showing a processing of a control unit of an omnidirectional vehicle according to an embodiment of the present invention.

The control unit 50 executes a procedure indicated in the flowchart shown in FIG. 7, at a predetermined control processing period. Here, the procedure indicated in the flowchart is referred to as a main routine processing.

First, in step S1, the control unit 50 obtains an output from the tilting sensor 52.

Next, the procedure moves on to step S2. In step S2, the control unit 50 computes a measured value θb_xy_s of the base body tilt angle θb and the measured value θbdot_xy_s of the base body tilting angular velocity θbdot based on an output obtained from the tilting sensor 52.

In the following description, when a measured value (a measured value or an estimated value) of an actual value of a variable representing a quantity of a condition such as the measured value θb_xy_s is referenced, a subscript "_s" is appended to the reference numeral of the variable.

In step S3, after the control unit 50 obtains an output of the load sensor 54, the control unit 50 performs a determination processing of the step S4. In this determination processing, the control unit 50 determines whether or not the occupant is riding the vehicle 1, i.e., whether or not the occupant is seated on the seat 3, based on whether or not a load observed value obtained by an output of the load sensor 54 is greater than a predetermined value.

Further, when the determination result of step S4 is in the positive, the control unit 50 performs a processing in step S5 in which the target value θb_xy_obj of the base body tilt angle θb is set. In addition, when the determination result of step S4 is in the positive, the control unit 50 performs a processing in step S6 in which a value of a constant parameter for controlling the movement of the vehicle 1 is set. An example of the constant parameter includes a basic value for each type of gain and the like.

In step S5, the control unit 50 sets a predetermined target value for a boarding mode as a target value θb_xy_obj of the base body tilt angle θb.

Here, a "boarding mode" refers to an operating mode of the vehicle 1 in a condition in which the occupant is riding the vehicle 1. The target value θb_xy_obj for this boarding mode is predetermined so as to be equal to or approximately equal to the measured value θb_xy_s of the base body tilt angle θb measured based on an output by the tilting sensor 52 in a position of the base body 9 in which a center-of-gravity point of the vehicle 1 and an occupant seated on the seat 3 in their entirety is located approximately right above the surface at which the wheel assembly 5 contacts the floor surface. Hereinafter, the center-of-gravity point of the vehicle 1 and an occupant seated on the seat 3 in their entirety is referred to as a "vehicle/occupant integrated center-of-gravity point."

Further, in step S6, the control unit 50 sets a value of a constant parameter for controlling the motion of the vehicle 1 as a predetermined value for a boarding mode. Incidentally, the constant parameter includes hx, hy, $Ki\_a\_x$, $Ki\_b\_x$, $Ki\_a\_y$, $Ki\_b\_y$ (i=1, 2, 3, 4, 5, 6) and the like.

Meanwhile, when the determination result of step S4 is in the negative, the control unit 50 performs a processing in S7 in which the target value $\theta b\_xy\_obj$ of the base body tilt angle $\theta b\_xy$ is set. In addition, when the determination result of step S4 is in the negative, the control unit 50 performs a processing in S8 in which the value of the constant parameter for controlling the movement of the vehicle 1 is set.

In step S7, the control unit 50 sets a predetermined target value for an autonomous mode as a target value $\theta b\_xy\_obj$ of the tilt angle $\theta b$.

Here, an "autonomous mode" refers to a moving mode of the vehicle 1 in a condition in which the occupant is not riding the vehicle 1. The target value $\theta b\_xy\_obj$ for the autonomous mode is predetermined so as to be equal to or approximately equal to the measured value $\theta b\_xy\_s$ of the base body tilt angle $\theta b$ measured based on an output by the tilting sensor 52 in a position of the base body 9 in which a center-of-gravity point of the vehicle 1 in its single form is located approximately right above the surface at which the wheel assembly 5 contacts the floor surface. Hereinafter, a center-of-gravity point of the vehicle 1 in its single form is referred to as a "singular vehicle body center-of-gravity point." In general, the target value $\theta b\_xy\_obj$ for the autonomous mode is different from the target value $\theta b\_xy\_obj$ for the boarding mode.

Further, in step S8, the control unit 50 sets a predetermined value for an autonomous mode as a value of a constant parameter for controlling the movement of the vehicle 1. The value of the constant parameter for the autonomous mode is different from the value of the constant parameter for the boarding mode.

The value of the constant parameter is differed in the boarding mode and in the autonomous mode, because the characteristics of how the movement of the vehicle I responds to a control input are different in the boarding mode and in the autonomous mode, since the height of the center-of-gravity point and the total mass and the like are different in the boarding mode and in the autonomous mode.

According to the processing performed in steps S4-S8, the target value $\theta b\_xy\_obj$ of the base body tilt angle $\theta b\_xy$ and the value of the constant parameter is different for each movement mode, i.e., the boarding mode and the autonomous mode.

Incidentally, the processing in steps S5 and S6, or the processing in steps S7 and S8 need not be performed for every cycle of the control processing, and may be only performed when there is a change in the determination result of step S4.

Incidentally, in both the boarding mode and the autonomous mode, the target value of the component $\theta bdot\_in$ a direction around the y axis and the target value of the element $\theta bdot\_y$ in a direction around the x axis of the base body tilting angular velocity $\theta bdot$ are both "0." Therefore, it is not necessary to set the target value of the base body tilting angular velocity $\theta bdot\_xy$.

As described above, after executing the processing in steps S5 and S6, or the processing in steps S7 and S8, the control unit 50 then moves on to step S9. In step S9, the velocity commands of each of the electric motors 31R, 31L are determined by executing the computational processing for controlling the vehicle. This computational processing for controlling the vehicle is described later.

Next, the processing moves on to step S10. In step S10, the control unit 50 executes the control operation of the electric motors 31R and 31L according to the velocity command determined in step S9. In this control operation, the control unit 50 determines the target value of the output torque of the electric motor 31R so that a difference between a velocity command of the electric motor 31R determined in step S9 and the measured value of the rotational velocity of the electric motor 31R measured based on the output of the rotary encoder 56R is converged to "0." The target value of the output torque may also be referred to as the target torque. Furthermore, the control unit 50 controls the electric current supplied to the electric motor 31R so that the output torque of the target torque is outputted to the electric motor 31R. The movement control of the left electric motor 31L is configured in a similar manner.

Heretofore, an overall control processing executed by the control unit 50 has been described.

Next, the computational processing for controlling the vehicle executed in step S9 is described in detail.

Incidentally, in the following description, the vehicle/occupant integrated center-of-gravity point in the boarding mode and the singular vehicle body center-of-gravity point in the autonomous mode are collectively referred to as the "vehicle system center of gravity." When the operating mode of the vehicle 1 is the boarding mode, the vehicle system center of gravity refers to the vehicle/occupant integrated center-of-gravity point. When the operating mode of the vehicle 1 is the autonomous mode, the vehicle system center of gravity refers to the singular vehicle body center-of-gravity point.

Further, in the following description regarding a value determined or renewed by the control unit 50 in each period of control processing, a value determined in the current, most recent period of control processing may be referred to as the current value. Meanwhile, a value determined in the period immediately prior to the current period of control processing may be referred to as the previous value. Further, when a value is referred to without specifying whether the value is a current value or a previous value, the value is meant to be a current value.

Further, regarding the velocity and acceleration in the x axis direction, the frontal direction is considered to be a positive direction. Regarding the velocity and acceleration in the y axis direction, the left direction is regarded as the positive direction.

Figure 8:
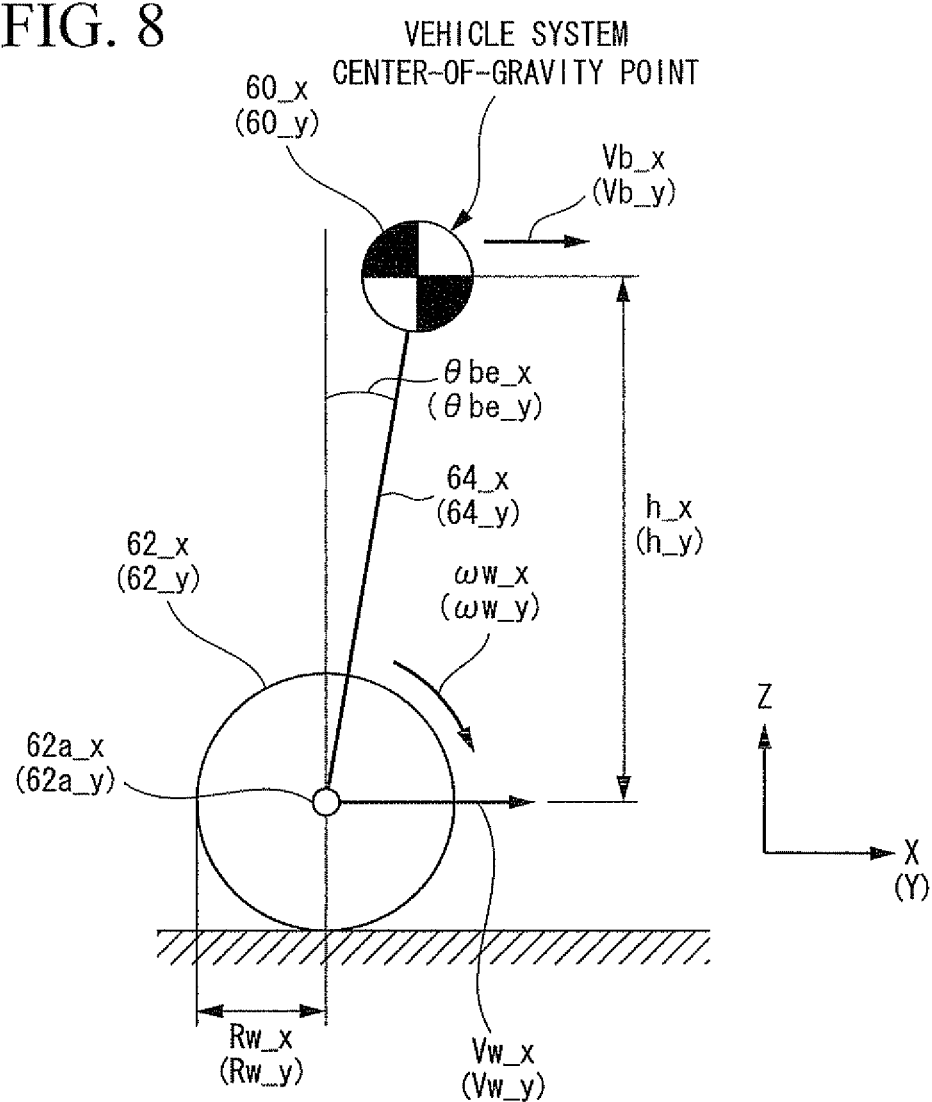
FIG. 8 is a diagram showing an inverted pendulum type model representing dynamic behavior of an omnidirectional vehicle according to an embodiment of the present invention.

According to the present embodiment, the computational processing for controlling the vehicle is executed in step S9 under the assumption that a dynamic movement of the vehicle system center of gravity is represented approximately as a behavior of the inverted pendulum model as shown in FIG. 8. In particular, the dynamic movement of the center-of-gravity point refers to a movement viewed by projecting from a y axis direction to the xz surface which is perpendicular to the y axis, and also refers to a movement viewed by projecting from an x axis direction to the yz surface which is perpendicular to the x axis. Furthermore, the behavior of the inverted pendulum model mentioned above refers to a dynamic movement of the inverted pendulum.

Further, in FIG. 8, a reference numeral without a parenthesis is a reference numeral corresponding to an inverted pendulum model seen from a y axis direction. Meanwhile, a reference numeral with a parenthesis is a reference numeral corresponding to an inverted pendulum model seen from the x axis direction.

In this case, an inverted pendulum model representing a behavior seen from a y axis direction comprises a mass point 60_x positioned at the vehicle system center of gravity and an imaginary wheel 62_x. Here, the imaginary wheel 62_x comprises a rotating axis 62a_x parallel to the y axis direction. The imaginary wheel 62_x and can rotate freely over a floor surface. Further, the mass point 60_x is supported by the rotating axis 62a_x of the imaginary wheel 62_x via a rod 64_x shaped like a straight line. In addition, the mass point 60_x may swing freely around the rotating axis 62a_x, with the rotating axis 62a_x being the fulcrum point.

According to this inverted pendulum model, the movement of the mass point 60_x corresponds to the movement of the vehicle system center of gravity seen from a y axis direction. In addition, the tilt angle θbe_x of the rod 64_x with respect to the orthogonal direction is equal to a difference θbe_x_s (=θb_x_s−θb_x_obj) between a measured value of a base body tilt angle θb_x_s and a target value of a base body tilt angle θb_x_obj in the direction around the y axis. Further, a rate of change (=dθbe_x/dt) of the tilt angle θbe_x of the rod 64_x equals the measured value θbdot_x_s of the base body tilting angular velocity around the y axis. Further, the velocity Vw_x of the imaginary wheel 62_x (the translational velocity in the x axis direction) is equal to the velocity of the wheel assembly 5 of the vehicle 1 in the x axis direction.

Similarly, the inverted pendulum model representing a movement seen from the x axis direction (see reference numeral in FIG. 8 with parentheses) comprises a mass point 60_y located at the vehicle system center of gravity and an imaginary wheel 62_y, which comprises a rotational axis 62a_y parallel in the x axis direction and can roll around freely on a floor surface. Further, the mass point 60_y is supported by the rotational axis 62a_y of the imaginary wheel 62_y via a linear rod 64_y. Furthermore, the mass point 60_y may freely wobble around the rotational axis 62a_y, with the rotational axis 62a_y being a fulcrum point.

According to this inverted pendulum model, the movement of the mass point 60_y corresponds to the movement of the vehicle system center of gravity seen from an x axis direction. In addition, the tilt angle θbe_y of the rod 64_y with respect to the orthogonal direction is equal to a difference θbe_y_s=θb_y_s−θb_y_obj) between a measured value of a base body tilt angle θb_y_s and a target value of a base body tilt angle θb_y_obj in the direction around the x axis. Further, a rate of change (=dθbe_y/dt) of the tilt angle θbe_y of the rod 64_y equals the measured value θbdot_y_s of the base body tilting angular velocity around the x axis. Further, the velocity Vw_y of the imaginary wheel 62_y (the translational velocity in the y axis direction) is equal to the velocity of the wheel assembly 5 of the vehicle 1 in the y axis direction.

Furthermore, the imaginary wheels 62_x and 62_y each have a predetermined radius of Rw_x and Rw_y.

Furthermore, the rotational angular velocity ωw_x and ωw_y of each of the imaginary wheels 62_x and 62_y, and a rotational angular velocity ω_R and ω_L of each of the electric motors 31R and 31L (in more precise terms, the rotational angular velocity ω_R and ω_L of the rotation members 27R and 27L) satisfy the following equations 01a and 01b.

$$\omega w\_x = (\omega\_R + \omega\_L)/2 \quad \text{(Equation 01a)}$$

$$\omega w\_y = C \cdot (\omega\_R - \omega\_L)/2 \quad \text{(Equation 01b)}$$

Incidentally, "C" in the equation 01b refers to a predetermined constant which depends on a mechanical relationship and a slippage between the free roller 29R, 29L and the wheel assembly 5.

Here, the dynamics of the inverted pendulum model shown in FIG. 8 is represented by the following equations 03x and 03y. Incidentally, the equation 03x is an equation representing the dynamics of the inverted pendulum model seen from a y axis direction. The equation 03y is an equation representing the dynamics of the inverted pendulum model seen from an x axis direction.

$$d^2\theta be\_x/dt^2 = \alpha\_x \cdot \theta be\_x + \beta\_x \cdot \omega wdot\_x \quad \text{(Equation 03x)}$$

$$d^2\theta be\_y/dt^2 = \alpha\_y \cdot \theta be\_y + \beta\_y \cdot \omega wdot\_y \quad \text{(Equation 03y)}$$

Here, the ωwdot_x in equation 03x represents a rotational angular acceleration of the imaginary wheel 62_x, i.e., the first differential of the rotational angular velocity ωw_x. In addition, α_x represents a coefficient depending on the mass and the height h_x of the mass point 60_x. β_x is a coefficient depending on the inertia (the moment of inertia) of the imaginary wheel 62_x and the radius Rw_x. The above description also applies to ωwdot_y, α_y, and β_y in equation 03y.

As indicated in equations 03x and 03y, the movement of the mass points 60_x and 60_y of the inverted pendulum is prescribed depending on the rotational angular acceleration ωwdot_x of the imaginary wheel 62_x, and the rotational angular acceleration ωwdot_y of the imaginary wheel 62_y.

Therefore, according to the present embodiment, the rotational angular acceleration ωwdot_x of the imaginary wheel 62_x is used as the manipulated variable (control input) for controlling the movement of the vehicle system center of gravity seen from the y axis direction. At the same time, the rotational angular acceleration ωwdot_y of the imaginary wheel 62_y is used as the manipulated variable (control input) for controlling the movement of the vehicle system center of gravity seen from the x axis direction.

Heretofore, a computational processing for controlling the vehicle, executed in step S9, is described in general. The control unit 50 determines an imaginary wheel rotational angular acceleration commands ωwdot_x_cmd and ωmdot_y_cmd, which are command values (target values) of the rotational angular acceleration ωwdot_x and ωwdot_y as an manipulated variable, so that the movement of the mass point 60_x seen from the x axis direction and the movement of the mass point 60_y seen from the y axis direction becomes a movement corresponding to a predetermined movement of the vehicle system center of gravity.

Furthermore, the control unit 50 determines a value obtained by integrating each of the imaginary wheel rotational angular acceleration commands ωwdot_x_cmd and ωwdot_y_cmd as the imaginary wheel rotational angular velocity commands ωw_x_cmd and ωw_y_cmd, which are the command values (target values) of the rotational angular velocity ωw_x and ωw_y of each of the imaginary wheels 62_x and 62_y.

In addition, the control unit 50 regards the velocity (=Rw_x·ωw_x_cmd) of the imaginary wheel 62_x corresponding to the imaginary wheel rotational angular velocity command ωw_x_cmd as the target velocity of the wheel assembly 5 of the vehicle I in the x axis direction. The control unit 50 also regards the velocity (=Rw_y·ωw_y_cmd) of the imaginary wheel 62_y corresponding to the imaginary wheel rotational angular velocity command ωw_y_cmd as the target velocity of the wheel assembly 5 of the vehicle 1 in the y direction. The control unit 50 determines the velocity commands ω_R_cmd and ω_L_cmd of respectively the electric motors 31R and 31L so as to reach these target velocities.

Further, according to the present embodiment, the imaginary wheel rotational angular acceleration commands ωwdot_x_cmd and ωwdot_y_cmd, being an manipulated variable (control input), is determined by adding up three operational components as indicated in Equations 07x and 07y described later.

Figure 9:
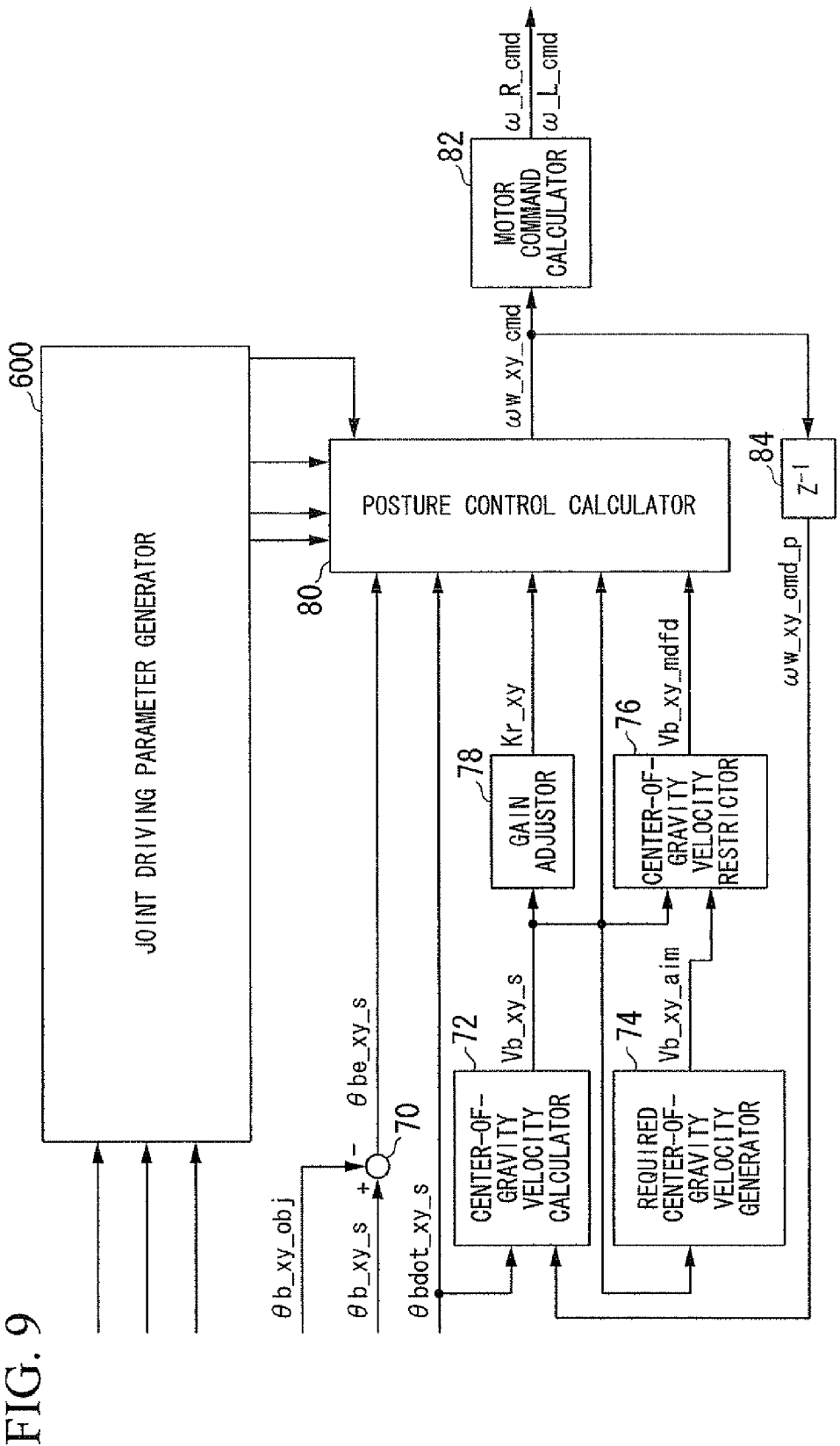
FIG. 9 is a block diagram showing a processing of step S9 shown in FIG. 7.
Figure 17:
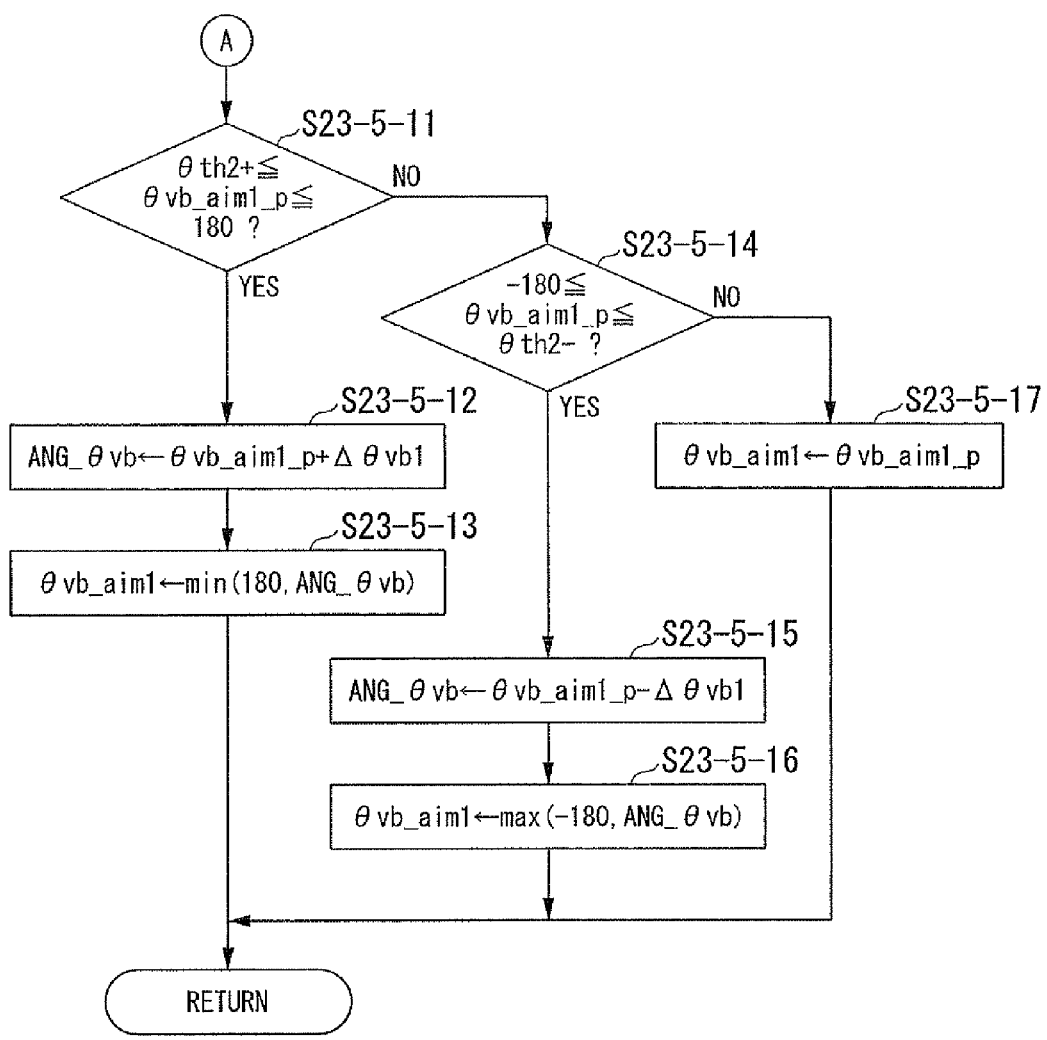
FIG. 17 is a flowchart showing a subroutine of a processing in step S25 shown in FIG. 14.

As described above, the control unit 50 comprises the feature represented in the block diagrams shown in FIGS. 9 and 17 in order to execute the computational processing for controlling the vehicle in step S9. Here, in relation to FIG. 9, FIG. 17 is a diagram showing a block diagram of the joint driving parameter generator 600 described below.

In other words, the control unit 50 comprises an error calculator 70, a center-of-gravity velocity calculator 72, a required center-of-gravity point velocity generator 74, a center-of-gravity point velocity restrictor 76, a gain adjustor 78, and a joint driving parameter generator 600. The error calculator 70 computes the base body tilt angle deviation observed value θbe_xy_s, which is a deviation between the base body tilt angle observed value θb_xy_s and the base body tilt angle target value θb_xy_obj. The center-of-gravity velocity calculator 72 computes a center-of-gravity point velocity estimate value Vb_xy_s as a observed value of the center-of-gravity point velocity Vb_xy, which is the velocity of the vehicle system center of gravity. The required center-of-gravity point velocity generator 74 generates a required center-of-gravity point velocity V_xy_aim as a required value of the center-of-gravity point velocity Vb_xy, which is estimated to be required according to the driving operation of the vehicle 1 by the occupant and the like (i.e., an operation adding an impellent force to the vehicle 1). The center-of-gravity point velocity restrictor 76 determines the target center-of-gravity point velocity for control Vb_xy_mdfd as a target value of the center-of-gravity point velocity Vb_xy based on the estimated center-of-gravity velocity value Vb_xy_s and the required center-of-gravity point velocity V_xy_aim taking into consideration the limitations according to the tolerable range of the rotational angular velocity of the electric motors 31R and 31L. The gain adjustor 78 determines a gain adjustment parameter Kr_xy to adjust the value of the gain coefficient of the equations 07x, 07y, 17x, and 17y.

Further, the center-of-gravity velocity calculator 72 may compute the estimated center-of-gravity velocity value Vb_z_s as a measured value of the center-of-gravity point velocity Vb_z, which is a velocity of the vehicle system center of gravity, in case the vehicle 1, for example, jumps with respect to the floor surface.

The control unit 50 further comprises a posture control calculator 80 and a motor command calculator 82. The posture control calculator 80 computes the imaginary wheel rotational angular velocity command ωw x_y_cmd. The motor command calculator 82 converts the imaginary wheel rotational angular velocity command ωw_xy_cmd into a pair of right side velocity command ω_R_cmd of the electric motor 31R (the command value of the rotational angular velocity) and a left side velocity command ω_L_cmd of the electric motor 31L (the command value of the rotational angular velocity).

Incidentally, the reference numeral 84 in FIG. 9 indicates a delay element imputing an imaginary wheel rotational angular velocity command ωw_xy_cmd computed by the posture control calculator 80 for each control processing cycle. In each control processing cycle, the delay element 84 outputs the previous value ωw_xy_cmd_p of the imaginary wheel rotational angular velocity command ωw_xy_cmd.

Each of these operations are performed by each of the processors in the computational processing for controlling the vehicle in step S9.

Further, when the vehicle 1 does not run along a predetermined trajectory, the parameter generated by the joint driving parameter generator 600 is not an indispensable parameter. Therefore, an explanation is provided regarding a computational processing for controlling the vehicle without using the parameter generated in the joint driving parameter generator 600. Further a computational processing for controlling the vehicle when a plurality of vehicles 1 linked together in one line with a cord member move by one vehicle following and running along the trajectory the vehicle running immediately ahead will be described later along with a detailed description of the joint driving parameter generator 600.

The control unit 50 first executes a processing of the error calculator 70 and the center-of-gravity velocity calculator 72.

The error calculator 70 receives an input of the base body tilt angle observed value θb_xy_s (θb_x_s and θb_y_s) computed in the step S2. The error calculator 70 also receives an input of the target value θb_xy_obj (θb_x_obj and θb_y_obj) set in steps S5 or step S7. Further, the error calculator 70 computes the base body tilt angle deviation observed value θbe_x_s in the direction around the y axis by subtracting θb_x_obj from θb_x_s (=θb_x_s−θb_x_obj). At the same time, the error calculator 70 computes the base body tilt angle deviation observed value θbe_y_s in the direction around the x axis by subtracting θb_y_obj from θb_y_s (=θb_y_s−θb_y_obj).

In addition, the processing of the error calculator 70 may be executed before the computational processing for controlling the vehicle performed in step S9. For example, the processing by the error calculator 70 may be executed during the processing of steps S5 or S7.

The center-of-gravity velocity calculator 72 receives an input of the current value of the base body tilting angular velocity observed value θbdot_xy_s (θbdot_x_s and θbdot_y_s) computed in step S2. In addition, the center-of-gravity velocity calculator 72 receives an input of the previous value ωw_xy_cmd_p (ωw_x_cmd_p and ωw_y_cmd_p) of the imaginary wheel velocity command ωw_xy_cmd from the delay element 84. In addition, the center-of-gravity velocity calculator 72 computes the center-of-gravity point velocity estimation value Vb_xy_s (Vb_x_s and Vb_y_s) from these inputs according to a predetermined arithmetic equation based on the inverted pendulum model.

In detail, the center-of-gravity velocity calculator 72 computes each of Vb_x_s and Vb_y_s according to the following equations 05x and 05y.

$$Vb\_x\_s = Rw\_x \cdot \omega w\_x\_cmd\_p + h\_x \cdot \theta bdot\_x\_s \quad (05x)$$

$$Vb\_y\_s = Rw\_y \cdot \omega w\_y\_cmd\_p + h\_y \cdot \theta bdot\_y\_s \quad (05y)$$

In these equations 05x and 05y, Rw_x and Rw_y each represent the radius of the wheels 62_x and 62_y, and are predetermined values. Further, h_x and h_y each represent the height of the mass points 60_x and 60_y of the inverted pendulum model. In this case according to the present embodiment, the height of the vehicle system center of gravity is maintained at an approximately constant level. Here, predetermined values are used for h_x and h_y. Thus, the heights h_x and h_y are included in the constant parameter, the value of which is set in steps S6 or S8.

The first term of the right side of the equation 05x is a moving velocity of the imaginary wheel 62_x in the x axis direction, corresponding to the previous value ωw_x_cmd_p of the velocity command of the imaginary wheel 62_x. This velocity corresponds to the current value of the actual velocity of the wheel assembly 5 in the x axis direction. Further, the second term of the right side of the equation 05x corresponds to the current value of the velocity of the vehicle system center of gravity in the x axis direction (the relative velocity with respect to the wheel assembly 5) due to the base body 9 tilting in the direction around the y axis in a tilting angular velocity of θbdot_x_s. These characteristics apply to equation 05y as well.

Further, a pair of observed values (current values) of the rotational angular velocity for each of the electric motors 31R and 31L measured based on the output of the rotary encoder 56R and 56L may be converted to a pair of rotational angular velocities for each of the imaginary wheels 62_x and 62_y. These rotational angular velocities may be used instead of ωw_x_cmd_p and ωw_y_cmd_p in equations 05x and 05y. However, in terms of eliminating the influence of noise included in the observed value of the rotational angular velocity, it is more preferable to use the target values ωw_x_cmd_p and ωw_y_cmd_p.

Next, the control unit 50 executes the processing in the required center-of-gravity point velocity generator 74 and the gain adjustor 78. In this case, the required center-of-gravity point velocity generator 74 and the gain adjustor 78 each receives an input of the center-of-gravity point velocity estimation value Vb_xy_s (Vb_x_s and Vb_y_s) computed as described above in the center-of-gravity velocity calculator 72.

Further, when the operation mode of the vehicle 1 is in a boarding mode, the required center-of-gravity point velocity generator 74 determines the required center-of-gravity point velocity V_xy_aim, V_y_aim) based on the inputted center-of-gravity point velocity estimation value Vb_xy_s (Vb_x_s and Vb_y_s). Details of the computation are described later. Incidentally, according to the present embodiment, when the operation mode of the vehicle 1 is in an autonomous mode, the required center-of-gravity point velocity generator 74 sets the required center-of-gravity point velocity V_x_aim and V_y_aim to zero.

Further, the gain adjusting unit 78 determines the gain adjustment parameter Kr_xy (Kr_x and Kr_y) based on the inputted center-of-gravity point velocity estimation value Vb_xy_s (Vb_x_s and Vb_y_s).

The processing by the gain adjusting unit 78 is described below with reference to FIGS. 10 and 11.

Figure 10:
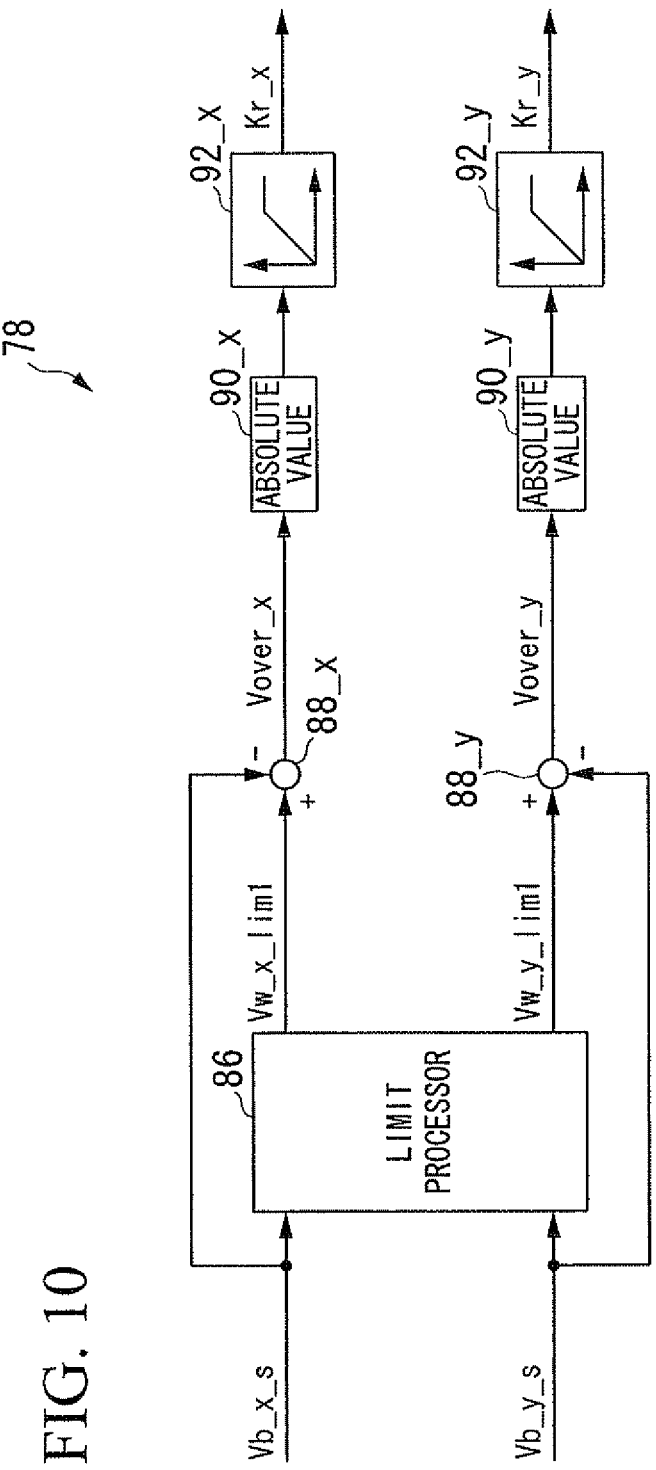
FIG. 10 is a block diagram showing a processing of a gain adjusting unit shown in FIG. 9.
Figure 11:
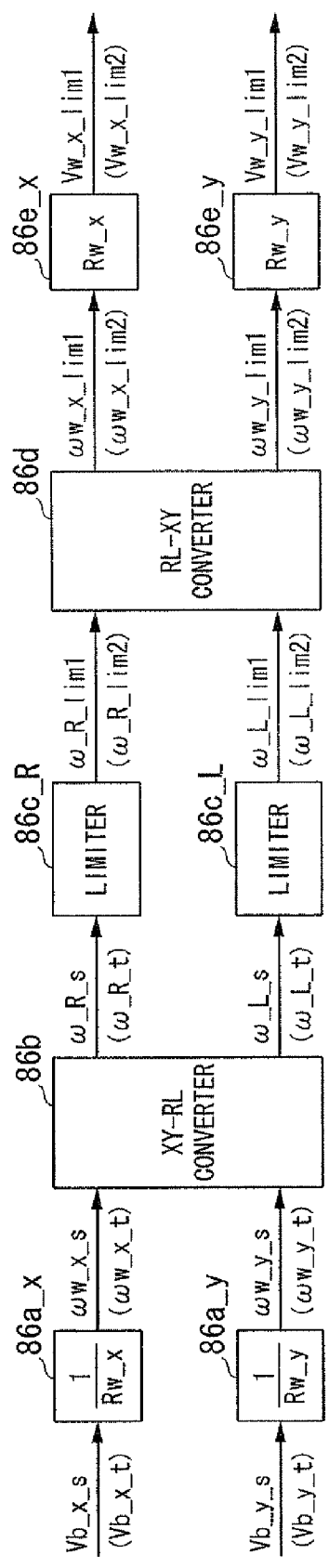
FIG. 11 is a block diagram showing a processing of a limiting processor shown in FIG. 10 (or a limiting processor shown in FIG. 12).

As shown in FIG. 10, the gain adjusting unit 78 enters the imputed center-of-gravity point velocity estimation values Vb_x_s and Vb_y_s to the limiting processor 86. This limiting processor 86 generates the output values Vw_x_lim1 and Vw_y_lim1 by adding a limitation according to the tolerable range of the rotational angular velocity of each of the electrically operated motors 31R and 31L to the center-of-gravity point velocity estimation value Vb_x_s and Vb_y_s. The output value Vw_x_lim1 indicates the value after the limitation imposed on the velocity Vw_x of the imaginary wheel 62_x in the x axis direction. The output value Vx_y_lim1 indicates the value after the limitation is imposed on the velocity Vw_y of the imaginary wheel 62_y in the y axis direction.

The processing by the limiting processor 86 is described in further detail with reference to FIG. 11. The parenthesized reference numerals in FIG. 11 represent a processing of the limiting processor 104 of the center-of-gravity point velocity restrictor 76, and may be ignored in the description concerning the procedure executed by the limiting processor 86.

The limiting processor 86 first enters the center-of-gravity point velocity estimation values Vb_x_s and Vb_y_s to the processors 86a_x and 86a_y. The processor 86a_x divides Vb_x_s with the radius Rw_x of the imaginary wheel 62_x, and computes the rotational angular velocity ωw_x_s of the imaginary wheel 62_x, in a case assuming that the moving velocity of the imaginary wheel 62_x in the x axis direction is matched with Vb_x_s. Similarly, the processor 86a_y computes the rotational angular velocity ωw_y_s (=Vb_y_s/Rw_y) of the imaginary wheel 62_y, in a case assuming that the moving velocity of the imaginary wheel 62_y in the y axis direction is matched with Vb_y_s.

Next, the limiting processor 86 converts the pair ωw_x_s and ωw_y_s into a pair of rotational angular velocity ω_R_s of the electric motor 31R and the rotational angular velocity ω_L_s of the electric motor 31L, via the XY-RL converter 86b.

According to the present embodiment, this conversion is performed by solving the simultaneous equation of the unknowns ω_R_s and ω_L_s obtained by replacing the variables ωw_x, ωw_y, ω_R, and ω_L in the equations 01a and 01b into ωw_x_s, w_y_s, ω_R_s, and ω_L_s.

Next, the limiting processor 86 inputs the output values ω_R_s and ω_L_s of the

XY-RL converter 86b respectively into the limiters 86c_R and 86c_L. At this time, when ω_R_s is within a tolerable range for the right motor comprising a predetermined upper limit (>0) and a lower limit (<0), the limiter 86c_R outputs ω_R_s directly as the output value ωR_lim1. Meanwhile, when ω_R_s is outside of the tolerable range for the right motor, the limiter 86c_R outputs either one of the boundary values (the upper limit or the lower limit) of the tolerable range for the right motor closer to ω_R_s as the output value ω_R_lim1. As a result, the output value ω_R_lim1 of the limiter 86c_R is limited to a value within the tolerable range for the right motor.

Similarly, when ω_L_s is within a tolerable range for the left motor comprising a predetermined upper limit (>0) and a lower limit (<0), the limiter 86c_L outputs ω_L_s directly as the output value ω_L_lim1. Meanwhile, when ω_L_s is outside of the tolerable range for the left motor, the limiter 86c_L outputs either one of the boundary values (the upper limit or the lower limit) of the tolerable range for the left motor closer to ω_L_s as the output value ω_L_lim1. As a result, the output value ω_L_lim1 of the limiter 86c_L is limited to a value within the tolerable range for the left motor.

The tolerable range for the right motor is set in order to prevent the absolute value of the rotational angular velocity of the electric motor 31R at the right side from becoming too large, and to prevent the maximum value of the torque which can be outputted from the electric motor 31R from declining. This feature applies to the tolerable range for the left motor as well.

Next, the limiting processor 86 converts the pair of output values ω_R_lim1 and ω_L_lim1 of the limiters 86c_R and 86c_L to a pair of rotational angular velocity ωw_x_lim1 and ωw_y_lim1 of the imaginary wheels 62_x and 62_y through the RL-XY converter 86d.

This conversion is a reverse conversion process performed by the XY-RL converter 86b. This procedure is executed by solving the simultaneous equation of the unknowns ωw_x_lim1 and ωw_y_lim1 obtained by replacing the variables ωw_x, ωw_y, ω_R, and ω_L in the equations 01a and 01b into ωw_x_lim1, ω_w_y_lim1, ω_R_lim1, and ω_L_lim1.

Next, the limiting processor 86 inputs the output values ωw_x_lim1 and ωw_y_lim1 from the RL-XY converter 86d into the processors 86e_x and 86e_y. The processor 86e_x multiplies ωw_x_lim1 with the radius Rw_x of the imaginary wheel 62_x, and thereby converts ωw_x_lim1 into the velocity Vw_x_lim1 of the imaginary wheel 62_x. Similarly, the processor 86e_y converts ωw_y_lim1 into the velocity Vw_y_lim1 (=ωw_y_lim1·Rw_y) of the imaginary wheel 62_y.

As a result of the processing executed by the limiting processor 86, when the velocity Vw_x of the imaginary wheel 62_x in the x axis direction and the velocity Vw_y of the imaginary wheel 62_y in the y axis direction are assumed to be respectively matched with the center-of-gravity point velocity estimation values Vb_x_s and Vb_y_s (i.e., when the velocity of the wheel assembly 5 in the x axis direction and the y direction is respectively matched with Vb_x_s and Vb_y_s), and when the rotational angular velocities ω_R_s and ω_L_s of the electric motors 31R and 31L necessary to attain the velocities are both within a tolerable range, the pair of output values Vw_x_lim1 and Vw_y_lim1 respectively matching Vb_x_s and Vb_y_s are outputted by the limiting processor 86.

Meanwhile, when both or either one of the rotational angular velocities ω_R_s and ω_L_s of the electric motors 31R and 31L is outside the tolerable range, both or either one of the rotational angular velocities is confined to be included in the tolerable range. Under this limitation, the pair of velocities Vw_x_lim1 and Vw_y_lim1 in the x axis direction and the y axis direction corresponding to the pair of rotational angular velocities ω_R_lim1 and ω_L_lim1 of the electric motors 31R and 31L is outputted from the limiting processor 86.

Therefore, under the compulsory, necessary condition that each of the rotational angular velocities of the electric motors 31R and 31L corresponding to the pair of output values Vw_x_lim1 and Vw_y_lim1 is not outside of the tolerable range, the limiting processor 86 generates a pair of output values Vw_x_lim1 and Vw_y_lim1 so that each of the output values Vw_x_lim1 and Vw_y_lim1 is matched respectively with Vb_x_s and Vb_y_s to the extent possible under the above necessary condition.

Returning to the description concerning FIG. 10, the gain adjusting unit 78 executes the processing of the calculators 88_x and 88_y. The calculator 88_x receives an input of the center-of-gravity point velocity estimation value Vb_x_s in the x axis direction and the output value Vw_x_lim1 of the limiting processor 86. Further, the calculator 88_x computes a value Vover_x by subtracting Vb_x_s from Vw_x_lim1 and outputs the value Vover_x. Further, the calculator 88_y receives an input of the center-of-gravity point velocity estimation value Vb_y_s in the y axis direction and the output value Vw_y_lim1 of the limiting processor 86. Further, the calculator 88_y computes a value Vover_y by subtracting Vb_y_s from Vw_y_lim1, and outputs the value Vover_y.

In this case, when the output values Vw_x_lim1 and Vw_y_lim1 were not compulsorily limited in the limiting processor 86, the following equations hold: Vw_x_lim1=Vb_x_s, Vw_y_lim1=Vb_y_s Therefore, the output values Vover_x and Vover_y of each of the computational units 88_x and 88_y both becomes zero.

On the other hand, when the output values Vw_x_lim1 and Vw_y_lim1 of the limiting processor 86 are generated by imposing a compulsory limitation on the input values Vb_x_s and Vb_y_s, the corrected value (=Vw_x_lim1−Vb_x_s) of Vw_x_lim1 with respect to Vb_x_s and the corrected value (=Vw_y_lim1−Vb_y_s) of Vw_y_lim1 with respect to Vb_y_s are outputted by the calculators 88_x and 88_y.

Next, the gain adjusting unit 78 runs the output value Vover_x of the calculator 88_x through the processors 90_x and 92_x in order. In this way, the gain adjusting unit 78 determines the gain adjusting parameter Kr_x. Further, the gain adjusting unit 78 determines the gain adjusting parameter Kr_y by running the output value Vover_y of the calculator 88_y through the processors 90_y and 92_y in order. Further, the gain adjusting parameters Kr_x and Kr_y are both values between 0 and 1.

The processor 90_x computes the absolute value of the inputted Vover_x, and outputs the absolute value. Further, the processor 92_x generates Kr_x so that the output value Kr_x increases monotonically with respect to the inputted value |Vover_x| and so that Kr_x has a saturation characteristic. According to this saturation characteristic, when the input value becomes large to a certain degree, the change in the output value with respect to the increase in the input value becomes equal to or close to zero.

In this case, according to the present embodiment, when the input value |Vover_x| is less than or equal to a predetermined value, the processor 92_x outputs the value obtained by multiplying the input value |Vover_x| with a predetermined proportionality coefficient as Kr_x. Further, when the input value |Vover_x| is greater than a predetermined value, the processor 92_x outputs "1" as Kr_x. Further, the proportionality coefficient is set so that, when |Vover_x| matches with a predetermined value, the product of |Vover_x| and the proportionality coefficient equals 1.

Further, the procedure performed by the processors 90_y and 92_y is similar to the procedure performed by the processors 90_x and 92_x as described above.

According to the procedure performed by the gain adjusting unit 78, when a compulsory limitation is not imposed on the output values Vw_x_lim1 and Vw_y_lim1 by the limiting processor 86, the gain adjusting parameters Kr_x and Kr_y are both set to zero. In other words, when the rotational angular velocity of each of the electric motors 31R and 31L fall within the tolerable range under a condition in which the electric motors 31R and 31L are driven so that the velocity Vw_x and Vw_y of the wheel assembly 5 in the x axis direction and the y axis direction match the center-of-gravity point velocity estimation values Vb_x_s and Vb_y_s, the gain adjusting parameters Kr_x and Kr_y are both set to zero.

Meanwhile, when the output values Vw_x_lim1 and Vw_y_lim1 of the limiting processor 86 is generated by imposing a compulsory limitation on the input values Vb_x_s and Vb_y_s, the values of the gain adjusting parameters Kr_x and Kr_y are determined according to the absolute values of the correction amount Vover_x and Vover_y. In other words, when either one of the rotational angular velocities of the electric motors 31R and 31L falls outside of the tolerable range (i.e., when the absolute value of either one of the rotational angular velocity becomes too high) under a condition in which the electric motors 31R and 31L are driven so that the velocity Vw_x and Vw_y of the wheel assembly 5 in the x axis direction and the y axis direction match the center-of-gravity point velocity estimation values Vb_x_s and Vb_y_s, the values of the gain adjusting parameters Kr_x and Kr_y are determined according to the absolute values of the correction amount Vover_x and Vover_y. In this case, Kr_x is determined so that the value of Kr_x increases as the absolute value of the corrected value Vx_over increases, with "1" being the upper limit. This characteristic applies to Kr_y as well.

Returning to the description regarding FIG. 9, the control unit 50 performs the procedure of the center-of-gravity point velocity restrictor 76 after performing the procedure of the center-of-gravity velocity calculator 72 and the required center-of-gravity point velocity generator 74 as described earlier.

The center-of-gravity point velocity restrictor 76 receives an input of the center-of-gravity point velocity estimation value Vb_xy_s (Vb_x_s and Vb_y_s) computed by the center-of-gravity velocity calculator 72 and the required center-of-gravity point velocity V_xy_aim (V_x_aim and V_y_aim) determined in the required center-of-gravity point velocity generator 74. The center-of-gravity point velocity restrictor 76 uses these input values, and carries out the procedure shown in the block diagram in FIG. 12, thereby determining the target center-of-gravity point velocity for control V_xy_mdfd (V_x_mdfd and V_y_mdfd).

In particular, the center-of-gravity point velocity restrictor 76 first executes the procedure of the steady-state error calculator 94_x and 94_y.

In this case, the steady-state error calculator 94_x receives an input of the center-of-gravity point velocity estimation value Vb_x_s in the x axis direction. At the same time, the steady-state error calculator 94_x receives an input of the previous value Vb_x_mdfd_p of the target center-of-gravity point velocity for control Vb_x_mdfd in the x axis direction via the delay element 96_x. In addition, the steady-state error calculator 94_x first inputs Vb_x_s to the proportional-differential compensation element (PD compensation element) 94a_x. This proportional-differential compensation element 94a_x is a compensation element such that the transfer function is expressed by 1+Kd·S. The proportional-differential compensation element 94a_x adds the inputted Vb_x_s along with a value obtained by multiplying a predetermined coefficient Kd with the differential (temporal rate of change) of Vb_x_s, and outputs sum obtained by the addition.

Next, the steady-state error calculator 94_x computes, via the calculator 94b_x, a value obtained by subtracting the inputted Vb_x_mdfd_p from the output value of the steady-state error calculator 94_x. Then, the steady-state error calculator 94_x inputs the output value of the calculator 94b_x to the low pass filter 94c_x comprising a phase compensation feature. This low pass filter 94c_x is a filter such that the transfer function is represented by (1+Tg2·S)/(1+Tg1·S). Furthermore, the steady-state error calculator 94_x outputs the output value Vb_x_prd of the low pass filter 94c_x.

Furthermore, the center-of-gravity point velocity estimation value Vb_y_s in the y axis direction is inputted to the steady-state error calculator 94_y. At the same time, the previous value Vb_y_mdfd_p of the target center-of-gravity point velocity for control Vb_y_mdfd in the y axis direction is inputted via the delay element 96_y.

Moreover, similar to the steady-state error calculator 94_x described above, the steady-state error calculator 94_y performs, in series, the processing of the proportional-differential compensation element 94a_y, the calculator 94b_y, and the low pass filter 94c_y. In this way, the steady-state error calculator 94_y outputs the output value Vb_y_prd of the low pass filter 94c_y.

Here, the output value Vb_x_prd of the steady-state error calculator 94_x refers to a steady state differential of the to-be-converged value of the future center-of-gravity point velocity estimation value in the x axis direction with respect to the target center-of-gravity point velocity for control Vb_x_mdfd, estimated by the current condition of the movement of the vehicle system center of gravity seen from the y axis direction (i.e., the condition of the movement of the mass point 60_x of the inverted pendulum model seen from the y axis direction). At the same time, the output value Vb_y_prd of the steady-state error calculator 94y refers to a steady state differential of the to-be-converged value of the future center-of-gravity point velocity estimation value in the y axis direction with respect to the target center-of-gravity point velocity for control Vb_y_mdfd, estimated by the current condition of the movement of the vehicle system center of gravity seen from the x axis direction (i.e., the condition of the movement of the mass point 60_y of the inverted pendulum model seen from the x axis direction). Hereinafter, the output values Vb_x_prd and Vb_y_prd of the steady-state error calculators 94_x and 94_y are called the center-of-gravity point velocity steady state deviation estimation value.

The center-of-gravity point velocity limiting unit 76 performs the process of the steady-state error calculators 94_x and 94_y as described above. Then, the center-of-gravity point velocity limiting unit 76 performs a procedure adding the required center-of-gravity point velocity Vb_x_aim to the output value Vb_x_prd of the steady-state error calculator 94_x by the calculator 98_x. The center-of-gravity point velocity limiting unit 76 performs a procedure adding the required center-of-gravity point velocity Vb_y_aim to the output value Vb_y_prd of the steady-state error calculator 94_y by the calculator 98_y.

Therefore, the output value Vb_x_t of the calculator 98_x becomes a velocity obtained by adding the required center-of-gravity point velocity Vb_x_aim in the x axis direction to the center if gravity velocity steady state deviation estimation value Vb_x_prd in the x axis direction. Similarly, the output value Vb_y_t of the calculator 98_y becomes a velocity obtained by adding the required center-of-gravity point velocity Vb_y_aim in the y axis direction to the center if gravity velocity steady state deviation estimation value Vb_y_prd in the x axis direction.

Further, when the operation mode of the vehicle 1 is in an autonomous mode and the like, and the required center-of-gravity point velocity Vb_x_aim in the x axis direction is zero, the center-of-gravity point velocity steady state deviation estimation value Vb_x_prd in the x axis direction becomes the output value Vb_x_t of the calculator 98_x. Similarly, when the required center-of-gravity point velocity Vb_y_aim in the y axis direction becomes zero, the center-of-gravity point velocity steady state deviation estimation value Vb_y_prd in the y axis direction becomes the output value Vb_y_t of the calculator 98_y.

Next, the center-of-gravity point velocity restrictor 76 enters the output values Vb_x_t and Vb_y_t of the calculators 98_x and 98_y to the limiting processor 100. The procedure executed by the limiting processor 100 is the same as the procedure executed by the limiting processor 86 of the gain adjusting unit 78. In this case, as indicated by the parenthesized reference numerals shown in FIG. 11, only the input value and the output value of each processors of the limiting processor 100 differs from the limiting processor 86.

In particular, according to the limiting processor 100, the processors 86a_x and 86a_y each computes the rotational angular velocities ωw_x_t and ωw_y_t of the imaginary wheels 62_x and 62_y in a case in which the velocities Vw_x and Vw_y of the imaginary wheels 62_x and 62_y are matched with Vb_x_t and Vb_y_t. In addition, the pair of rotational angular velocities ωw_x_t and ωw_y_t are converted to a pair of rotational angular velocities ω_R_t and ω_L_t of the electric motors 31R and 31L by the XY-RL converter 86b.

Further, these rotational angular velocities ω_R_t and ω_L_t are respectively limited to a value within a tolerable range for the right motor and a value within a tolerable range for the left motor, due to the limiters 86c_R and 86c_L. Further, the values ω_R_lim2 and ω_L_lim2 obtained after this limitation process are converted to the rotational angular velocities ωw_x_lim2 and ωw_y_lim2 of the imaginary wheels 62_x and 62_y by the RL-XY converter 86d.

Next, the velocities Vw_x_lim2 and Vw_y_lim2 of each of the imaginary wheels 62_x and 62_y corresponding to each of the rotational angular velocities ωw_x_lim2 and ωw_y_lim2 are computed respectively by the processors 86e_x and 86e_y. These velocities Vw_x_lim2 and Vw_y_lim2 are outputted by the limiting processor 100.

Due to the procedure executed by the limiting processor 100, in a manner similar to the limiting processor 86, under the compulsory, necessary condition that each of the rotational angular velocities of the electric motors 31R and 31L corresponding to the pair of output values Vw_x_lim2 and Vw_y_lim2 is not outside of the tolerable range, the limiting processor 100 generates a pair of output values Vw_x_lim2 and Vw_y_lim2 so that each of the output values Vw_x_lim2 and Vw_y_lim2 is matched respectively with Vb_x_t and Vb_y_t to the extent possible under the above necessary condition.

Incidentally, each of the tolerable range for the right motor and the left motor regarding the limiting processor 100 need not be the same as each of the tolerable range for the right motor and the left motor regarding the limiting processor 86. Different tolerable ranges may be set for the limiting processors 86 and 100.

Figure 12:
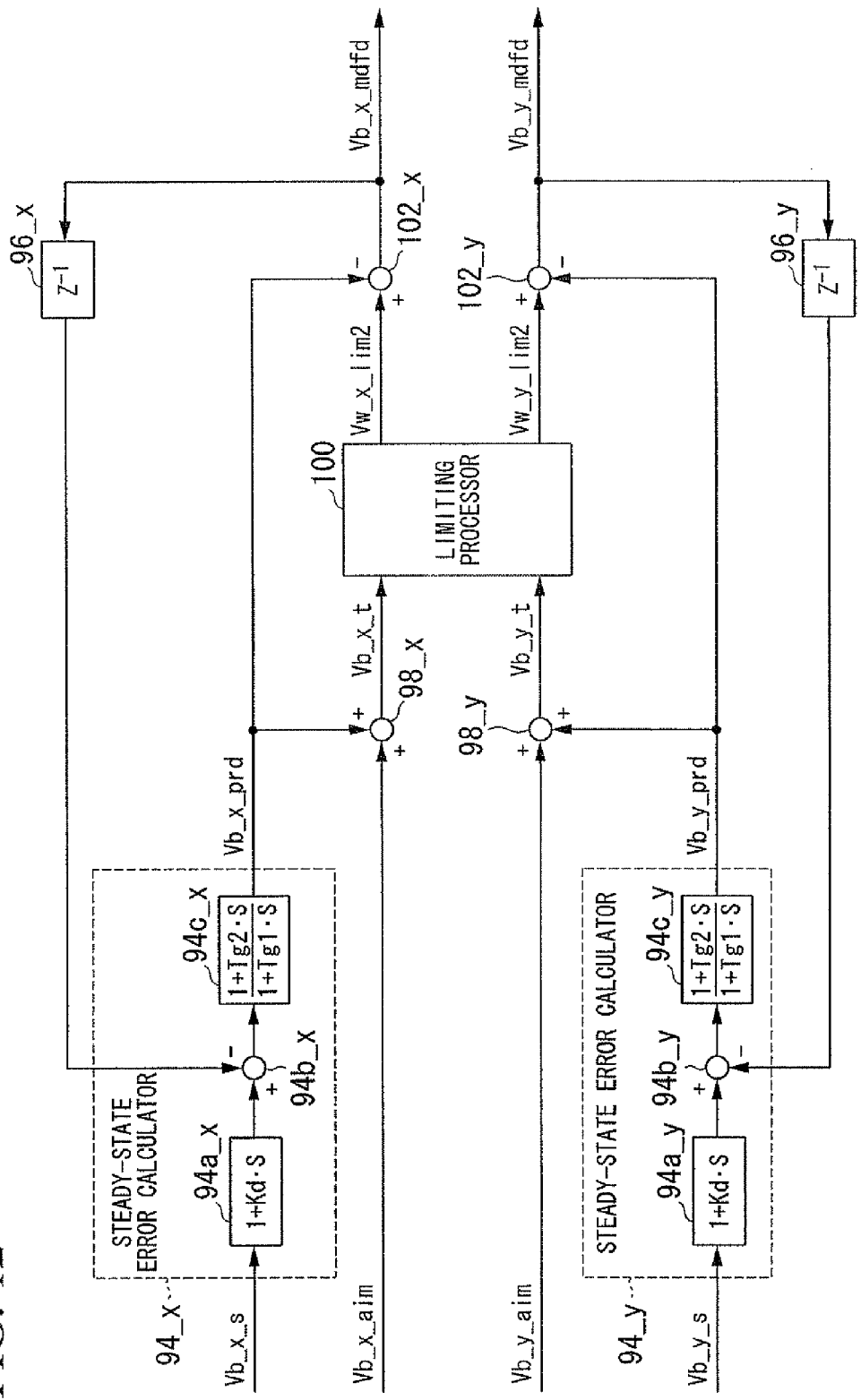
FIG. 12 is a block diagram showing a processing of a center-of-gravity point velocity restrictor 76 shown in FIG. 9.

Returning to the description of FIG. 12, the center-of-gravity point velocity restrictor 76 computes the target center-of-gravity point velocities for control Vb_x_mdfd and Vb_y_mdfd, by performing the procedure of the calculators 102_x and 102_y. In this case, the calculator 102_x computes the target center-of-gravity point velocity for control Vb_x_mdfd in the x axis direction as a value obtained by subtracting the center-of-gravity point velocity steady state deviation estimation value Vb_x_prd in the x axis direction from the output value Vw_x_lim2 of the limiting processor 100. Similarly, the calculator 102_y computes the target center-of-gravity point velocity for control Vb_y_mdfd in the y axis direction as a value obtained by subtracting the center-of-gravity point velocity steady state deviation estimation value Vb_y_prd in the y axis direction from the output value Vw_y_lim2 of the limiting processor 100.

When a compulsory limitation is not imposed on the output values V_x_lim2 and V_y_lim2 by the limiting processor 100, the target center-of-gravity point velocity for control Vb_x_mdfd and Vb_y_mdfd determined as described above is set to be equal to the required center-of-gravity point velocity Vb_x_aim and Vb_y_aim. In other words, when the rotational angular velocity of each of the electric motors 31R and 31L fall within the tolerable range under a condition in which the electric motors 31R and 31L are driven so that the velocity of the wheel assembly 5 in the x axis direction and the y axis direction matches the output value Vb_x_t of the calculator 98_x and the output value Vb_y_t of the calculator 98_y, the target center-of-gravity point velocity for control Vb_x_mdfd and Vb_y_mdfd is set to be equal to the required center-of-gravity point velocity Vb_x_aim and Vb_y_aim.

Incidentally, in this case, when the required center-of-gravity point velocity Vb_x_aim in the x axis direction equals zero, the target center-of-gravity point velocity for control Vb_x_mdfd in the x axis direction also equals zero as well. Further, when the required center-of-gravity point velocity Vb_y_aim in the y axis direction equals zero, the target center-of-gravity point velocity for control Vb_y_mdfd in the y axis direction also equals zero as well.

Meanwhile, when the output values Vw_x_lim2 and Vw_y_lim2 of the limiting processor 100 is generated by imposing a compulsory limitation on the input values Vb_x_t and Vb_y_t, the target center-of-gravity point velocity for control Vb_x_mdfd in the x axis direction is determined to be a value obtained by correcting the required center-of-gravity point velocity Vb_x_aim by a correction amount of the output value Vw_x_lim2 of the limiting processor 100 with respect to the input value Vb_x_t (=Vw_x_lim2−Vb_x_t). Thus, the value is obtained by adding the correction amount to Vb_x_aim. In other words, when either one of the rotational angular velocities of the electric motors 31R and 31L falls outside of the tolerable range (i.e., when the absolute value of either one of the rotational angular velocities becomes too high) under a condition in which the electric motors 31R and 31L are driven so that the velocity of the wheel assembly 5 in the x axis direction and the y axis direction matches the output value Vb_x_t of the calculator 98_x and the output value Vb_y_t of the calculator 98_y, the target center-of-gravity point velocity for control Vb_x_mdfd in the x axis direction is determined to be a value obtained by correcting the required center-of-gravity point velocity Vb_x_aim by the correction amount described above.

Further, regarding the y axis direction, the target center-of-gravity point velocity for control Vb_y_mdfd in the y axis direction is determined to be a value obtained by correcting the required center-of-gravity point velocity Vb_y_aim by a correction amount of the output value Vw_y_lim2 of the limiting processor 100 with respect to the input value Vb_y_t (=Vw_y_lim2−Vb_y_t). Thus, the value is obtained by adding the correction amount to Vb_y_aim.

In this case, regarding the velocity in the x axis direction for example, when the required center-of-gravity point velocity Vb_x_aim is not zero, the target center-of-gravity point velocity for control Vb_x_mdfd either approaches zero to a greater extent compared to the required center-of-gravity point velocity Vb_x_aim, or becomes a velocity facing the opposite direction with respect to the required center-of-gravity point velocity Vb_x_aim. Further, when the required center-of-gravity point velocity Vb_x_aim equals zero, the target center-of-gravity point velocity for control Vb_x_mdfd becomes a velocity facing the opposite direction with respect to the center-of-gravity point velocity steady state deviation estimation value Vb_x_prd in the x axis direction outputted by the steady-state error calculator 94_x. These characteristics apply to the velocity in the y axis direction.

The center-of-gravity point velocity limiting unit 76 executes the procedure as described above.

Returning to the description regarding FIG. 9, the control unit 50 performs the procedure of the posture control calculator 80 after performing the procedure of the center-of-gravity velocity calculator 72, the center-of-gravity point velocity restrictor 76, the gain adjusting unit 78, and the error calculator 70 as described earlier.

The procedure of the posture control calculator 80 is described below with reference to FIG. 13. Incidentally, in FIG. 13, the reference numeral without a parenthesis relates to a procedure determining the imaginary wheel rotational angular velocity command ωw_x_cmd, which is a target value of the rotational angular velocity of the imaginary wheel 62_x rolling in the x axis direction. The parenthesized reference numeral relates to a procedure determining the imaginary wheel rotational angular velocity command ωw_y_cmd, which is a target value of a rotational angular velocity of the imaginary wheel 62_y rolling in the y axis direction.

Figure 13:
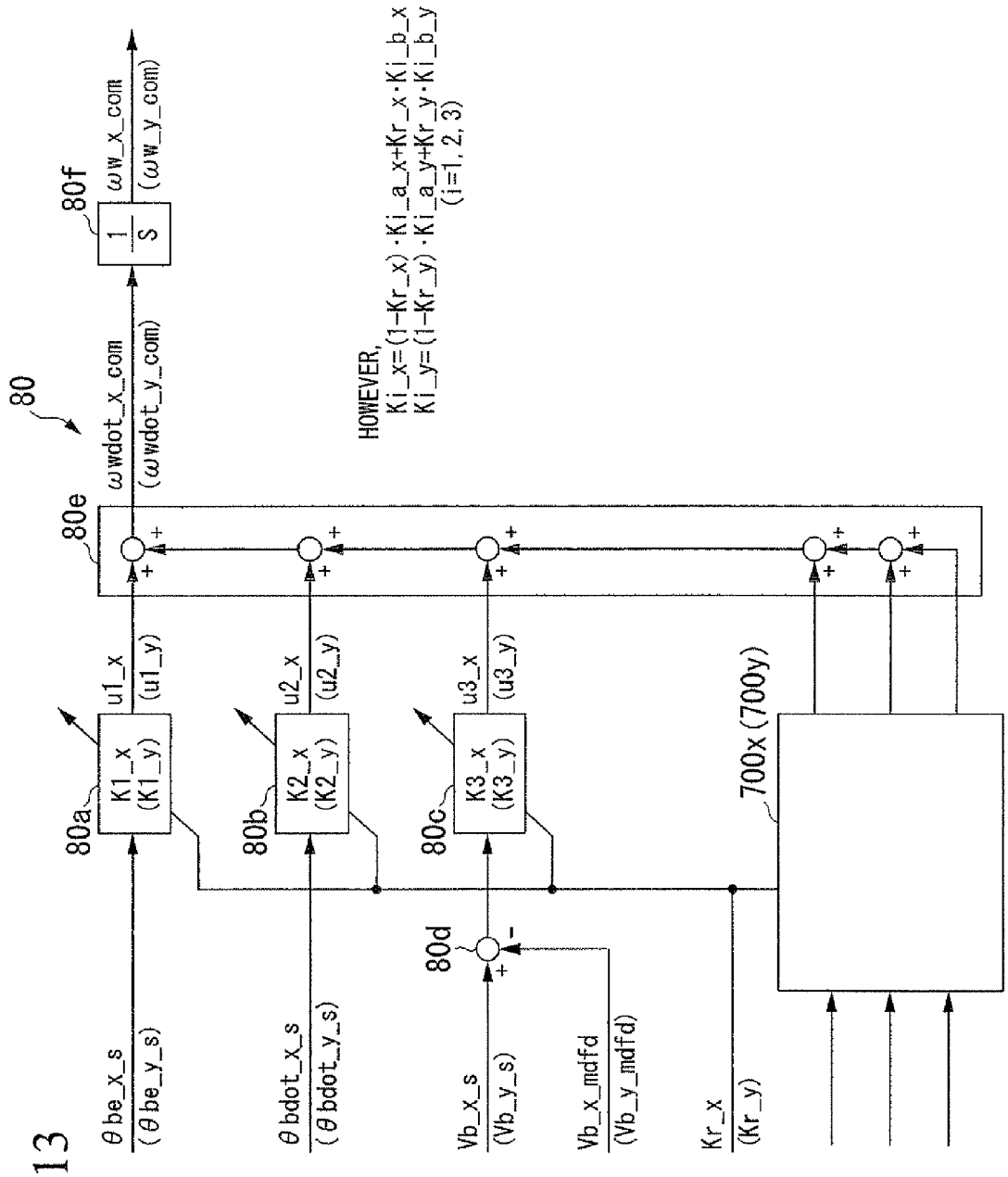
FIG. 13 is a block diagram showing a processing of a posture control calculator 80 shown in FIG. 9.

Further, when the vehicle 1 does not run along a predetermined trajectory, the processors 700x and 700y shown in FIG. 13 are not indispensible blocks. Therefore, the processor 700x (700y) is described along with a detailed description of the joint driving parameter generator 600.

The posture control calculator 80 receives an input of the base body tilt angle deviation observed value θbe_xy_s computed by the deviation calculator 70, the base body tilting angular velocity observed value θbdot_xy_s computed in step S2, a center-of-gravity point velocity estimation value Vb_xy_s computed by the center-of-gravity velocity calculator 72, the target center-of-gravity point velocity Vb_xy_cmd computed by the center-of-gravity point velocity restrictor 76, and the gain adjusting parameter Kr_xy computed by the gain adjusting unit 78.

The posture control calculator 80 first uses these input values to compute the imaginary wheel rotational angular acceleration command ωwdot_xy_cmd based on the following equations 07x and 07y.

$$\omega wdot\_x\_cmd = K1\_x \cdot \theta be\_x\_s + K2\_x \cdot \theta bdot\_x\_s + K3\_x \cdot (Vb\_x\_s - Vb\_x\_mdfd) \quad \text{(equation 07x)}$$

$$\omega wdot\_y\_cmd = K1\_y \cdot \theta be\_y\_s + K2\_y \cdot \theta bdot\_y\_s + K3\_y \cdot (Vb\_y\_s - Vb\_y\_mdfd) \quad \text{(equation 07y)}$$

Therefore, according to the present embodiment, the imaginary wheel rotational angular acceleration command ωwdot_x_cmd and the imaginary wheel rotational angular acceleration command ωwdot_y_cmd are both determined by adding up three elements of an operational amount (the three terms in the right side of the equations 07x and 07y). The imaginary wheel rotational angular acceleration command ωwdot_x_cmd is an operational amount (control input) for controlling the movement of the mass point 60_x of the inverted pendulum type model seen from the y axis direction (i.e., the movement of the vehicle system center of gravity seen from the y axis direction). The imaginary wheel rotational angular acceleration command ωwdot_y_cmd is an operational amount (control input) for controlling the movement of the mass point 60_y of the inverted pendulum type model seen from the x axis direction (i.e., the movement of the vehicle system center of gravity seen from the x axis direction).

In this case, the gain coefficients K1_x, K2_x, and K3_x relating to each element of the manipulated variable in the equation 07x is set variably according to the gain adjustment parameter Kr_x. The gain coefficients K1_y, K2_y, and K3_y relating to each element of the manipulated variable in equation 07y are set variably according to the gain adjustment parameter Kr_y. Hereinafter, each of the gain coefficients K1_x, K2_x, and K3_x in equation 07x may be referred to as the first gain coefficient K1_x, the second gain coefficient K2_x, and the third gain coefficient K3_x. This characteristic applies to the gain coefficients K1_y, K2_y, and K3_y in equation 07y as well.

The i-th gain coefficient Ki_x (i=1, 2, 3) in equation 07x and the i-th gain coefficient Ki_y (i=1, 2, 3) in equation 07y are determined, as indicated in the comments shown in FIG. 13, according to the gain adjustment parameters Kr_x and Kr_y based on the following equations 09x and 09y.

$$Ki\_x = (1 - Kr\_x) \cdot Ki\_a\_x + Kr\_x \cdot Ki\_b\_x \quad \text{(equation 09x)}$$

$$Ki\_y = (1 - Kr\_y) \cdot Ki\_a\_y + Kr\_y \cdot Ki\_b\_y \quad \text{(equation 09y)}$$

(i=1, 2, 3)

Here, Ki_a_x and Ki_b_x in equation 09x are constant values predetermined as a gain coefficient value at the side of the minimum value of the i-th gain coefficient Ki_x (closer to the "0" side) and a gain coefficient value at the side of the maximum value of the i-th gain coefficient Ki_x (toward the side moving away from "0"). This characteristic applies to Ki_a_y and Ki_b_y in equation 09y.

Therefore, each of the i-th gain coefficient Ki_x (i=1, 2, 3) used in the equation 07x is determined as a weighted average of the constants Ki_a_x and Ki_b_x corresponding to each of the i-th gain coefficient Ki_x. Further, in this case, the weight on each of Ki_a_x and Ki_b_x_x is varied according to the gain adjustment parameter Kr_x. Therefore, in the case of Kr_x=0, Ki_x becomes equal to Ki_a_x. In the case of Kr_x=1, Ki_x becomes equal to Ki_b_x. Further, as Kr x becomes closer to "1" from "0," the i-th gain coefficient Ki_x becomes closer to Ki_b_x from Ki_a_x.

Similarly, each of the i-th gain coefficient Ki_y (i=1, 2, 3) used in the equation 07y is determined as a weighted average of the constants Ki_a_y and Ki_b_y corresponding to each of the i-th gain coefficient Ki_y. Further, in this case, the weight on each of Ki_a_y and Ki_b_y is varied according to the gain adjustment parameter Kr_y. Therefore, in a case similar to Ki_x, as the value of Kr_y varies between "0" and "1," the value of the i-th gain coefficient Ki_y varies between Ki_a_y and Ki_b_y.

To supplement, the constant values Ki_a_x, Ki_b_x, Ki_a_y, and Ki_b_y (i=1, 2, 3) are included in the constant parameters whose values are determined in step S6 or S8.

The posture control calculator 80 performs the computation in the equation 07x using the first to third gain coefficients K1_x, K2_x, and K3_x determined as described above. In this way, the posture control calculator 80 computes the imaginary wheel rotational angular acceleration command ωwdot_x_cmd relating to the imaginary wheel 62_x rotating in the x axis direction.

In further detail, in reference to FIG. 13, the posture control calculator 80 computes the manipulated variable component u1_x and the manipulated variable component u2_x respectively in the processors 80a and 80b. The manipulated variable component u1_x is obtained by multiplying the first gain coefficient K1_x with the base body tilt angle deviation observed value θbe_x_s. The manipulated variable component u2_x is obtained by multiplying the base body tilting angular velocity observed value θbdot_x_s with the second gain coefficient K2_x. Furthermore, the posture control calculator 80 computes the deviation between the center-of-gravity point velocity estimation value Vb_x_s and the target center-of-gravity point velocity for control Vb_x_mdfd (−Vb_x_s−Vb_x_mdfd) at the calculator 80d. The posture control calculator 80 then computes the manipulated variable element u3_x at the processor 80c obtained by multiplying the deviation with the third gain coefficient K3_x. Further, the posture control calculator 80 computes the imaginary wheel rotational angular acceleration command ωwdot_x_cmd by adding up these manipulated variable components u1_x, u2_x, and u3_x at the calculator 80e.

Similarly, the posture control calculator 80 performs the computation of the equation 07y by using the first to third gain coefficients K1_y, K2_y and K3_y determined as described above. In this way, the posture control calculator 80 computes the imaginary wheel rotational angular acceleration command ωwdot_y_cmd concerning the imaginary wheel 62_y rolling in the y axis direction.

In this case, the posture control calculator 80 computes the manipulated variable component u1_y and the manipulated variable component u2_y (respectively in the processors 80a and 80b. The manipulated variable component u1_y is obtained by multiplying the first gain coefficient K1_y with the base body tilt angle deviation observed value θbe_y_s. The manipulated variable component u2_y is obtained by multiplying the base body tilting angular velocity observed value θbdot_y_s with the second gain coefficient K2_y. Furthermore, the posture control calculator 80 computes the deviation between the center-of-gravity point velocity estimation value Vb_y_s and the target center-of-gravity point velocity for control Vb_y_mdfd (=Vb_y_s−Vb_y_mdfd) at the calculator 80d. The posture control calculator 80 then computes the manipulated variable element u3_y at the processor 80c obtained by multiplying the deviation with the third gain coefficient K_y. Further, the posture control calculator 80 computes the imaginary wheel rotational angular acceleration command ωwdot_x_cmd by adding up these manipulated variable components u1_y, u2_y, and u3_y at the calculator 80e.

Here, the first element (=the first manipulated variable component u1_x) and the second element (=the second manipulated variable component u2_x) of the right side of the equation 07x is a feedback manipulated variable element for converging the base body tilting angular deviation observed value θbe_x_s around the y axis direction to zero according to the PD law (proportional-differential law), being the feedback control law. In other words, the base body tilt angle observed value θb_x_s is converged to the target value θb_x_obj.

Further, the third element (=the third manipulated variable component u3_x) of the right side of the equation 07x is a feedback manipulated variable element for converging the deviation between the center-of-gravity point velocity estimation value Vb_x_s and the target center-of-gravity point velocity Vb_x_mdfd to zero according to the proportionality law being the feedback control law. In other words, Vb_x_s is converged to Vb_x_mdfd.

These characteristics apply to the first to third elements (the first to third manipulated variable components u1_y, u2_y, and u3_y) of the right side of the equation 07y as well.

As described above, the posture control calculator 80 computes the imaginary wheel rotational velocity commands ωw_x_cmd and ωw_y_cmd by first computing the imaginary wheel rotational angular acceleration commands ωwdot_x_cmd and ωwdot_y_cmd, then integrating ωwdot_x_cmd and ωwdot_y_cmd by the integrator 80f.

Above is a detailed description of the processing by the posture control calculator 80.

In particular, the imaginary wheel rotational angular acceleration command ωwdot_x_cmd may be computed based on an equation obtained by separating the third element of the right side of the equation 07x to the manipulated variable component according to Vb_x_s (=K3_x·Vb_x_s) and the manipulated variable component according to Vb_x_mdfd (=K3_x·Vb_x_mdfd). Similarly, the imaginary wheel rotational angular acceleration command ωwdot_x_cmd may be computed by the equation obtained by separating the third element of the right side of the equation 07x to the manipulated variable component according to Vb_y_s (=K3_y·Vb_y_s) and the manipulated variable component according to Vb_y_mdfd (=K3_y·Vb_y_mdfd).

Further, in the present embodiment, the rotational angular acceleration commands ωw_x_cmd and ωw_y_cmd of the imaginary wheel 62_x and 62_y (was used as the operational amount (control input) for controlling the behavior of the vehicle system center of gravity. However, it is possible to use the driving torque of the imaginary wheels 62_x and 62_y or a translational force obtained by multiplying the driving torque with the radius Rw_x and Rw_y of the imaginary wheels 62_x and 62_y. Here, the translational force is the frictional force between the floor surface and the imaginary wheels 62_x and 62_y.

Returning to the description of FIG. 9, the control unit 50 next inputs the imaginary wheel rotational velocity commands ωw_x_cmd, ωw_y_end determined at the posture control calculator 80 as described above, into the motor command calculator 82, and then executes the processing of this motor command calculator 82. In this way, the velocity command ω_R_cmd of the electric motor 31R and the velocity command ω_L_cmd of the electric motor 31L are determined. The processing of this motor command calculator 82 is the same as the processing of the XY-RL converter 86b of the limiting processor 86 (see FIG. 11).

In particular, the motor command calculator 82 determines the velocity commands ω_R_cmd and ω_L_cmd of the electric motors 31R and 31L by solving the simultaneous equation of the unknowns ω_R_cmd and ω_L_cmd obtained by replacing the variables ωw_x, ωw_y, ω_R, and ω_L in the equations 01a and 01b into ωw_x_cmd, w_y_cmd, ω_R_cmd, and ω_L_cmd.

In this way, the computational processing for controlling the vehicle in step S9 is completed.

By executing the control computational process by the control unit 50 as described above, the imaginary wheel rotational angular acceleration command ωwdot_xy_cmd is determined as the operational amount (control input), so that, in both the boarding mode and the autonomous mode, the posture of the base body 9 is generally maintained so that both of the base body tilt angle deviation observed value θbe_x_s and θbe_y_s are equal to zero (this posture is hereinafter referred to as the basic posture). In other words, ωwdot_xy_cmd is maintained so that the position of the vehicle system center of gravity (the vehicle/occupant integrated center-of-gravity point or the singular vehicle body center-of-gravity point) is placed approximately right above the surface at which the wheel assembly 5 contacts the ground surface. In more detail, the imaginary wheel rotational angular acceleration command ωwdot_xy_cmd is determined so that the posture of the base body 9 is maintained at the basic posture while the center-of-gravity point velocity estimation value Vb_xy_s as the velocity of the vehicle system center of gravity is converged to the target center-of-gravity point velocity for control Vb_xy_mdfd. Incidentally, the target center-of-gravity point velocity for control Vb_xy_mdfd is normally zero (as long as the occupant, etc. does not apply an additional impellent force on the vehicle 1 in the boarding mode). In this case, the imaginary wheel rotational angular acceleration command ωwdot_xy_cmd is determined so that the posture of the base body 9 is maintained at the basic posture, and that the vehicle system center of gravity is generally static.

Further, the rotational angular velocity of the electric motors 31R and 31L, obtained by converting the imaginary wheel rotational angular velocity command ωw_xy_cmd obtained by integrating each element of ωwdot_xy_cmd, is determined as the velocity commands ω_R_cmd and ω_L_cmd of the electric motors 31R and 31L. Further, according to this velocity commands ω_R_cmd and ω_L_cmd, the rotational velocity of each of the electric motors 31R and 31L is controlled. Furthermore, the velocity of the wheel assembly 5 in the x axis direction and the y axis direction is controlled so as to match respectively the moving velocity of the imaginary wheel 62_x corresponding to ωw_x_cmd, and the moving velocity of the imaginary wheel 62_y corresponding to ωw_y_cmd.

Therefore, for example, around the y axis direction, when the actual base tilt angle θb_x deviates so as to tilt forward with respect to the target value θb_x_obj, the wheel assembly 5 moves forward so as to cancel out the deviation (i.e., so as to converge θbe_x_s to zero). Similarly, when the actual θb_x deviates so as to tilt backward with respect to the target value θb_x_obj, the wheel assembly 5 moves backward so as to cancel out the deviation (i.e., so as to converge θbe_x_s to zero).

In addition, for example, around the x axis direction, when the actual base body tilt angle θb_y deviates so as to tilt toward the right with respect to the target value θb_y_obj, the wheel assembly 5 moves toward the right so as to cancel out the deviation (i.e., so as to converge θbe_y_s to zero). Similarly, when the actual θb_y deviates so as to tilt toward the left with respect to the target value θb_y_obj, the wheel assembly 5 moves toward the left so as to cancel out the deviation (i.e., so as to converge θbe_y_s to zero).

Further, when both of the base body tilt angles θb_x and θb_y deviates respectively from the target values θb_x_obj and θb_y_obj, the movement of the wheel assembly 5 in the front and back directions for canceling out the deviation in θb_x and the movement of the wheel assembly 5 in the left and right directions for cancelling out the deviation in θb_y are combined. The wheel assembly 5 moves in the synthetic direction of the x axis direction and the y axis direction. This synthetic direction refers to a direction tilting with respect to both the x axis direction and the y axis direction.

In this way, when the base body 9 tilts with respect to the base body, the wheel assembly 5 moves in a direction towards which the base body 9 is tilting. Therefore, when, in a boarding mode for example, the occupant tilts his or her upper body intentionally, the wheel assembly 5 moves in a direction in which the tilting occurs.

Incidentally, when the target center-of-gravity point velocity for control Vb_x_mdfd and Vb_y_mdfd equals zero, and when the posture of the base body 9 converges to the basic posture, the movement of the wheel assembly 5 also halts. In addition, for example, when the tilt angle θb_x of the base body 9 in a direction around the y axis is maintained at a constant angle tilting from the basic posture, the velocity of the wheel assembly 5 in the x axis direction converges to the constant velocity corresponding to the angle. This velocity comprises a certain steady state deviation with respect to the target center-of-gravity point velocity for control Vb_x_mdfd. This characteristic applies when the tilt angle θb_y of the base body 9 around the x axis direction is maintained at a certain angle tilting from the basic posture.

In addition, for instance, when both of the required center-of-gravity point velocities Vb_x_aim and Vb_y_aim generated by the required center-of-gravity point velocity generator 74 are zero, when the amount of tilting of the base body 9 from the basic posture 9 (the base body tilt angle deviation observed value θbe_x_s and θbe_y_s) becomes relatively large, and when one or both velocities of the wheel assembly 5 in the x axis direction or the y axis direction necessary to cancel out the tilting or to maintain that amount of tilting (these velocities respectively correspond to the center-of-gravity point velocity steady state deviation estimation value Vb_x_prd and Vb_y_prd shown in FIG. 12) becomes too large so that one or both of the rotational angular velocities of the electric motors 31R, 31L will exceed the tolerable range, a velocity (in particular, Vw_x_lim2−Vb_x_prd and Vw_y_lim2−Vb_y_prd) in a direction opposite to the velocity of the wheel assembly 5 will be determined as a target center-of-gravity point velocity for control Vb_x_mdfd and Vb_y_mdfd. Furthermore, the manipulated variable components u3_x and u3_y amount the manipulated variable components comprised in the control input are determined so that the center-of-gravity point velocity estimation value Vb_x_s and Vb_y_s are respectively converged to the target center-of-gravity point velocity for control Vb_x_mdfd and Vb_y_mdfd. As a result, the base body 9 is prevented from tilting too far from the basic posture. In addition, one or both of the rotational angular velocities of the electric motors 31R, 31L is prevented from being too large.

In addition, at the gain adjusting unit 78, when one or both of the center-of-gravity point velocity estimation value Vb_x_s and Vb_y_s becomes large, and when one or both velocities of the wheel assembly 5 in the x axis direction and the y axis direction necessary to cancel out the tilting of the base body 9 from the basic posture or to maintain that amount of tilting becomes too large so that one or both of the rotational angular velocities of the electric motors 31R, 31L will exceed the tolerable range, one or both of the gain adjustment parameter Kr_x and Kr_y comes closer to 1 from 0 as the amount of the rotational angular velocity exceeding the tolerable range becomes strikingly large (in particular, as the absolute value of the Vover_x and Vover_y shown in FIG. 10 becomes large).

In this case, each of the i-th gain coefficient Ki_x (i=1, 2, 3) computed by the equation 09x becomes closer to the constant Ki_b_x at the maximum side from the constant Ki_a_x at the minimum side, as Kr_x approaches 1. This characteristic applies to each of the i-th gain coefficients Ki_y (i=1, 2, 3) computed by the equation 09y.

Further, because the absolute value of the gain coefficient becomes large, the sensitivity of the manipulated variable (the imaginary wheel rotational angular acceleration commands ωwdot_x_cmd and ωwdot_y_cmd) with respect to the change in the tilting of the base body 9 becomes high. Therefore, when the amount of tilting from the basic posture of the base body 9 becomes large, the velocity of the wheel assembly 5 will be controlled in order to swiftly resolve the large tilting. Therefore, the large tilting of the base body 9 from the basic posture is strongly restrained. Further, one or both of the velocities of the wheel assembly 5 in the x axis direction or the y axis direction is prevented from becoming too large so as to make one or both of the rotational angular velocities of the electric motors 31R, 31L deviate from the tolerant range.

Further, in the boarding mode, when the required center-of-gravity point velocity generator 74 generates a required center-of-gravity point velocity Vb_x_aim, Vb_y_aim (a required center-of-gravity point velocity such that one or both of the gravity velocities Vb_x_aim and Vb_y_aim is not "0") according to a request based on the driving operation of the occupant, the required center-of-gravity point velocities Vb_x_aim, Vb_y_aim are determined respectively as the target center-of-gravity point velocity for control Vb_x_mdfd and Vb_y_mdfd, as long as one or both of the rotational angular velocities of the electric motors 31R, 31L does not become a large rotational angular velocity so as to exceed the tolerant range (in particular, as long as Vw_x_lim2 and Vw_y_lim2 indicated in FIG. 12 respectively matches Vb_x_t and Vb_y_t). Therefore, the velocity of the wheel assembly 5 is controlled so as to attain the required center-of-gravity point velocity Vb_x_aim and Vb_y_aim (i.e., so that the actual center-of-gravity point velocity approaches the required center-of-gravity point velocities Vb_x_aim and Vb_y_aim).

Next, the processing by the required center-of-gravity point velocity generator 74 is described, which was mentioned briefly earlier.

According to the present embodiment, the required center-of-gravity point velocity generator 74 sets the required center-of-gravity point velocity Vb_x_aim and Vb_y_aim to zero as described above.

Meanwhile, when the operation mode of the vehicle 1 is in a boarding mode, the required center-of-gravity point velocity generator 74 determines the required center-of-gravity point velocity Vb_x_aim and Vb_y_aim, according to the driving operation of the vehicle 1 by the occupant and the like (i.e., an operation applying an impellent force to the vehicle 1), which is estimated to be necessary by the driving operation.

Here, for example, when the vehicle 1 is starting, and when the occupant of vehicle 1 tries to actively increase the velocity of the vehicle 1 (the velocity of the vehicle system center of gravity), an impellent force is provided by the occupant kicking the floor with his or her foot in order to increase the velocity at which the vehicle 1 moves. This impellent force is due to the frictional force between the back side of the occupant's foot and the floor. Alternatively, for example, according to the request by the occupant of vehicle 1, an outside supporter and the like may add an impellent force to the vehicle 1 in order to increase the velocity of the vehicle 1.

In this case, the required center-of-gravity point velocity generator 74 determines whether or not a request for an acceleration has been made as a request to increase the velocity of vehicle 1 based on the temporal rate of change of the magnitude (absolute value) of the actual velocity vector of the vehicle system center of gravity (hereinafter referred to as the center-of-gravity point velocity vector ↑Vb). Accordingly, the required center-of-gravity point velocity generator 74 sequentially determines the required center-of-gravity point velocity vector ↑Vb_aim as a target value of ↑Vb. Here, the required center-of-gravity point velocity vector ↑Vb_aim is a velocity vector having two elements of the required center-of-gravity point velocity Vb_x_aim and Vb_y_aim.

Describing the procedure in general terms, when the request for acceleration occurs, the required center-of-gravity point velocity vector ↑Vb_aim is determined so as to increase the magnitude of the required center-of-gravity point velocity vector ↑Vb_aim until the acceleration request is met. Further, when the acceleration request is met, the required center-of-gravity point velocity vector ↑Vb_aim is determined so that the magnitude of the required center-of-gravity point velocity vector ↑Vb_aim is reduced in series. In this case, according to the present embodiment, the magnitude of the required center-of-gravity point velocity vector ↑Vb_aim is basically held constant for a predetermined amount of time after the request for acceleration is met. Then, the magnitude of the required center-of-gravity point velocity vector ↑Vb_aim is thereafter diminished continuously to zero. Incidentally, during this diminishing phase, the direction of the required center-of-gravity point velocity vector ↑Vb_aim approaches the x axis direction where appropriate.

The required center-of-gravity point velocity generator 74, performing the procedures described above, is described in detail below with reference to the flow chart FIG. 14-20.

Figure 14:
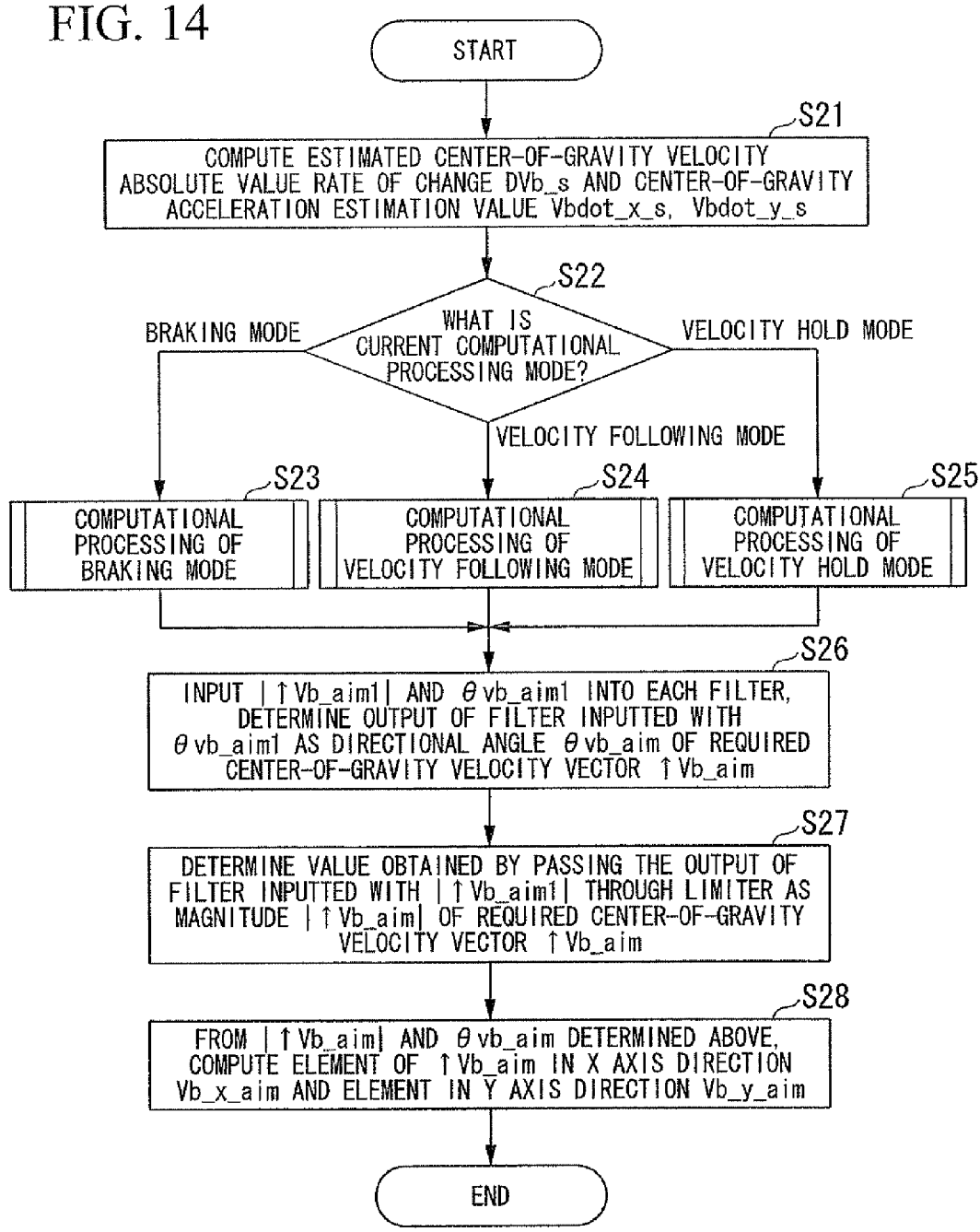
FIG. 14 is a flowchart showing a processing of a required center-of-gravity point velocity generator 74 shown in FIG. 9.

Referring to FIG. 14, the required center-of-gravity point velocity generator 74 first executes the procedure in step S21. According to this procedure, the required center-of-gravity point velocity generator 74 computes a temporal rate of change (differential value) $DVb\_s$ of the magnitude $|\uparrow Vb\_s|$ $(= \operatorname{sqrt}(Vb\_x\_s^2 + Vb\_y\_s^2))$ of the estimated center-of-gavity point velocity vector ↑Vb_s, which is a velocity vector having the inputted center-of-gravity point velocity estimation values Vb_x_s and Vb_y_s as two components (the observed value of the actual center-of-gravity point velocity vector ↑Vb). This DVb_s refers to the observed value of the temporal rate of change of the magnitude of the actual center-of-gravity point velocity vector ↑Vb (estimation value). Hereafter, DVb_s is referred to as the estimated center-of-gravity point velocity absolute value rate of change DVb_s. Incidentally, the notation sqrt( ) refers to a square root function.

Further, in step S21, the required center-of-gravity point velocity generator 74 computes a center-of-gravity point acceleration estimation value Vbdot_x_s and Vvdot_y_s, which is a temporal rate of change (differential value) of each of the center-of-gravity point velocity estimation values Vb_x_s and Vb_y_s which is inputted. Incidentally, the vector comprising the two elements Vbdot_x_s and Vbdot_y_s refers to an actual observed value of the acceleration vector of the center-of-gravity point of the vehicle system.

Next, moving on to step S22, the required center-of-gravity point velocity generator 74 determines which mode the current computational processing mode is for computing the required center-of-gravity point velocity Vb_x_aim.

Here, according to the present embodiment, the required center-of-gravity point velocity generator 74 determines the required center-of-gravity point velocity vector ↑Vb_aim, after determining the base value of the required center-of-gravity point velocity vector ↑Vb_aim (hereinafter may be referred to as the base body required center-of-gravity point velocity vector ↑Vb_aim1), so that the required center-of-gravity point velocity vector ↑Vb_aim follows the base required center-of-gravity point velocity vector ↑Vb_aim1 (i.e., so that the required center-of-gravity point velocity vector ↑Vb_aim steadily matches with the base required center-of-gravity point velocity vector ↑Vb_aim1).

The computation processing mode represents a type of procedure for determining the base required center-of-gravity point velocity vector ↑Vb_aim1. Further, according to the present embodiment, the computational processing mode includes three kinds of modes: the braking mode, the velocity following mode, and the velocity hold mode.

The braking mode is a mode such that the magnitude of the base required center-of-gravity point velocity vector ↑Vb_aim1 is diminished to "0," or the ↑Vb_aim1 is determined so as to keep the magnitude to zero. Further, the velocity following mode is a mode such that the base required center-of-gravity point velocity vector ↑Vb_aim1 is determined to follow the estimated center-of-gravity point velocity vector ↑Vb_s. Further, the velocity hold mode is a mode such that ↑Vb_aim1 is determined so as to keep the magnitude of the base required center-of-gravity point velocity vector ↑Vb_aim1.

Incidentally, the computational processing mode (initial computational processing mode) when the control unit 50 is initialized during a start up of the control unit 50 is the braking mode.

In the step S22 above, the required center-of-gravity point velocity generator 74 next performs the computational processing of step S23, the computational processing of step S24, and the computational processing of step S25 in respectively the cases in which the current computational processing mode is a braking mode, velocity following mode, and a velocity hold mode. In this way, the required center-of-gravity point velocity generator 74 determines the base required center-of-gravity point velocity vector ↑Vb_aim1.

The computational process corresponding to each mode is executed as follows.

Figure 15:
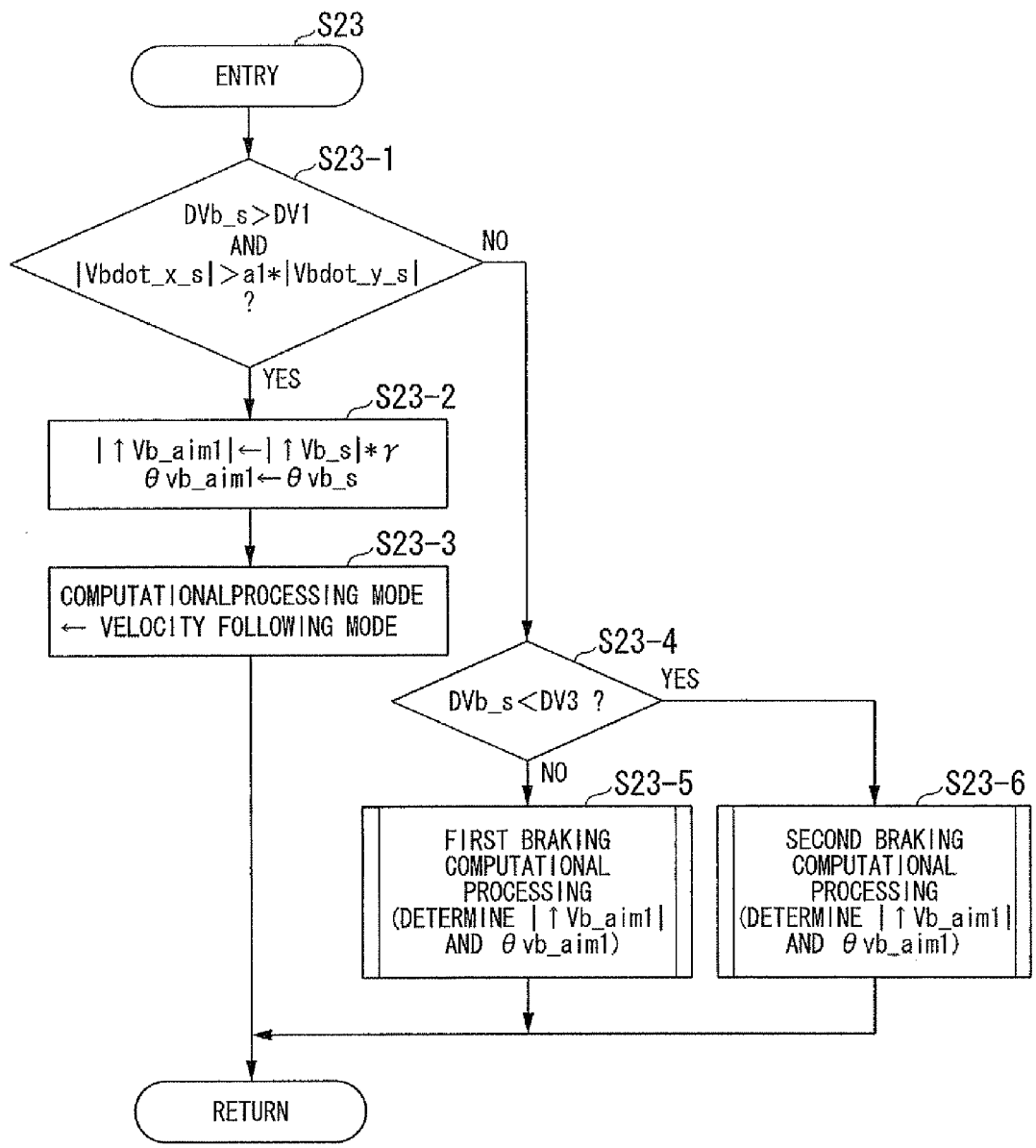
FIG. 15 is a flowchart showing a subroutine of a processing in step S23 shown in FIG. 14.

The computational process of the braking mode in the step S23 is executed as indicated in the flowchart of FIG. 15. In particular, regarding the center-of-gravity point acceleration estimation value Vbdot_x_s, Vbdot_y_s and the estimated center-of-gravity point velocity absolute value rate of change DVb_s computed in the step S21, the required center-of-gravity point velocity generator 74 first determines in the step 23-1 whether or not the conditions DVb_s>DV1 and |Vbdotx_s1>a1*|Vbdot_y_s1. This decision process is a procedure determining whether or not there is an acceleration request to increase the velocity of the vehicle 1 in the approximately fore-and-aft direction of the vehicle.

Here, DV1 is a first threshold value DV1(>0) of the predetermined positive value. Further, DVb_s>DV1 indicates that the actual magnitude |↑Vb| of the center-of-gravity point velocity vector ↑Vb is increasing at a greater temporal rate of change compared to the first threshold value.

In addition, a1 is a predetermined positive coefficient. Further, |Vbdot_x_s|>a1*|Vbdot_y_s| indicates that the actual acceleration vector of the vehicle system center of gravity comprises an element in the x axis direction which is not zero, and that the angle (=tan$^{-1}$(|Vbdot_y_s|/|Vbdot_x_s|) at the acute angle side with respect to the x axis direction of the acceleration vector is closer to "0" compared to a predetermined angle (=tan$^{-1}$(1/a1)). According to the present embodiment, a1 is set to be, for example, equal to "1" or a value close to "1."

Therefore, in a condition in which the determination result of the step S23-1 becomes positive, an occupant or an external supporter is performing a controlling action to increase the magnitude of the center-of-gravity point velocity vector ↑Vb in generally the fore-and-aft direction. This controlling action adds an impellent force to the vehicle 1 in generally the fore-and-aft direction.

When the determination result of the step S23-1 is negative, i.e., when there is no request to accelerate the vehicle 1 (i.e., the request to accelerate the vehicle 1 in generally the fore-and-aft direction), the required center-of-gravity point velocity generator 74 next executes the determination procedure in step S23-4.

In the determination procedure in step S23-4, the required center-of-gravity point velocity generator 74 determines whether or not the estimated center-of-gravity point velocity absolute value rate of change DVb_s computed in step S21 is less than a predetermined negative third threshold value DV3 (<0). According to this determination process, it is determined whether or not a request for deceleration has been made, i.e., whether the occupant of the vehicle 1 has actively tried to reduce the magnitude of the center-of-gravity point velocity vector ↑Vb. In this case, the determination result of step S23-4 becomes positive when the occupant of the vehicle 1 has intentionally placed his or her foot on the ground, thereby creating a frictional force in the braking direction of the vehicle 1 between the occupant's foot and the floor.

Further, when the determination result of step S23-4 is negative (i.e., when the request for deceleration has not occurred), the required center-of-gravity point velocity generator 74 executes a first braking computational process in step S23-5, thereby determining the magnitude |↑Vb_aim1| of the base required center-of-gravity point velocity vector ↑Vb_aim1 (hereinafter, referred to as the base required center-of-gravity point velocity vector absolute value |↑Vb_aim1|) and the directional angle θvb_aim1 (hereinafter referred to as the base required center-of-gravity point velocity vector directional angle θvb_aim1), thereby completing the processing shown in FIG. 15. In addition, when the determination result of the step S23-4 is positive (i.e., when a request for deceleration has occurred), the required center-of-gravity point velocity generator 74 executes a second braking computational processing in step S23-6, determines a base required center-of-gravity point velocity vector absolute value |↑Vb_aim1| and the base required center-of-gravity point velocity vector directional angle θvb_aim1, thereby completing the processing shown in FIG. 15.

Incidentally, according to the present embodiment, the base required center-of-gravity point velocity vector directional angle θvb_aim1 is defined as an angle (−180°≤θvb_aim≤180°) satisfying sin(θvb_aim1)=Vb_x_aim1/|↑Vb_aim1|, cos(θvb_aim1)=Vb_y_aim1/|↑Vb_aim1|. When |↑Vb_aim1|=0, it is assumed that θVb_aim=0°.

Figure 16:
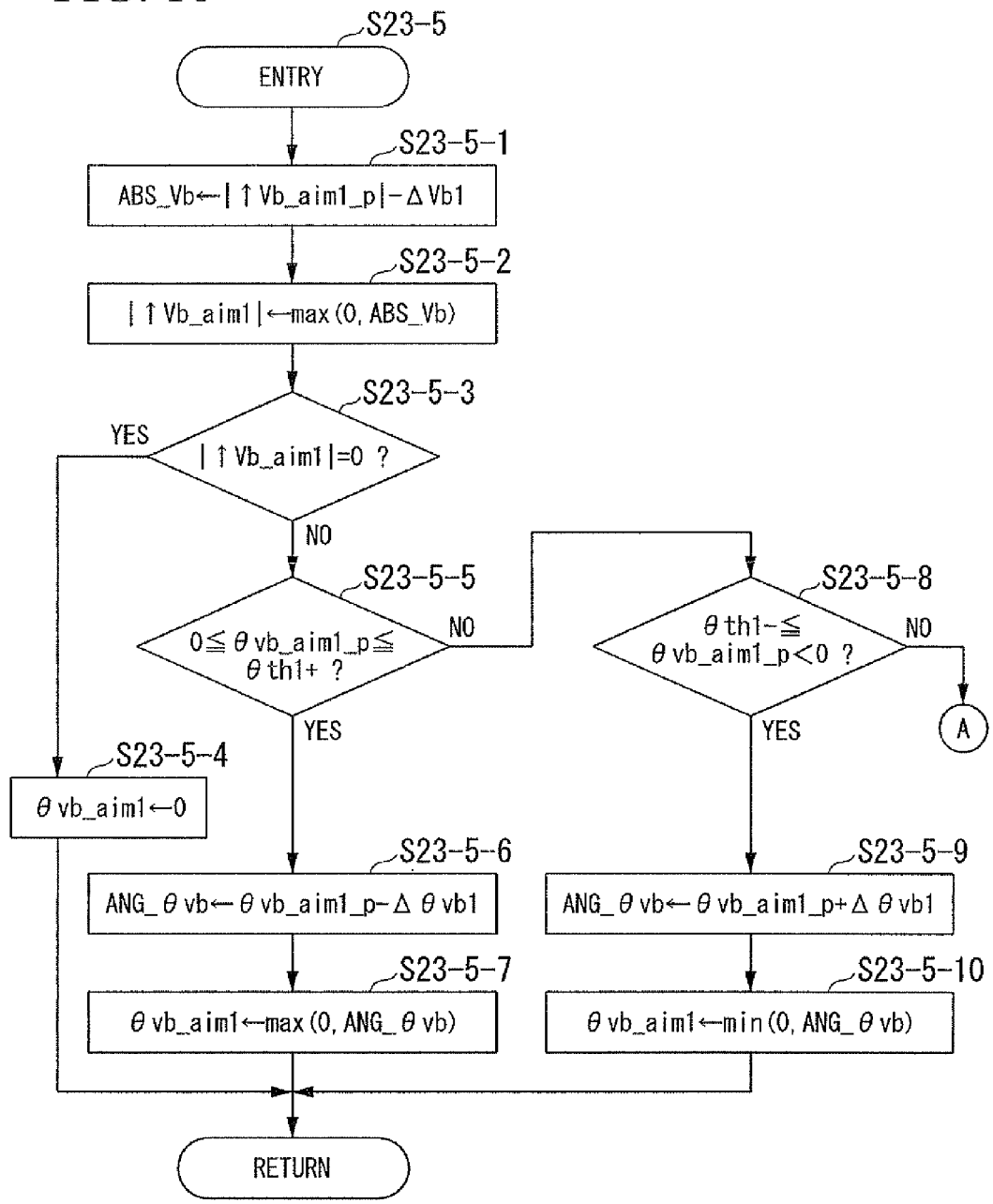
FIG. 16 is a flowchart showing a subroutine of a processing in step S24 shown in FIG. 14.

The first braking computational process of the step S23-5 is executed as shown in the flowcharts in FIG. 16 and FIG. 17.

According to this first braking computational process, the required center-of-gravity point generator 74 outputs a value obtained by subtracting a predetermined positive value ΔVb1 from the previous value |↑Vb_aim_p| of the base required center-of-gravity point velocity vector absolute value |↑Vb_aim1| in step S23-5-1 as the candidate value ABS_Vb of |↑Vb_aim1|. ΔVb1 is a predetermined value prescribing the amount of decrease (and the temporal rate of change of |↑Vb_aim1|) of |↑Vb_aim1| for each control processing period.

Next, in the step S23-5-2, the required center-of-gravity point velocity generator 74 determines the greater value max (0, ABS_Vb) of the candidate value ABS_Vb and 0 as the current value of |↑Vb_aim1|. Therefore, when ABS_Vb≥0, ABS_Vb is determined as the current value of |↑Vb_aim1|. When ABS_Vb<0, the current value of |↑Vb_aim1| is set to be zero.

Next, in step S23-5-3, the required center-of-gravity point velocity generator 74 determines whether or not the |↑Vb_aim1| determined as described above is zero. When this determination result is positive, the required center-of-gravity point velocity generator 74 next sets the current value of θvb_aim1 to 0° in step S23-5-4, thereby completing the procedure in FIG. 16.

When the determination result of step S23-5-3 is negative, the required center-of-gravity point velocity generator 74 determines the current value of θvb_aim1 by the processing by step S23-5-5 according to whether or not the pervious value θvb_aim1_p of θvb_aim1 is within either of the ranges of 0≤θvb_aim1_p≤θth1+, θth1−≤θvb_aim1_p<0°, θth2+≤θvb_aim1_p≤180°, −180°≤θvb_aim1_p≤θth2−, θth1+<θvb_aim1_p<θth2+, θth−<θvb_aim1_p<θth1−.

Here, θth1+ is a predetermined positive directional angle threshold value between 0° and 90°. θth1− is a predetermined negative directional angle threshold value between 0° and −90°. θth2+ is a predetermined positive directional angle threshold value between 90° and 180°. θth2− is a predetermined positive directional angle threshold value between −90° and −180°. According to the present embodiment, θth1+ and θth1− are set so that the absolute values of θth1+ and θth1− is equal to be, for example, 45° or an angle close to 45°. Further, θth2+ and θth2− are set so that the absolute values of θth2+ and θth2− is equal to be, for example, 135° or an angle close to 135°. Incidentally, the difference between θth1+ and θth1− (=(θth1+)−(θth1−)) and the difference between θth2+ and θth2− (=(θth2+)−(θth2−)) need not be equal.

The procedure from step S23-5-5 is executed as described below. In other words, in step S23-5-5, the required center-of-gravity point velocity generator 74 determines whether or not the inequality 0°≤θvb_aim1_p≤θth1+ holds. When this determination result is positive, the required center-of-gravity point velocity generator 74 computes in step S23-5-6, a value obtained by subtracting a predetermined positive value Δθvb1 from the previous value θvb_aim1_p of θvb_aim1 as the candidate value ANG_Vb of θvb_aim1. Δθvb1 is a predetermined value prescribing the variation of θvb_aim1 (and the temporal rate of change of θvb_aim1) for each control processing period.

Further, in step S23-5-7, the required center-of-gravity point velocity generator 74 determines the greater angular value max (0, ANG_Vb) of the candidate value ANG_Vb and 0° as the current value of θvb_aim1, and thereby completes the processing shown in FIG. 16. Therefore, when ANG_Vb≥0°, ANG_Vb is determined as the current value of θvb_aim1. Meanwhile, when ANG_Vb<0°, the current value of θvb_aim1 becomes 0°.

When the determination result of step S23-5-5 is negative, the required center-of-gravity point velocity generator 74 determines in step S23-5-8 whether or not the inequality θth1−≤θvb_aim1_p<0° holds. When this determination result is positive, the required center-of-gravity point velocity generator 74 computes in step S23-5-9 computes a value obtained by increasing the previous value θvb_aim1_p of θvb_aim1 by the predetermined value Δθvb1 as the candidate value ANG_Vb of θvb_aim1.

Further, in step S23-5-10, the required center-of-gravity point velocity generator 74 determines the smaller angular value min (0, ANG_Vb) of the candidate value ANG_Vb and 0° as the current value of θvb_aim1, thereby completing the procedure shown in FIG. 16. Therefore, when ANG_Vb≤0°, ANG_Vb is determined as the current value of θvb_aim1. When ANG_Vb>0°, the current value of θvb_aim1 is 0°.

When the determination result of step S23-5-8 is negative, the requesting center-of-gravity point velocity generator 74 determines in step S23-5-11 in FIG. 17 whether or not the inequality θth2+≤θvb_aim1_p≤180° holds. When the determination result is positive, the required center-of-gravity point velocity generator 74 computes in step S23-5-12 a value obtained by increasing the previous value θvb_aim1_p of θvb_aim1 by the predetermined value Δθvb1 as the candidate value ANG_Vb of θvb_aim1.

Further, in step S23-5-13, the required center-of-gravity point velocity generator 74 determines the smaller angular value min (180, ANG_Vb) of the candidate value ANG_Vb and 180° as the current value of θvb_aim1, thereby completing the procedure shown in FIG. 17. Therefore, when ANG_Vb≤180°, ANG_Vb is determined as the current value of θvb_aim1. When ANG_Vb>180°, the current value of θvb_aim1 is 180°.

When the determination result of step S23-5-11 is negative, the requesting center-of-gravity point velocity generator 74 next determines in step S23-5-14 whether or not the inequality −180°≤θvb_aim1_p≤θth2− holds. When the determination result is positive, the required center-of-gravity point velocity generator 74 computes in step S23-5-15 a value obtained by decreasing the previous value θvb_aim1_p of θvb_aim1 by the predetermined value Δθvb1 as the candidate value ANG_Vb of θvb_aim1.

Further, in step S23-5-16, the required center-of-gravity point velocity generator 74 determines the greater angular value max (180, ANG_Vb) of the candidate value ANG_Vb and −180° as the current value of θvb_aim1, and thereby completes the processing shown in FIG. 17. Therefore, when ANG_Vb≥−180°, ANG_Vb is determined as the current value of θvb_aim1. Meanwhile, when ANG_Vb<−180°, the current value of θvb_aim1 becomes −180°.

When the determination result of step S23-5-14 is negative, i.e., when the inequality θth1+<θvb_aim1_p<θth2+ or θth2−<θvb_aim1_p<θth1− holds, the required center-of-gravity point velocity generator 74 determines in step S23-5-17 the current value of θvb_aim1 as the same value as the previous value θvb_aim1_p, and thereby completes the processing shown in FIG. 17.

Above are the details of the first braking computational processing in step S23-5.

Figure 18:
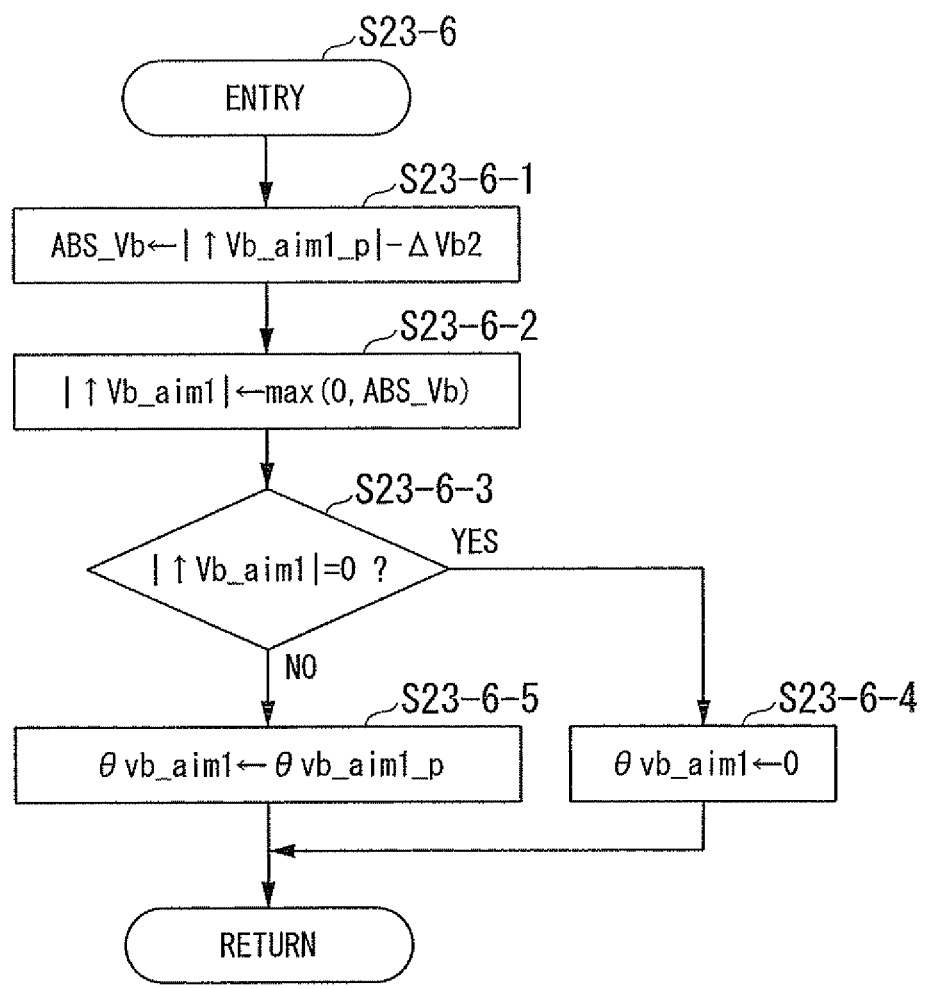
FIG. 18 is a flowchart showing a second control computation processing in step S23 shown in FIG. 14.

Meanwhile, the second braking computational processing in step S23-6 is executed as indicated in the flowchart shown in FIG. 18.

According to this second braking computational processing, the required center-of-gravity point velocity generator 74 first computes in step S23-6-1 a value obtained by subtracting a predetermined positive value ΔVb2 from the previous value |↑Vb_aim_p| of the base required center-of-gravity point velocity vector absolute value |↑Vb_aim1| as the candidate value ABS_vb of |↑Vb_aim1|. ΔVb2 is a predetermined value prescribing the decrease amount of |↑Vb_aim1| (i.e., the temporal rate of change of |↑Vb_aim1|) for each control processing period in the second braking computational processing. In this case, ΔVb2 is set to be a value larger than the predetermined value ΔVb1 used in the first braking computational process.

Next, in step S23-6-2, the required center-of-gravity point velocity generator 74 executes the same processing as in step S23-5-2, and determines the greater value max (0, ABS_Vb) of the candidate value ABS_Vb and 0 computed in step S23-6-1 as the current value of |↑Vb_aim1|.

Next, the required center-of-gravity point velocity generator 74 determines in step S23-6-3 whether or not |↑Vb_aim1| determined as described above is zero. When this determination result is positive, the required center-of-gravity point velocity generator 74 next sets the current value of θvb_aim1 to zero in step S23-6-4, thereby completing the processing of FIG. 18.

Further, when the determination result of step S23-6-3 is negative, the required center-of-gravity point velocity generator 74 next sets the current value of θvb_aim1 to the same value as the previous value θvb_aim1_p in step S23-6-5, and thereby completes the processing in FIG. 18.

Above are details of the second braking computational processing in step S23-6.

Returning to the description in FIG. 15, when the determination result of the step S23-1 is positive, i.e., when there is an acceleration request of the vehicle 1 in generally the fore-and-aft direction, the required center-of-gravity point velocity generator 74 determines in step S23-2, the base required center-of-gravity point velocity vector absolute value |↑Vb_aim1| and the base required center-of-gravity point velocity vector directional angle θvb_aim1. The required center-of-gravity point velocity generator 74 alters the computational processing mode in step S23-3 from the braking mode to the velocity following mode, thereby completing the processing of FIG. 15.

In step S23-2, in particular, the value obtained by multiplying the predetermined ratio γ to the magnitude |↑Vb_s| (=sqrt (Vb_x_s$^2$+Vb_y_s$^2$)) of the estimated center-of-gravity point velocity vector ↑Vb_s (current value) is determined as the base required center-of-gravity point velocity vector absolute value |↑Vb_aim1↑. According to the present embodiment, the ratio γ is set to be a positive value which is slightly smaller than "1" such as 0.8.

Further, in step S23-2, the directional angle θvb_s (=sin$^{-1}$ (Vb_x_s/|↑Vb_s|)) of the estimated center-of-gravity point velocity vector ↑Vb_s is determined to be the base required center-of-gravity point velocity vector directional angle θvb_aim1. Therefore, in step S23-2, consequently, a vector obtained by multiplying the ratio γ with the estimated center-of-gravity point velocity vector ↑Vb_s is determined as the base required center-of-gravity point velocity vector ↑Vb_aim1.

Such a processing in step S23-2 matches the way in which |↑Vb_x_aim1| and θvb_aim1 is determined with the velocity following mode which starts from the next controlling processing cycle.

Incidentally, it is not necessary that the ratio γ be slightly smaller than "1." For example, the ratio γ may be set to "1" or to a value slightly larger than "1." According to the present embodiment, the value of the ratio γ is set to be a value slightly smaller than "1" in order to prevent the velocity of the vehicle 1 that the occupant physically feels (in a sensory aspect) is recognized as if it is larger than the actual velocity.

Above is the computational processing of the braking mode in step S23.

Incidentally, when the determination result of step S23-1 is negative, the computational processing mode is not altered. Therefore, in the next control processing cycle, the computational processing mode is maintained to be the braking mode.

Figure 19:
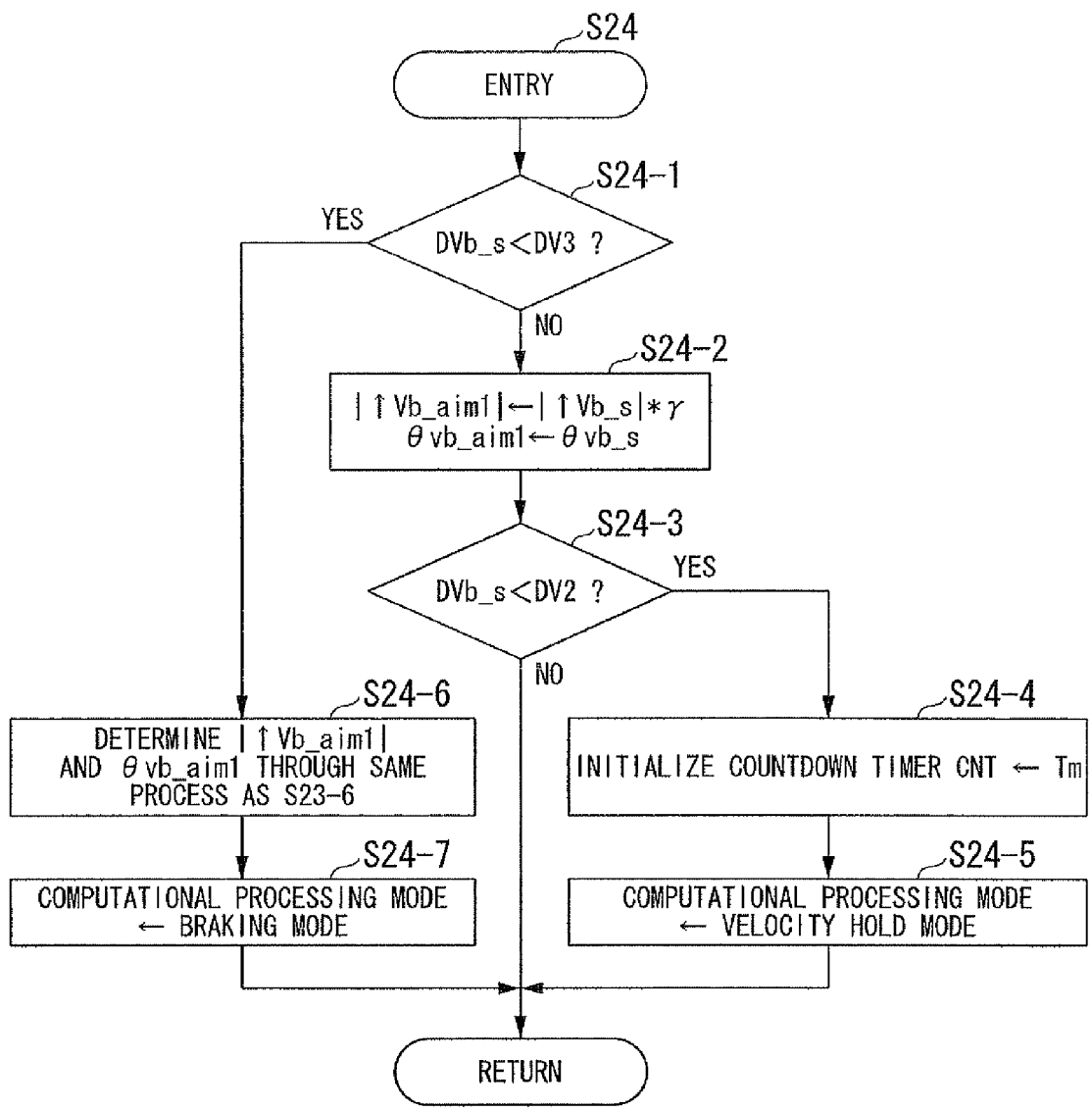
FIG. 19 is a flowchart showing a computational processing in a velocity following mode in step S24 shown in FIG. 14.

Next, the computational processing of the velocity following mode in step S24 is executed as indicated in the flowchart in FIG. 19. In particular, the required center-of-gravity point velocity generator 74 first performs in step S24-1, the same determination processing as step S23-4. In other words, the required center-of-gravity point velocity generator 74 executes a process determining whether or not a deceleration request of the vehicle 1 has been made.

When this determination result is positive, the required center-of-gravity point velocity generator 74 next executes in step S24-6, the same processing as step S23-6 (i.e., the processing shown in the flowchart in FIG. 18), thereby determining the base required center-of-gravity point velocity vector absolute value |↑Vb_aim1| and the base required center-of-gravity point velocity vector directional angle θvb_aim1. Further, the required center-of-gravity point velocity generator 74 changes, in step S24-7, the computational processing mode from the velocity following mode to the braking mode, thereby completing the processing in FIG. 19.

Meanwhile, when the determination result of the step S24-1 is negative, i.e., when the deceleration request of the vehicle 1 has not occurred, the required center-of-gravity point velocity generator 74 next executes the processing in step S24-2. In step S24-2, the required center-of-gravity point velocity generator 74 executes the same procedure as the step S23-2, and thereby determines the base required center-of-gravity point velocity vector absolute value |↑Vb_aim1| and the base required center-of-gravity point velocity vector directional angle θvb_aim1. In other words, |↑Vb_x_s|*γ is determined as |↑Vb_aim1|, and θvb_s is determined as θvb_aim1.

Next, in step S24-3, the required center-of-gravity point velocity generator 74 determines whether or not the estimated center-of-gravity point velocity absolute value rate of change DVb_s (the value computed in step S21) is smaller than the second threshold value DV2, which is predetermined. According to the present embodiment, this second predetermined value DV2 is set to be a negative predetermined value which is larger than the third threshold value DV3 (i.e., being closer to 0 compared to DV3). Incidentally, the second threshold value DV2 may be set to be "0" or to a positive value slightly larger than "0." At the same time, however, DV2 is a value smaller than the first threshold value DV1.

The processing in step S24-3 determines the timing with which the velocity following mode is transferred to the velocity hold mode. Further, when the determination result of step S24-3 is negative, the required center-of-gravity point velocity generator 74 terminates the process shown in FIG. 19. In this case, the computational processing mode is not altered. Therefore, in the next control processing period, the computational processing mode is maintained to be the velocity following mode.

Further, when the determination result of step S24-3 is positive, the required center-of-gravity point velocity generator 74 regards the acceleration request of vehicle 1 to be met. Thus, the required center-of-gravity point velocity generator 74 initiates the countdown timer in step S24-4. Further, in step S24-5, the required center-of-gravity point velocity generator 74 changes the computational processing mode from the velocity following mode to the velocity hold mode, thereby completes the processing in FIG. 19.

The countdown timer is a timer measuring the amount of time that has passed since the start of the velocity hold mode beginning from the next control processing period. Further, in step S24-4, a predetermined initial value Tm is set to the measured time value CNT of this timer. The initial value Tm_x refers to a set value of time during which the velocity hold mode is to be continued.

Above is the computational processing of the velocity following mode in step S24.

Figure 20:
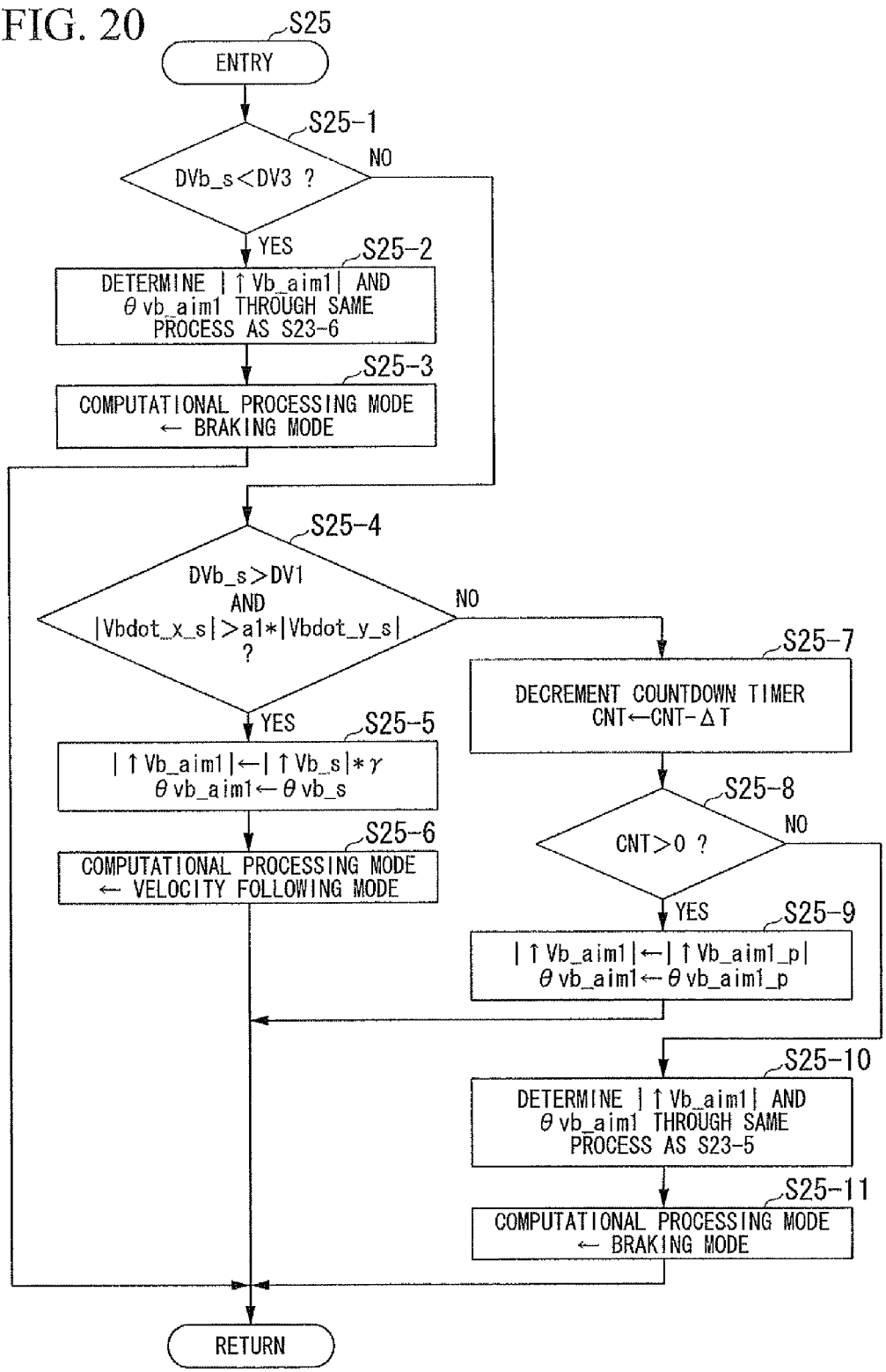
FIG. 20 is a flowchart showing a computational processing in a velocity holding mode in step S25 shown in FIG. 14.

Next, the computational processing of the velocity hold mode in step S25 is executed as indicated in the flowchart shown in FIG. 20. In particular, in step S25-1, the required center-of-gravity point velocity generator 74 first performs the same decision process as in step S23-4. In other words, the required center-of-gravity point velocity generator 74 executes a process determining whether or not a deceleration request of the vehicle 1 has been made.

When the determination result of the step S25-1 is positive (i.e., when a deceleration request of the vehicle 1 has occurred), the required center-of-gravity point velocity generator 74 next executes, in step S25-2, the same procedure as in step S23-6 (i.e., the procedure shown in the flowchart in FIG. 18). As a result, the required center-of-gravity point velocity generator 74 determines the base required center-of-gravity point velocity vector absolute value |↑Vb_aim1| and the base required center-of-gravity point velocity vector directional angle θvb_aim1. Furthermore, the required center-of-gravity point velocity generator 74 changes, in step S25-3, the computational processing mode from the velocity hold mode to the braking mode, thereby completing the processing of FIG. 20.

Meanwhile, when the determination result of step S25-1 is negative (i.e., when a deceleration request of the vehicle 1 has not occurred), the required center-of-gravity point velocity generator 74 executes in step S25-4, the same determination process as step S23-1, determining whether or not there is an acceleration request of the vehicle 1 in roughly the fore-and-aft direction.

When the determination result of the step S25-4 is positive (i.e., when an acceleration request of the vehicle 1 has occurred again in generally the fore-and-aft direction), the required center-of-gravity point velocity generator 74 executes, in step S25-5, the same procedure as in step S23-2. As a result, the required center-of-gravity point velocity generator 74 determines the base required center-of-gravity point velocity vector absolute value |↑Vb_aim1| and the base required center-of-gravity point velocity vector directional angle θvb|↑Vb_aim1. Thus, |↑Vb_x_s|*γ is determined as |↑Vb_aim1|, and θvb_s is determined as θvb_aim1.

Further, the required center-of-gravity point velocity generator 74 changes in step S25-6, the computational processing mode from the velocity hold mode to the velocity following mode, thereby completing the procedure shown in FIG. 20.

When the determination result of step S25-4 is negative (i.e., when there remains to be no acceleration request in generally the fore-and-aft direction), the required center-of-gravity point velocity generator 74 decrements in step S25-7, the measured time value CNT of the countdown timer. In other words, the required center-of-gravity point velocity generator 74 updates the measured time value CNT by subtracting a predetermined value ΔT (the time of the control processing period) from the present value of the measured time value CNT.

Next, the required center-of-gravity point velocity generator 74 determines in step S25-8 whether or not the measured time value CNT of the countdown timer is greater than zero, i.e., whether or not the time measurement by the countdown timer has completed.

When the determination result of step S25-8 is positive, the amount of time represented by the initial value Tm of the countdown timer has not yet passed since the velocity hold mode has started. In this case, the required center-of-gravity point velocity generator 74 maintains the computational processing mode to the velocity hold mode by determining the base required center-of-gravity point velocity vector absolute value |↑Vb_aim1| and the base required center-of-gravity point velocity directional angle θvb_aim1 in step S25-9, thereby completing the processing of FIG. 20.

In this case, in step S25-9, the current value of |↑Vb_aim1| is determined to be the same value as the previous value |↑Vb_aim1_p|. Further, the current value of θvb_aim1 is determined to be the same value as the previous value θvb_aim1_p. Therefore, the previous value of the base required center-of-gravity point vector ↑Vb_aim1_p is determined as the velocity vector of the current value of ↑Vb_aim1.

Incidentally, when the determination result of step S25-8 is positive, the computational processing mode is not renewed. Therefore, in the next control processing period, the computational processing mode is maintained to be the velocity hold mode.

When the determination result of the step S25-8 is negative, i.e., when a predetermined amount of time represented by the initial value Tm of the countdown timer has passed since the velocity hold mode has started, the required center-of-gravity point velocity generator 74 performs in step S25-10 the same processing as in step S23-5 (i.e., the processing shown in the flowchart of FIGS. 16 and 17), thereby determining the base required center-of-gravity point velocity vector absolute value |↑Vb_aim1| and the base required center-of-gravity point velocity directional angle θvb_aim1.

Further, the required center-of-gravity point velocity generator 74 changes in step S25, the computational processing mode from the velocity hold mode to the braking mode, thereby completing the processing shown in FIG. 20.

Above is the computational processing of the velocity hold mode in step S25.

Returning to the description in FIG. 14, the required center-of-gravity point velocity generator 74 executes one of the computational processes steps S23-25 as described above, and thereafter executes a process in step S26 (i.e., a filtering process) inputting each of the |↑Vb_aim1| and θvb_aim1 determined in the computational process.

Here, the filter inputting |↑Vb_aim1| and θvb_aim1 is a first delay characteristic low pass filter in order to prevent the magnitude |↑Vb_aim| of the required center-of-gravity point velocity vector ↑Vb_aim and the directional angle θvb_aim suddenly changes to a step form immediately after the computational processing mode is changed from the braking mode to the velocity following mode. In this case, the time constant of the filter inputting |↑Vb_aim| is set to a relatively short time constant. In a condition other than a sudden change in |↑Vb_aim1|, the output value of the filter matches or approximately coincides with |↑Vb_aim1|. This characteristic applies to a filter inputting θvb_aim1 as well.

Further, in step S26, the output value of the filter inputting θvb_aim1 is determined as the directional angle θvb_aim of the required center-of-gravity point velocity vector ↑Vb_aim (hereinafter, the required center-of-gravity point velocity vector directional angle θvb_aim).

Next, the procedure moves on to step S27. The required center-of-gravity point velocity generator 74 finally determines the value obtained by passing the output value of the filter inputted with |↑Vb_aim1| through the limiter as the magnitude |↑Vb_aim| (hereinafter referred to as the required center-of-gravity point velocity vector absolute value |↑Vb_aim|) of the required center-of-gravity point velocity vector ↑Vb_aim. In this case, the limiter prevents |↑Vb_aim| from being too large. When the output value of the filter inputted with |↑Vb_aim| is less than or equal to a predetermined upper limit value, the output value of this filter is outputted as |↑Vb_aim|. In addition, when the output value of the filter exceeds the upper limit value, the limiter outputs the upper limit value as |↑Vb_aim|. In other words, the limiter outputs the smaller value of the output value of the filter and the upper limit value as |↑Vb_aim|.

Next, the procedure moves on to step S28. From |↑Vb_aim| and θvb_aim determined as described above, the required center-of-gravity point velocity generator 74 computes the element of the required center-of-gravity point velocity vector ↑Vb_aim in the x axis direction Vb_x_aim (i.e. the required center-of-gravity point velocity in the x axis direction) and the element in the y axis direction Vb_y_aim (the required center-of-gravity point velocity in the y axis direction). In further detail, |↑Vb_aim|*sin (θvb_aim) is computed as Vb_x_aim, and |↑Vb_aim|*cos (θvb_aim) is computed as Vb_y_aim.

Above are the details of the processing of the required center-of-gravity point velocity generator 74.

Due to the processing by the required center-of-gravity point velocity generator 74 described above, the required center-of-gravity point velocity vector ↑Vb_aim (thus, the required center-of-gravity point velocity Vb_x_aim, Vb_y_aim) is determined according to an embodiment described below.

In other words, for example, in order to increase the velocity of the vehicle 1, suppose an impellent force in the x axis direction (in particular, an impellent force such that the determination result of step S23-1 becomes positive) is applied to the vehicle 1 by the occupant kicking the floor with the back side of his or her foot or by a supporter and the like pushing the vehicle 1.

Incidentally, the computational processing mode before applying the impellent force is assumed to be the braking mode. In addition, to facilitate the reader's understanding in this case, the output value of the filter inputting |↑Vb_aim1| in step S26 in FIG. 14 is assumed to be a value contained within a range so that a compulsory limitation by the limiter in step S27 is not applied. In other words, the output value is assumed to be a value less than or equal to the upper limit of the limiter. As the same time, the center-of-gravity point velocity estimation values Vb_x_s and Vb_y_s are contained within a range such that a compulsory limitation is not applied to the output values V_x_lim2 and V_y_lim2 in the limiting processor 104.

In this case, when the determination result of step S23-1 becomes positive by applying an impellent force to the vehicle 1, the processing in step S23-3 shown in FIG. 15 changes the computational processing mode from the braking mode to the velocity following mode.

In the velocity following mode, in a condition such that a deceleration request does not occur (i.e., in a condition in which the determination result of step S24-1 is negative), a vector obtained by multiplying a predetermined ratio γ to the current value (i.e., present value) of the estimated center-of-gravity point velocity vector ↑Vb_s is determined as the base required center-of-gravity point velocity vector ↑Vb_aim1. This vector obtained by multiplying a predetermined ratio γ to the current value (i.e., present value) of the estimated centerof-gravity point velocity vector ↑Vb_s is a velocity vector such that the magnitude is slightly smaller than the magnitude of ↑Vb_s and the direction is the same as ↑Vb_s.

Therefore, the required center-of-gravity point velocity vector ↑Vb_aim determined successively by the required center-of-gravity point velocity generator 74 is determined so as to follow the velocity vector ↑Vb_aim1 (=γ*↑Vb_s) which matches approximately the actual center-of-gravity point velocity vector ↑Vb which increases in size due to the impellent force applied to the vehicle 1.

The element in the x axis direction and the element in the y axis direction of the required center-of-gravity point velocity vector ↑Vb_aim determined as described above is determined to be the target center-of-gravity point velocity for control Vb_x_mdfd and Vb_y_mdfd. Further, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, the velocity of the wheel assembly 5 is controlled so that the increase in the actual velocity of the vehicle system center of gravity due to the impellent force applied to the vehicle 1 by the occupant (i.e., the increase in velocity in generally the fore-and-aft direction) is swiftly executed in response to the request based on the impellent force. Therefore, the vehicle 1 accelerates smoothly due to the applied impellent force.

Further, in the velocity following mode, when the determination result of step S24-1 in FIG. 19 becomes positive (i.e., a deceleration request occurs) due to the application of the braking force to the vehicle 1, the computational processing mode changes to the braking mode. As a result, the velocity of the vehicle 1 decreases in this case, while the deceleration request is occurring, |↑Vb_aim1| and θvb_aim1 are determined by the second braking computational processing (the processing in FIG. 18) of step S23-6. As a result, the base required center-of-gravity point velocity vector ↑Vb_aim1, or a required center-of-gravity point velocity vector ↑Vb_aim following ↑Vb_aim1 are determined so that the directions of ↑Vb_aim1 and ↑Vb_aim are held constant, and that the magnitude decreases at a constant temporal rate of change (the temporal rate of change prescribed by the predetermined value ΔVb2).

Next, in the velocity following mode, when the application of the impellent force on the vehicle 1 stops, and the estimated center-of-gravity point velocity absolute value rate of change DVb_s becomes smaller than the second threshold value DV2 (i.e., when the determination result of step S24-3 of FIG. 19 becomes positive), the computational processing mode changes from the velocity following mode to the velocity hold mode based on the processing in step S24-5 in FIG. 19.

According to this velocity hold mode, in a condition in which the acceleration request and the deceleration request are not made (i.e., in a condition in which the determination results of the steps S25-1 and 25-4 in FIG. 19 are both negative), the base required center-of-gravity point velocity vector ↑Vb_aim1 is set to be the same velocity vector as the velocity vector ↑Vb_aim1_p of the previous value until the time measurement of the countdown timer is completed.

Therefore, after the velocity hold mode starts, within a period of time until the time measurement of the countdown timer is completed (during the time of the initial value Tm of the countdown timer), the base required center-of-gravity point velocity vector ↑Vb_aim1 is maintained to be the same constant velocity vector as the velocity vector determined before the velocity hold mode starts.

Therefore, the required center-of-gravity point velocity vector ↑Vb_aim determined to follow ↑Vb_aim1 is determined to be maintained at a constant velocity vector (i.e., a velocity vector which matches or approximately matches with ↑Vb_aim which was determined immediately before the velocity hold mode started).

Further, the element in the x axis direction and the element in the y axis direction of the required center-of-gravity point velocity vector ↑Vb_aim determined as described above is determined to be the target center-of-gravity point velocity for control Vb_x_mdfd and Vb_y_mdfd. Moreover, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, after the vehicle 1 increases its velocity, during a period of time in which the time measurement by the countdown timer is completed (the period of time represented by the initial value Tm), the velocity of the wheel assembly 5 is controlled so that the magnitude and the direction of the actual velocity vector ↑Vb of the vehicle system center of gravity is maintained to be constant without requiring the posture of the upper body of the occupant to be adjusted frequently. Therefore, the actual driving condition of this vehicle under this situation is such that the vehicle 1 runs at an approximately constant velocity vector even if the occupant does not perform a maneuvering operation by actively moving his or her upper body.

Incidentally, in the velocity hold mode, when an impellent force in approximately the fore-and-aft direction is applied to the vehicle 1 again, thereby making the determination result of step S25-4 of FIG. 20 positive (i.e., an acceleration request occurring), the computational processing mode returns to the velocity following mode. Therefore, the vehicle 1 accelerates again in approximately the fore-and-aft direction.

In the velocity hold mode, when the determination result of step S25-1 of FIG. 20 becomes positive by adding a braking force to the vehicle 1 (i.e., when a deceleration request occurs), the computational processing mode changes to the braking mode. As a result, the velocity of the vehicle 1 decreases. In this case, similar to the case in which a deceleration request occurs in the velocity following mode, while the deceleration request is occurring, the |↑Vb_aim1| and θvb_aim1 is determined based on the second braking computational processing (i.e., the processing in FIG. 18) of step S23-6.

Next, in the velocity hold mode, when the condition in which neither the acceleration request nor the deceleration request occurs is maintained (i.e., the condition in which the determination results of the steps S25-1 and 25-4 in FIG. 20 are both negative), and the time measurement of the countdown timer is completed, the computational processing mode is altered from the velocity hold mode to the braking mode due to the processing of step S25-11 in FIG. 20.

In this braking mode, under a condition in which neither the acceleration request nor the deceleration request occurs (i.e., a condition in which the determination results of steps S23-1 and 23-4 in FIG. 15 are both negative), the processing of steps S23-5-1 and 23-5-2 in FIG. 16 are performed in each control processing period. As a result, the base required center-of-gravity point velocity vector absolute value |↑Vb_aim1| decreases continuously to zero at a constant temporal rate of change (a temporal rate of change prescribed by ΔVb1 mentioned above). Further, after |↑Vb_aim1| decreases to zero, |↑Vb_aim1| is maintained to be zero.

Further, in the braking mode, in a condition in which neither the acceleration request nor the deceleration request has occurred, the processing after step S23-5-3 in FIG. 16 is executed in each control processing period. In this case, when the direction of the base required center-of-gravity point velocity vector ↑Vb_aim1 determined immediately before the transition from the velocity hold mode to the braking mode (i.e., the direction of ↑Vb_aim1 determined in a control processing period immediately preceding the control processing period in which the determination result of step S25-8 of FIG. 20 is negative) is different from the x axis direction and is relatively close to the x axis direction (in more precise terms, when the directional angle θvb_aim1 of ↑Vb_aim1 determined immediately before the transition is an angular value in either one of the ranges $0° < θvb\_aim1\_p ≤ θth1+$, $θth1- ≤ θvb\_aim1\_p < 0°$, $θth2+ ≤ θvb\_aim1\_p < 180°$, $-180° < θvb\_aim1\_p ≤ θth2-$), during a period of time in which |↑Vb_aim1| decreases to zero, θvb_aim1 approaches the target conversion angle 0° or 180° or −180° at a constant temporal rate of change, and is finally maintained at the target conversion angle. Therefore, after the braking mode begins, and during the period of time in which the |↑Vb_aim1| decreases to zero, the direction of the base required center-of-gavity point velocity vector ↑Vb_aim continuously approaches the x axis. In other words, during this period of time, the ratio of the absolute value of the element Vb_y_aim1 in the y axis direction with respect to the absolute value of the element Vb_x_aim1 in the x axis direction of the base required center-of-gravity point velocity vector ↑Vb_aim approach zero. Further, when the direction of ↑Vb_aim1 reaches the same direction as the x axis direction (i.e., Vb_y_aim1=0) before |↑Vb_aim1| diminishes to zero, the direction of ↑Vb_aim1 is maintained to be equal to the direction of the x axis.

Therefore, ↑Vb_aim1 is determined so that its magnitude diminishes and that its direction approaches (converges) the direction of the x axis. When ↑Vb_aim1 is determined in this way, the required center-of-gravity point velocity vector ↑Vb_aim, determined to follow ↑Vb_aim1, also behaves so that its magnitude diminishes and that its direction approaches the direction of the x axis.

Further, when the direction of the base required center-of-gravity point velocity vector ↑Vb_aim1, determined immediately before the transition from the velocity hold mode to the braking mode, is different from the direction of the x axis, and is facing a direction relatively far apart from the direction of the x axis (in more precise terms, when the directional angle θvb_aim1 of ↑Vb_aim1 determined immediately before the transition is an angular value within either of the ranges of $θth1+ < θvb\_aim1\_p < θth2+$ and $θth2- < θvb\_aim1\_p < θth1-$), θvb_aim1 is held constant held constant at the same angular value as the directional angle θvb_aim1 of ↑Vb_aim1 determined immediate before the transition, during the period in which |↑Vb_aim1| diminishes to zero.

Therefore, ↑Vb_aim1 is determined so that its magnitude diminishes and so that its direction is maintained to be constant. When ↑Vb_aim1 is determined in this manner, the required center-of-gravity point velocity vector ↑Vb_aim, which is determined to follow ↑Vb_aim1, is also determined so that its magnitude diminishes and so that its direction is maintained to be equal.

Further, according to the present embodiment, in the velocity holding mode, the magnitude and the direction of ↑Vb_aim1 is maintained to be constant. As a result, the base required center-of-gravity point velocity vector ↑Vb_aim1, determined immediately before the transition from the velocity hold mode to the braking mode, consequently matches with ↑Vb_aim1 which was determined immediately before the transition from the velocity following mode to the velocity hold mode (i.e., in the present embodiment, ↑Vb_aim1 determined in the control processing period in which the determination result of step S24-3 of FIG. 19 is positive).

The element in the x axis direction and the element in the y axis direction of the required center-of-gravity point velocity vector ↑Vb_aim determined as described above in the braking mode is determined to be the target center-of-gravity point velocity for control Vb_x_mdfd and Vb_y_mdfd. Further, the manipulated variable elements u3_x and u3_y included respectively in each imaginary wheel rotational angular acceleration commands ωwdot_x_cmd and ωwdot_y_cmd are determined so that the center-of-gravity point velocity estimation value Vb_x_s and Vb_y_s are respectively converged to the target center-of-gravity point velocity for control Vb_x_mdfd and Vb_y_mdfd.

As a result, when the computational processing mode before the braking mode is a velocity hold mode, the velocity of the wheel assembly 5 is controlled so that the actual magnitude of the velocity vector of the center-of-gravity point of the vehicle system diminishes continuously from the magnitude in the velocity hold mode even when the occupant is not actively performing an active maneuvering operation with the movement of his or her upper body.

In this case, when ↑Vb_aim1, determined immediately before the transition from the velocity hold mode to the braking mode (i.e., ↑Vb_aim1 being determined immediately before the transition from the velocity following mode to the velocity hold mode) is different from the direction of the x axis and is relatively close to the direction of the x axis, the magnitude of the velocity vector of the vehicle system center of gravity diminishes, and the direction of this velocity vector automatically approaches the direction of the x axis (the fore-and-aft direction of the occupant), even when the occupant does not actively perform a maneuvering operation with the movement of his or her upper body. Therefore, the vehicle 1 runs straight to a greater degree with respect to the fore-and-aft direction of the occupant.

Here, when the vehicle 1 is to be accelerated, in most cases, it is required to accelerate the vehicle 1 in particularly the fore-and-aft direction of the occupant. In this case, the vehicle 1 according to the present invention runs straight to a greater degree with respect to the fore-and-aft direction, as described above. Therefore, even when the direction of the impellent force applied to the vehicle 1 is slightly deviated from the fore-and-aft direction, in the braking mode following the subsequent velocity hold mode, the velocity of the wheel assembly 5 is controlled so that the velocity vector of the vehicle system center of gravity automatically faces the fore-and-aft direction.

Therefore, a discrepancy of the moving direction of the vehicle 1 is not likely to occur. Further, the vehicle 1 may run straight to a greater degree with respect to the fore-and-aft direction of the occupant (the vehicle 1 may move more easily in the fore-and-aft direction of the occupant). Further, when the vehicle 1 is moved in the fore-and-aft direction, the vehicle 1 may be moved in the fore-and-aft direction even when the impellent force applied to the vehicle 1 is not precisely facing the fore-and-aft direction. As a result, the maneuvering operation of running the vehicle 1 in the fore-and-aft direction may be executed more easily.

In addition, when the direction of the base required center-of-gravity point velocity vector ↑Vb_aim1 determined immediately before the transition from the velocity hold mode to the braking mode (=↑Vb_aim1 determined immediately before transitioning from the velocity following mode to the velocity hold mode) is different from the direction of the x axis and is relatively far apart from the direction of the x axis, the magnitude of the velocity vector of the vehicle system center of gravity diminishes while the direction of the velocity vector is maintained approximately constant even when the occupant does not perform an active maneuvering operation with the movement of his or her upper body. In other words, when the direction of ↑Vb_aim1 determined immediately before the transition from the velocity hold mode to the braking mode is relatively far from the direction of the x axis, it is highly likely that the direction of the velocity vector of the vehicle system center of gravity which was finally intended by the occupant in the velocity following mode is the same direction as the x axis direction. Therefore, after the velocity following mode, it is possible to prevent the vehicle system center of gravity from moving in the direction different from a direction that the occupant intends.

Here, the correspondence between the present embodiment and the present invention is described as a supplement.

According to the present embodiment, the fore-and-aft direction (x axis direction) and the lateral direction (Y axis direction) of the occupant riding on the vehicle 1 respectively correspond to the first direction and the second direction according to the present invention.

Further, the required center-of-gravity point velocity generator 74 performs the target velocity determination procedure according to the present invention. In this case, according to the present embodiment, the vehicle system center of gravity (in more precise terms, the vehicle/occupant integrated center-of-gravity point) corresponds to the predetermined representative point of the vehicle according to the present invention. Further, the required center-of-gravity point velocity vector ↑Vb_aim, which is a target value of the velocity vector ↑Vb of the vehicle system center of gravity, corresponds to the target velocity vector according to the present invention.

Further, the movement operation unit control procedure according to the present invention is executed by the center-of-gravity point velocity restrictor 76, the posture control calculator 80, and the motor command calculator 82.

Further, regarding the processing by the required center-of-gravity point velocity generator 74, a condition in which the determination result of the step S24-3 in FIG. 19 during the velocity following mode is positive and neither an acceleration request nor a deceleration request is made during the processing in the subsequent velocity hold mode and the braking mode (in particular, the determination results of steps S23-1, 23-4 in FIG. 15, and steps S25-1, 25-4 in FIG. 20 are all negative) corresponds to an instance according to the present invention in which the predetermined condition is satisfied.

Further, a velocity decrease procedure according to the present invention is performed by a procedure combining a procedure in the velocity hold mode when neither an acceleration request nor a deceleration request has occurred (in particular, the procedure of FIG. 20 such that the determination results of steps S25-1 and 25-4 is negative), a procedure in the braking mode (in particular, the procedure of FIG. 15 until ↑Vb_aim diminishes to zero when the determination results of steps S23-1 and 23-4 is negative), and the subsequent steps S26-28. Further, the period from a starting time of the execution of the processing in the velocity hold mode to the time at which ↑Vb_aim diminishes to zero in the braking mode following the velocity hold mode corresponds to the velocity diminishing period according to the present invention.

In addition, ↑Vb_aim determined immediately before the computational processing mode transitions from the velocity following mode to the velocity hold mode (which matches or approximately matches ↑Vb_aim1), in other words, ↑Vb_aim determined in a control processing period in which the determination result of the step S24-3 in FIG. 19 becomes positive, corresponds to the diminishing initial target velocity vector according to the present invention.

Further, a velocity direction adjustment procedure according to the present invention is performed by the procedure in steps S23-5-5 to 23-5-17 in FIGS. 16 and 17. In this case, the directional angle threshold value θth1+, −(θth1−), 180°−(θth2+), and (θth2−)−180° corresponds to a predetermined angular value according to the present invention.

Further, the velocity rate of change measurement procedure according to the present invention is performed according to the procedure in step S21 in FIG. 14 performed by the required center-of-gravity point velocity generator 74. In this case, according to the present embodiment, the estimated center-of-gravity point velocity absolute value rate of change DVb_s corresponds to the observed value of the velocity rate of change according to the present invention.

Further, the acceleration request determination procedure according to the present invention is performed by the determination procedures in steps S23-1 and 25-4 executed by the required center-of-gravity point velocity generator 74. Further, the procedure in the velocity following mode in a condition in which the deceleration request does not occur (the processing in FIG. 19 in a condition in which the determination result of step S24-1 becomes negative) corresponds to a velocity increasing procedure according to the present invention.

Next, the following detailed description concerns a computational processing for controlling the vehicle in a case in which a plurality of vehicles I linked in one line by a cord member moves by following the vehicle 1 running ahead of each vehicle 1 and by running along the trajectory of the vehicle 1 running ahead.

First the parameter and the variable used in the explanation is described.

Figure 21:
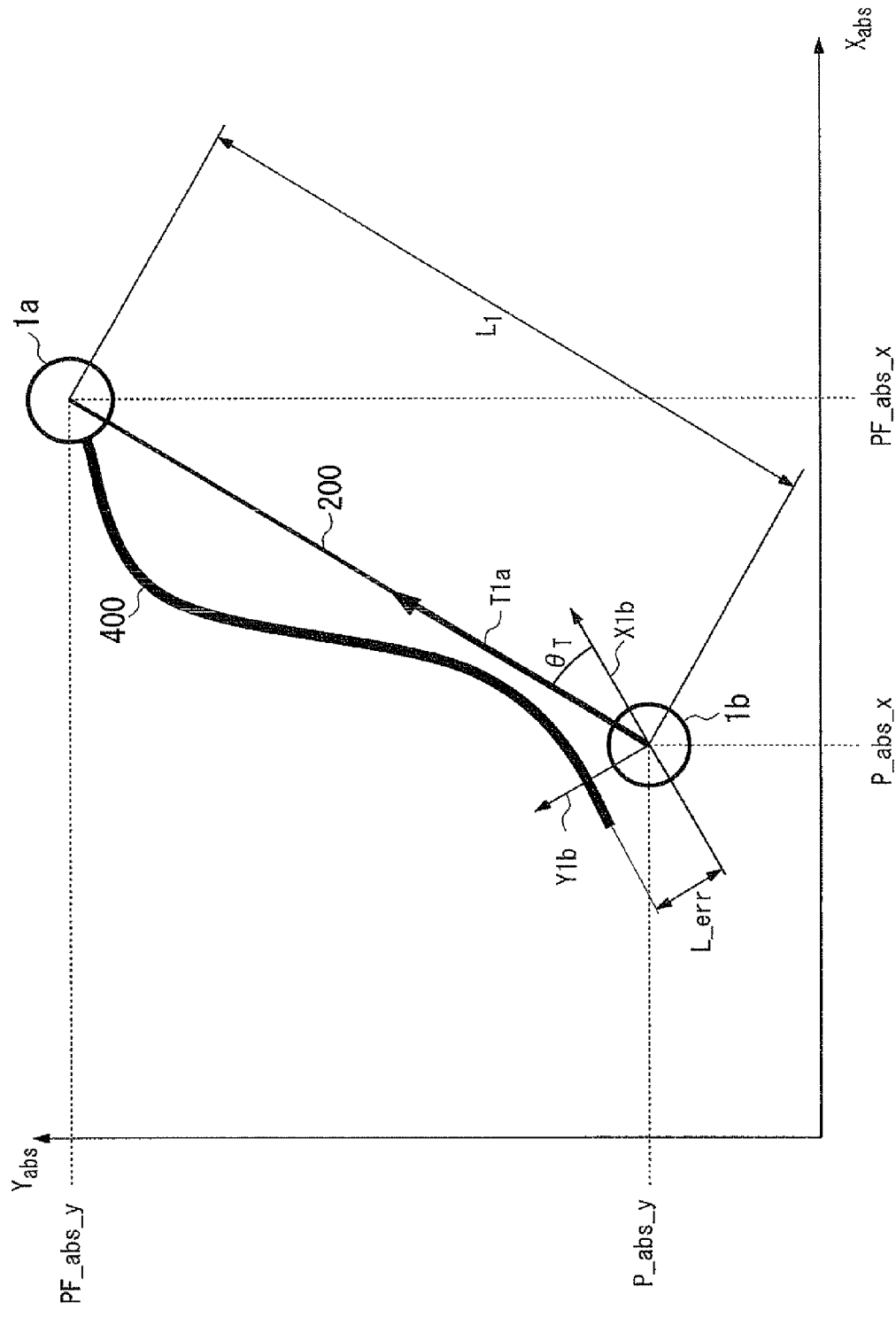

In FIG. 21, a relative position of a vehicle 1*b*, a vehicle 1*a* running ahead of the vehicle 1*b*, and a trajectory 400 of the vehicle 1*a* is illustrated. FIG. 21 is drawn as a diagram viewing each vehicle from the positive direction of the z axis of each vehicle to the negative direction. In addition, an end of the cord member 200 is attached to the hook 500*b* of the vehicle 1*a* (see FIG. 2) and the hook 500*a* of the vehicle 1*b* (see FIG. 2). As a result, the vehicle 1*a* and the vehicle 1*b* are linked together. Incidentally, the shape of the trajectory 400 of the vehicle 1*a* shown in FIG. 21 is only an example.

Here, the coordinates (positions) are defined using an abs coordinate system with a predetermined position on the floor surface being regarded as the origin. In addition, the x axis of this abs coordinate system is defined as Xabs, and the y axis of the abs coordinate system is defined as Yabs. Further, as a coordinate of the vehicle 1*b* in the abs coordinate system, the Xab axis element is defined as P_abs_x, and the Yabs axis element is defined as P_abs_y. In addition, as a coordinate of the vehicle 1*a* in the abs coordinate system, the Xabs axis element is defined as PF_abs_x, and the Yabs axis element is defined PF_abs_y.

Further, a coordinate system is defined having the vehicle 1b as the origin. The x axis and the y axis of this coordinate system is respectively defined as the X1b axis and the Y1b axis. Here, the positive direction of the X1b axis indicates the frontal direction of the vehicle 1b (see FIG. 2).

Further, the amount of deviation of the vehicle 1b with respect to the trajectory 400 of the vehicle 1a (the amount of deviation in the Y1b axis direction) is defined as L_err. Further, the trajectory 400 of the vehicle 1a is defined by connecting the coordinate of a running vehicle 1a in chronological order. Incidentally, the trajectory 400 defined in this way may be stored in the trajectory calculator 602 described later.

Incidentally, the X1b axis element T1a_x of the tensional force T1a and the Y1b axis element T1a_y are determined based on a signal according to the tensional force T1a of the cord member 200 attached to the hook 500a of the vehicle 1b and a signal indicating the direction in which the tensional force T1a operates. Further, the absolute value of the tensional force T1a of the cord member 200 is represented by equation 10 by the Pythagorean theorem using the X1b axis element T1a_x of the tensional force T1a and the Y1b axis element T1a_y of the tensional force T1a. Here, sqrt( ) indicates the square root function.

$$|T1a|=\mathrm{sqrt}((T1a\_x)^2+(T1a\_y)^2) \quad \text{(Equation 10)}$$

Further, the angle $\theta_T$ between the X1b axis and the tensional force T1a of the cord member 200 is represented as equation 11 using the X1b axis element T1a_x of the tensional force T1a and the Y1b axis element T1a_y of the tensional force T1a. Here, arcTan( ) refers to an inverse function of a tangent.

$$\theta_T=\mathrm{arcTan}(T1a\_y/T1a\_x)$$

Further, the length $L_1$ of the cord member 200 in a condition in which the tensional force T1a is applying is represented as equation 12 using the length $L_0$ of the cord member 200 in a condition in which the tensional force T1a is not applying, and a spring constant of the cord member 200.

$$L_1=L_0+k|T1a| \quad \text{(Equation 12)}$$

Next, the coordinates of the vehicle 1a and the vehicle 1b are described.

Figure 22:
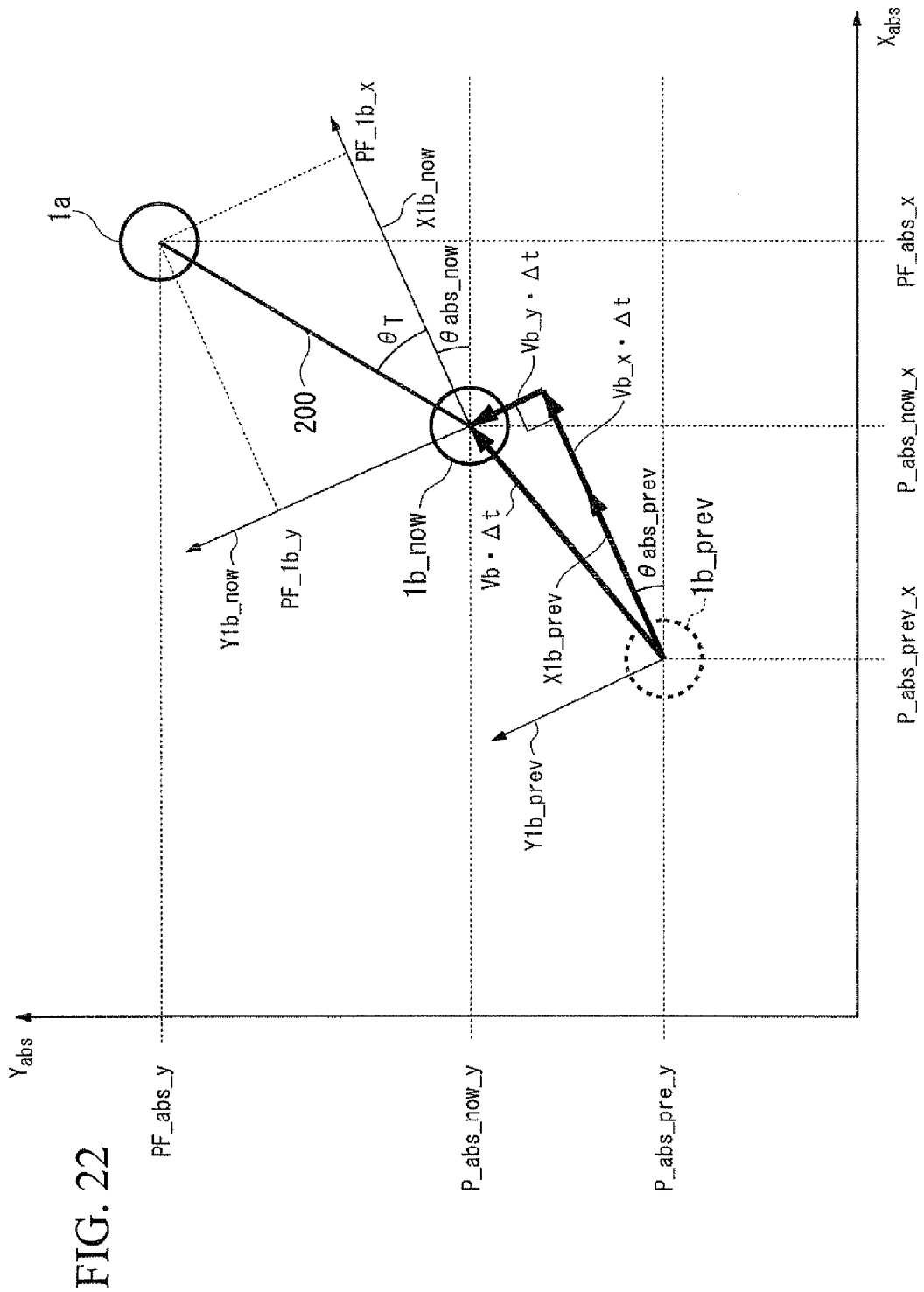

FIG. 22 shows the relative position between the vehicle 1b running at a center-of-gravity point velocity Vb during the time ΔT and the vehicle 1a. Here, FIG. 22 is shown as a diagram viewing both vehicles from the positive direction of the z axis to the negative direction.

Suppose that the vehicle 1b which was placed at coordinate (P_abs_PreV_x, P_abs_PreV_y) in the coordinate system abs at a certain time has moved at a center-of-gravity point velocity Vb, a period of time ΔT has passed, and has moved to coordinate (P_abs_now_x, P_abs_now_y) in the abs coordinate system.

Incidentally, in the following description, the vehicle 1b at the coordinate (P_abs_PreV_x, P_abs_PreV_y) is referred to as the vehicle 1b_PreV. In addition, the vehicle 1b (P_abs_now_x, P_abs_now_y) is referred to as the vehicle 1b_now.

Further, a coordinate system with the vehicle 1b_PreV as the origin is defined. The x axis and the y axis of this coordinate system is referred to as the X1b_PreV axis and the Y1b_PreV axis. Here, the positive direction of the X1b_PreV axis represents the frontal direction of the vehicle 1b_PreV (see FIG. 2). Similarly, a coordinate system with the vehicle 1b_now as the origin is defined. The x axis and the y axis of this coordinate system is referred to as the X1b_now axis and the Y1b_now axis. Here, the positive direction of the X1b_now axis represents the frontal direction of the vehicle 1b_now (see FIG. 2).

Further, the X1b_PreV axis element of the center-of-gravity point velocity Vb is defined as Vb_x. Similarly, the Y1b_PreV axis element of the center-of-gravity point velocity Vb is defined as Vb_y.

Further, an angle between Vb_x and the Xabs axis of the abs coordinate system is defined as θabs_PreV. In addition, an angle between the X1b_now axis and the Xabs axis of the abs coordinate system is defined as θabs_now.

Using these angles, the coordinate P_abs_now_xy of the vehicle 1b_now in the abs coordinate system is expressed as equation 13.

$$P\_abs\_now\_x=P\_abs\_PreV\_x+\Delta T \cdot Vb\_x \cdot \cos(\theta abs\_PreV)-\Delta T \cdot Vb\_y \cdot \sin(\theta abs\_PreV) \quad \text{(Equation 13X)}$$

$$P\_abs\_now\_y=P\_abs\_PreV\_y+\Delta T \cdot Vb\_x \cdot \sin(\theta abs\_PreV)+\Delta T \cdot Vb\_y \cdot \cos(\theta abs\_PreV) \quad \text{(Equation 13Y)}$$

Incidentally, the equations 13X and 13Y above may be represented as equation 14 below using a vector expression. Here, Rot( ) is a function indicating a rotational matrix.

$$\uparrow P\_abs\_now=\uparrow P\_abs\_PreV+\mathrm{Rot}(\theta abs\_PreV) \cdot \Delta T \cdot \uparrow Vb \quad \text{(Equation 14)}$$

Further, a coordinate of the vehicle 1a in the coordinate system with the vehicle 1b_now as the origin is defined as PF_1b_xy. Therefore, the coordinate of the vehicle 1a in the abs coordinate system is expressed as equations 15X and 15Y.

$$PF\_abs\_x=P\_abs\_now\_x+PF\_1b\_x \cdot \cos(\theta abs\_now)-PF\_1b\_y \cdot \sin(\theta abs\_now) \quad \text{(Equation 15X)}$$

$$PF\_abs\_y=P\_abs\_now\_y+PF\_1b\_x \cdot \sin(\theta abs\_now)+PF\_1b\_y \cdot \cos(\theta abs\_now) \quad \text{(Equation 15Y)}$$

Here, PF_1b_x and PF_1b_y are respectively expressed as equations 16X and 16Y using the length $L_1$ of the cord member 200.

$$PF\_1b\_x=L_1 \cdot \cos(\theta_1) \quad \text{(equation 16X)}$$

$$PF\_1b\_y=L_1 \cdot \sin(\theta_T) \quad \text{(equation 16Y)}$$

As indicated in equation 12 shown above, the length $L_1$ of the cord member 200 is computed by the absolute value of the tensional force T1a. In addition, as indicated in equation 11 shown above, the angle $\theta_T$ is computed from the direction in which the tensional force T1a applies, i.e., the X1b axis element (T1a_x) and the Y1b axis element (T1a_y).

Therefore, the coordinate PF_abs_xy of the vehicle 1a in the abs coordinate system is computed by equation 15 based on the absolute value of the tensional force T1a of the cord member 200 and the direction in which the tensional force T1a applies.

Next, the resultant force F of the tensional force applying on the vehicle 1b is described.

Figure 23:
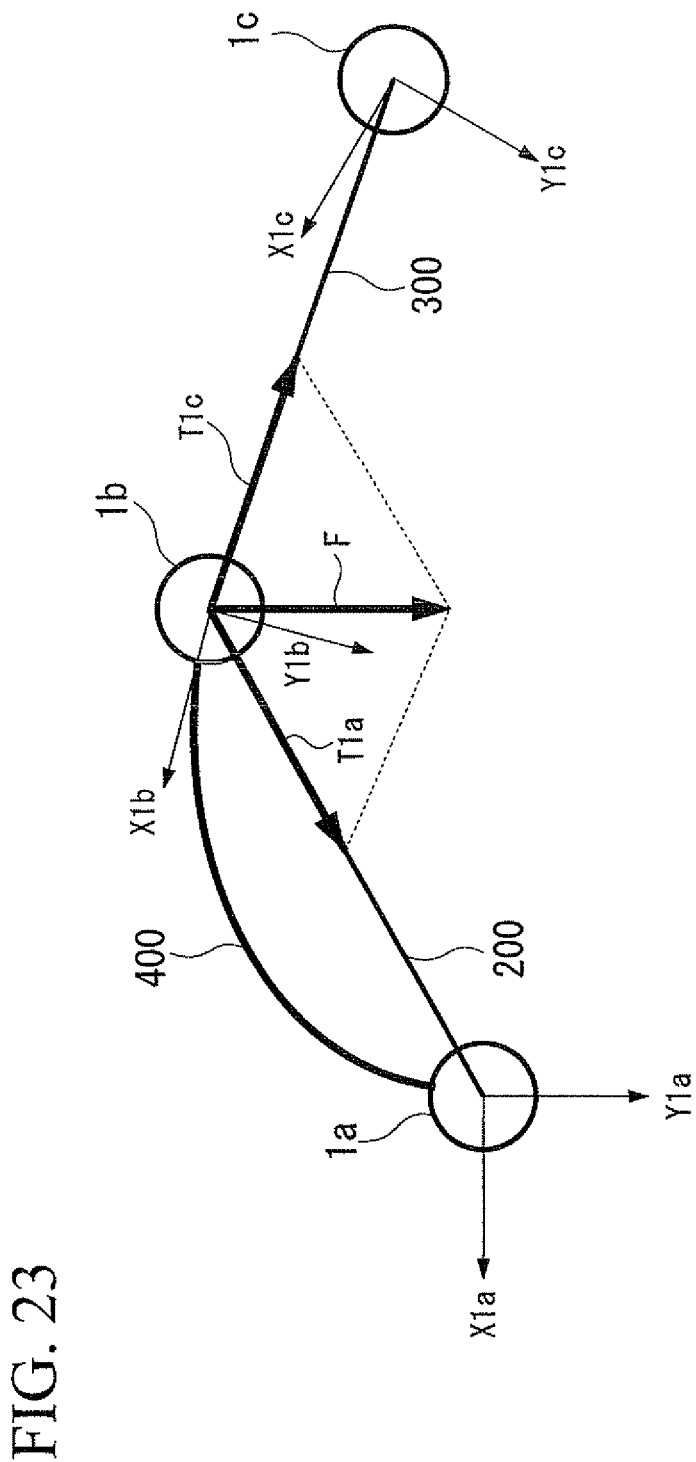
FIG. 23 is a diagram showing a tensional force T1a, a tensional force T1c, a resultant force F of the tensional force T1a and the tensional force T1c, and a trajectory 400 of the vehicle 1a. The tensional force T1a is a tensional force of a cord member 200 applied to three omnidirectional vehicles, which are linked together, and an omnidirectional vehicle 1b and a cord member 300.

FIG. 23 shows three vehicles 1a-1c linked together, a tensional force T1a of the cord member 200 applying to the vehicle 1b, the tensional force T1c of the cord member 300, their resultant force F, and the trajectory 400 of the vehicle 1a.

Here, each vehicle is linked in one line in the order of the vehicle 1a, the vehicle 1b, and the vehicle 1c. In other words, an end of the cord member 200 is attached to the hook 500b of the vehicle 1a (see FIG. 2) and the hook 500a of the vehicle 1b (see FIG. 2), and the vehicles 1a and 1b are linked together. Further, an end of the cord member 300 is attached to the hook 500b of the vehicle 1b (see FIG. 2) and the hook 500a of the vehicle 1c (see FIG. 2). In this way, the vehicles 1b and 1c are linked together. Incidentally, the shape of the trajectory 400 of the vehicle 1a shown in FIG. 23 is only an example.

Further, FIG. 23 is represented as a diagram viewing each vehicle from the positive direction of the z axis toward the negative direction. Further, the coordinate system having the vehicle 1a as the origin is indicated in the X1a axis and the Y1a axis. Here, the X1a axis represents the frontal direction of the vehicle 1a (see FIG. 2). This characteristic applies to the vehicles 1b and 1c as well.

As shown in FIG. 23, suppose that the vehicle 1a turns in the positive direction of the Y1b axis of the vehicle 1b. As a result, the resultant force F of the tensional forces T1a and T1c applies in the positive direction of the Y1b axis with respect to the vehicle 1b.

In this case, the control unit 50 of the vehicle 1b (see FIG. 1) needs to tilt the base body 9 of the vehicle 1b (see FIG 1) towards the opposite direction of the resultant force F so that the vehicle 1b does not deviate from the trajectory 400. Further, the control unit 50 needs to control the actuator 7 (see FIG. 1) of the vehicle 1b so that the force balances out the resultant force F. Therefore, a parameter generated by the joint driving parameter generator 600 is used.

Next, the joint driving parameter generator 600 is described. Hereinafter, the "self vehicle" refers to the vehicle 1b (see FIGS. 21 to 23).

Figure 24:
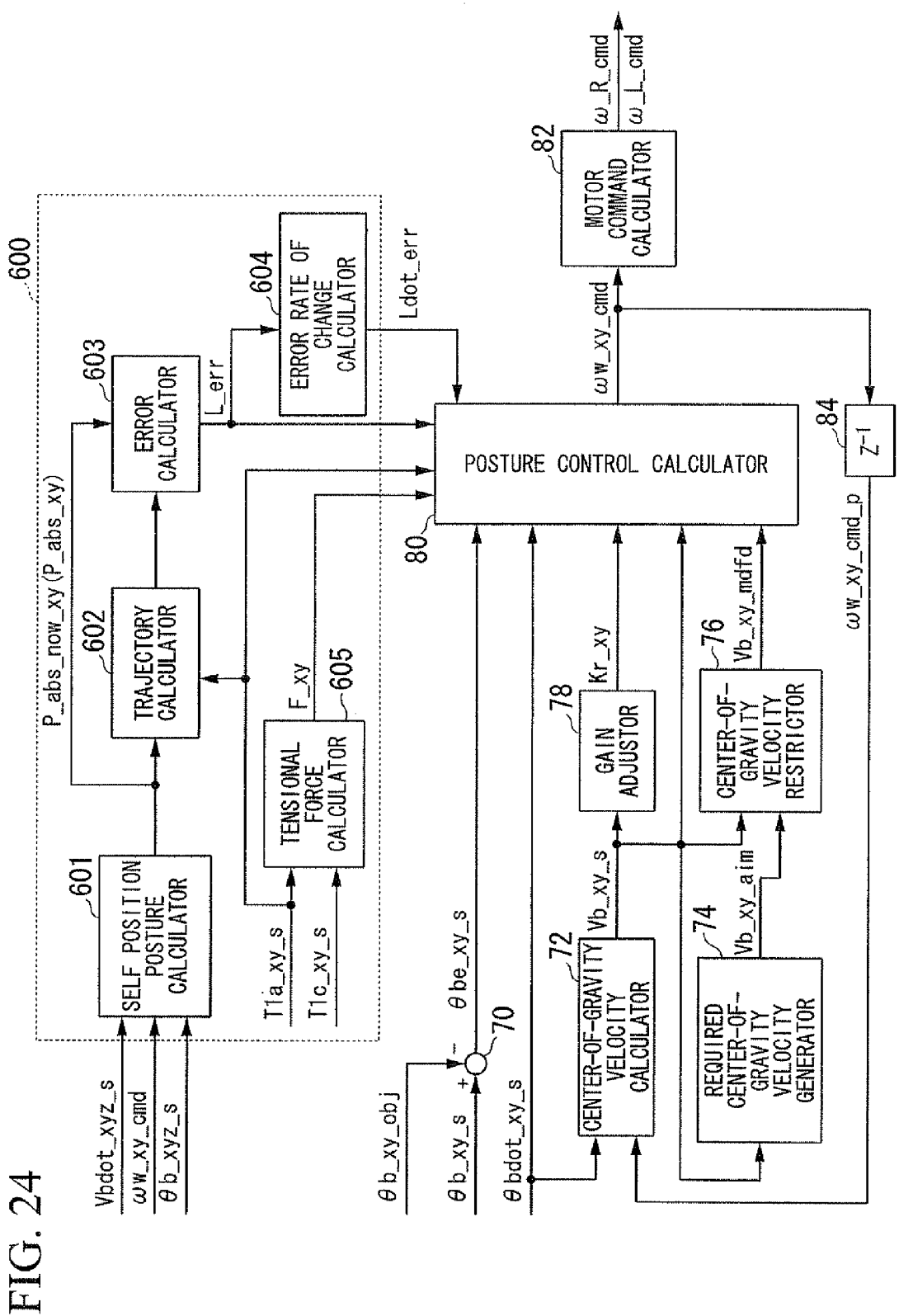
FIG. 24 is a block diagram showing a processing of step S9 shown in FIG. 7.

FIG. 24 shows a block diagram indicating the processing characteristic regarding the processing in step S9 of FIG. 7. The joint driving parameter generator 600 comprises a self position posture calculator 601, the trajectory calculator 602, a deviation calculator 603, a deviation rate of change calculator 604, and a tensional force calculator 605.

The self position posture calculator 601 receives an input of the center-of-gravity point acceleration estimation value VbdoT_Yz_s (the temporal rate of change of the center-of-gravity point velocity estimation value Vb_xYz_s), the rotational angular velocity ωw_xy_cmd of each of the imaginary wheels 62_x and 62_y (see FIG. 8), and the observed value θb_XYz_s of the base body tilt angle θb.

Here, the center-of-gravity point acceleration estimation value VbdoT_XYz_s may be computed by the center-of-gravity point velocity estimation value Vb_xYz_s being differentiated by the center-of-gravity velocity calculator 72. Further, the rotational angular velocity ωw_xy_cmd may be inputted from the posture control calculator 80 to the self position posture calculator 601. Further, the measured value θb_XYz_s of the base body tilt angle θb may be a value measured by the tilting sensor 52 (see FIG. 1).

The self position posture calculator 601 uses these parameters to compute the coordinate P_abs_now_xy of the vehicle 1b with respect to the abs coordinate system and the posture (θabs_now, θabs_PreV, and the like) (dead reckoning). An appropriate algorithm may be used as necessary for the algorithm for this computation. For example, the coordinate and the posture of the vehicle 1b with respect to the abs coordinate system may be computed using a known algorithm "3D strap down (three axis strap down)." Further, the self position posture calculator 601 outputs the computed coordinate P_abs_now_xy of the vehicle 1b to the trajectory calculator 602 and the deviation calculator 603.

The tension calculator 605 receives an input of the tensional force T1a_XY_s based on the signal outputted by the tensional force sensor 520a (see FIG. 2), and a tensional force T1c_XY_s based on the signal outputted by the tensional force sensor 520b (see FIG. 2). The tensional force calculator 605 computes the resultant force F_XY by adding the inputted tensional force T1a_XY_s and T1c_XY_s separately for the X1b axis element and the Y1b axis element, and thereby outputs the resultant force F_XY to the posture control unit 80.

The trajectory calculator 602 receives an input of the coordinate P_abs_now_XY of the vehicle 1b and the tensional force T1a_XY_s based on the signal outputted by the tensional force sensor 520a (see FIG. 2). The trajectory calculator 602 computes the coordinate of the vehicle 1a running ahead, repeatedly at a time interval of ΔT, for example. Furthermore, the trajectory calculator 602 connects the computed plurality of coordinates in a chronological order, sets this as the trajectory 400 of the vehicle 1a, and stores it to the memory unit (not diagrammed) comprised by the trajectory calculator 602. In addition, the trajectory calculator 602 outputs the trajectory 400 of the vehicle 1a to the deviation calculator 603.

In particular, the trajectory calculator 602 computes the length $L_1$ of the cord member 200 and the angle $\theta_T$ between the X1b axis and the tensional force T1a using equations 10 to 12 based on the length $L_0$ of the cord member 200 in a condition in which the tensional force is not applied, a predetermined spring coefficient k of the cord member 200, and the tensional force T1a_XY.

Further, the trajectory calculator 602 may compute the coordinate P_abs_now_XY of the self vehicle (the vehicle 1b_now) using equation 13 (14) based on the center-of-gravity point velocity estimation value Vb_XY_s and the predetermined amount of time ΔT.

Further, the trajectory calculator 602 computes the coordinate PF_1b_XY of the vehicle 1a in a coordinate system with the self vehicle (the vehicle 1b_now) being the origin based on the length $L_1$ of the cord member 200 and the angle $\theta_T$ between the X1b axis and the tensional force T1a using equation 16 (see FIG. 22). Furthermore, the trajectory calculator 602 computes the coordinate PF_abs_XY of the vehicle 1a running in the front by using the equation 15 based on the coordinate PF_1b_XY of the vehicle 1a, the coordinate P_abs_now_XY of the self vehicle (the vehicle 1b_now), and the posture θabs_now of the self vehicle (the vehicle 1b_now).

In this way, the trajectory calculator 602 repeatedly computes the coordinate PF_abs_XY of the vehicle 1a running ahead. Further, the trajectory calculator 602 connects the computed coordinates PF_abs_XY in chronological order, and saves this as the trajectory 400 of the vehicle 1a. Further, the trajectory calculator 602 outputs the trajectory 400 of the vehicle 1a to the deviation calculator 603. Incidentally, the trajectory calculator 602 may be configured so that the memory unit (not diagrammed) is provided outside the trajectory calculator 602.

The deviation calculator 603 receives an input of the coordinate P_abs_now_XY of the self vehicle (vehicle 1b_now) and the trajectory 400 of the vehicle 1a. The deviation calculator 603 computes the difference between the trajectory 400 of the vehicle 1a and the coordinate P_abs_now_XY of the self vehicle (vehicle 1b_now), and computes the amount of deviation L_err (see FIG. 21) of the self vehicle (vehicle 1b) with respect to the trajectory 400 of the vehicle 1a. Further, the deviation calculator 603 outputs the computed deviation amount L_err to the deviation rate of change calculator 604 and the posture control calculator 80.

The deviation rate of change calculator 604 receives an input of the deviation amount L_err. The deviation rate of change calculator 604 differentiates the deviation amount L_err, computes the rate of change LdoT_err of the deviation amount L_err, and outputs to the posture control calculator 80.

Above is the description of the joint driving parameter generator 600.

The control unit 50 (see FIG. 1) executes the processing in the center-of-gravity velocity calculator 72, the center-of-gravity point velocity restrictor 76, the gain adjustor 78, the error calculator 70, and the joint driving parameter generator 600, as described above, then executes the processing of the posture control calculator 80.

Figure 25:
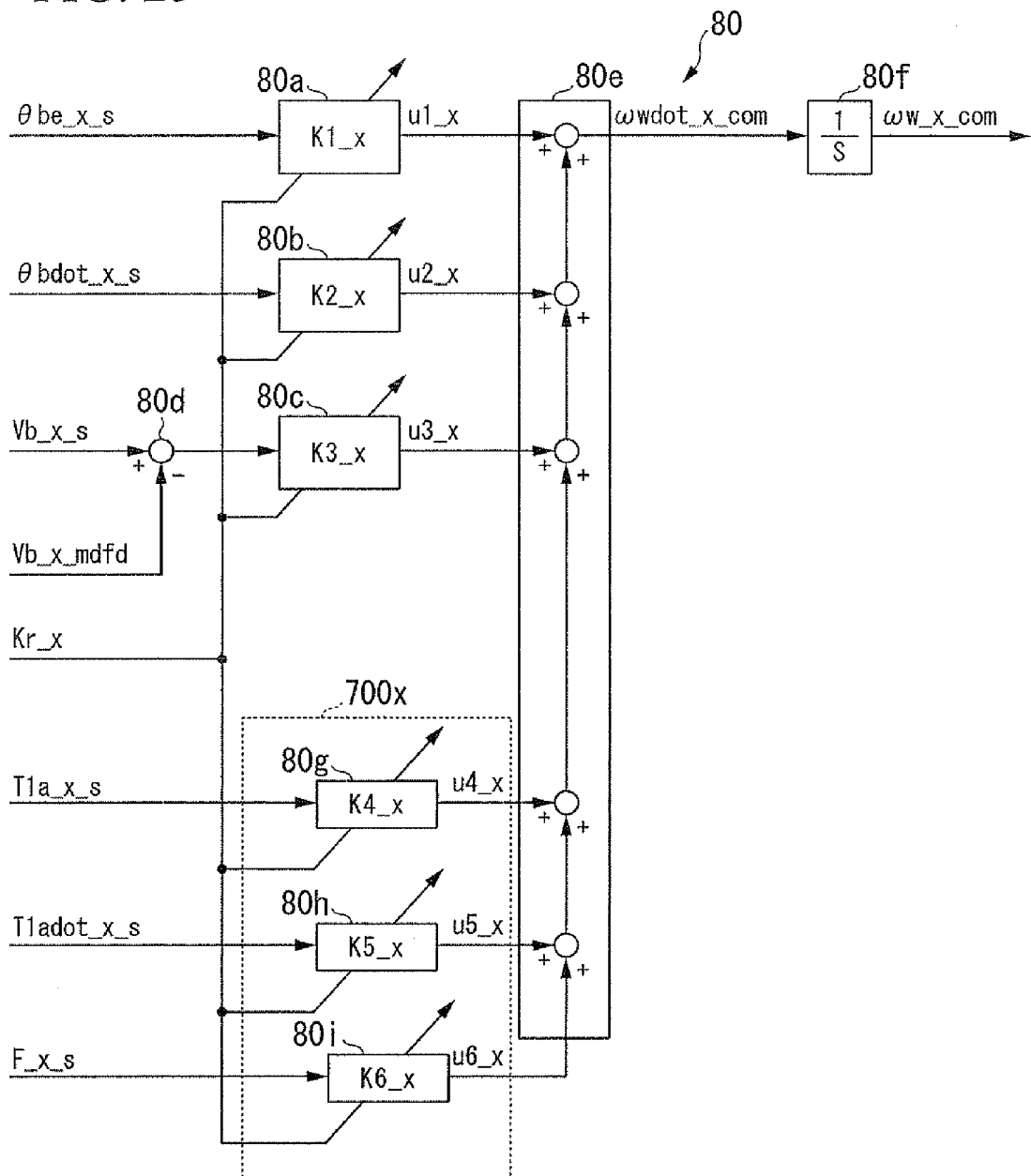
FIG. 25 is a block diagram showing a processing of a posture control calculator 80 shown in FIG. 9 and FIG. 24.
Figure 26:
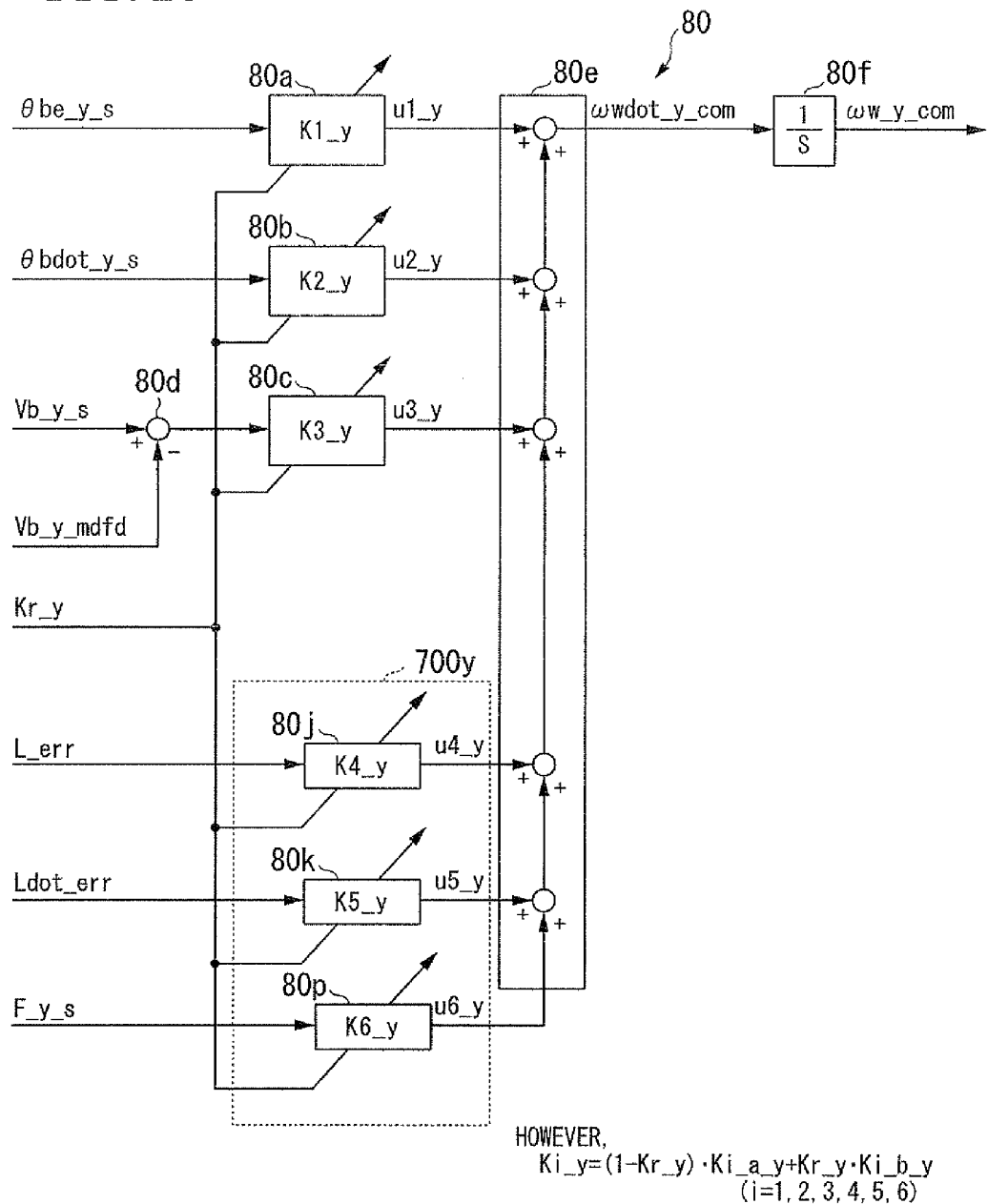
FIG. 26 is a block diagram showing a processing of a posture control calculator 80 shown in FIG. 9 and FIG. 24.

The processing of the posture control calculator 80 is next described with reference to FIGS. 25 and 26. In FIGS. 25 and 26, the reference numeral without a parenthesis relates to a procedure determining the imaginary wheel rotational angular velocity command ωw_X_cmd, which is a target value of the rotational angular velocity of the imaginary wheel 62_X rolling in the x axis direction. The parenthesized reference numeral relates to a procedure determining the imaginary wheel rotational angular velocity command ωw_Y_cmd, which is a target value of a rotational angular velocity of the imaginary wheel 62_Y rolling in the y axis direction.

Incidentally, although the processors 700X and 700Y are shown separately in FIGS. 25 and 26, the processors 700X and 700Y may both be comprised in the posture control calculator 80 (see FIG. 13).

The posture control calculator 80 receives an input of the base body tilt angle deviation observed value θbe_XY_s computed by the deviation calculator 70, the base body tilting angular velocity observed value θbdot_XY_s computed in step S2 (see FIG. 7), a center-of-gravity point velocity estimation value Vb_XY_s computed by the center-of-gravity velocity calculator 72, the target center-of-gravity point velocity Vb_XY_cmd computed by the center-of-gravity point velocity restrictor 76, the gain adjusting parameter Kr_XY computed by the gain adjusting unit 78, the deviation amount L_err and the rate of change LdoT_err of the deviation amount L_err computed by the joint driving parameter generator 600, the tensional force T1_X(T1a_X) of the cord member 200 connected to the vehicle 1a running ahead, and the resultant force F_XY of the cord member.

In addition, the posture control calculator 80 computes the rate of change T1doT_X(T1adoT_X) of the tensional force T1_X(T1a_x) of the cord member. For example, the posture control calculator 80 may compute T1doT_X(T1adoT_X) by calculating a time differential of the tensional force T1_X(T1a_x) of the cord member.

Further, the posture control calculator 80 first uses these input values to compute the imaginary wheel rotational angular acceleration command ωdoTw_XY_cmd using the following equations 17X and 17Y.

$$\omega wdoT\_X\_cmd = K1\_X \cdot \theta be\_X\_s + K2\_X \cdot \theta bdoT\_X\_s + K3\_X \cdot (Vb\_x\_s - Vb\_x\_mdfd) + K4\_X \cdot T1\_X\_s + K5\_X \cdot T1doT\_X\_s + K6\_X \cdot F\_X\_s \quad \text{(Equation 17X)}$$

$$\omega wdoT\_Y\_cmd = K1\_Y \cdot \theta be\_Y\_s + K2\_Y \cdot \theta bdoT\_Y\_s + K3\_Y \cdot (Vb\_y\_s - Vb\_y\_mdfd) + K4\_Y \cdot L\_err + K5\_Y \cdot LdoT\_err + K6\_Y \cdot F\_Y\_s \quad \text{(Equation 17Y)}$$

Therefore, according to the present embodiment, the imaginary wheel rotational angular acceleration command ωwdoT_X_cmd and the imaginary wheel rotational angular acceleration command ωwdoT_Y_cmd are both determined by adding up six elements of an operational amount (the six terms in the right side of the equations 17X and 17Y). The imaginary wheel rotational angular acceleration command ωwdoT_X_cmd is an operational amount (control input) for controlling the movement of the mass point 60_X of the inverted pendulum type model seen from the y axis direction (i.e., the movement of the vehicle system center of gravity seen from the y axis direction). The imaginary wheel rotational angular acceleration command ωwdoT_Y_cmd is an operational amount (control input) for controlling the movement of the mass point 60_Y of the inverted pendulum type model seen from the x axis direction (i.e., the movement of the vehicle system center of gravity seen from the x axis direction).

In this case, the gain coefficients K1_X, K2_X, K3_X, K4_X, K5_X, and K6_X relating to each element of the manipulated variable in the equation 17X is set variably according to the gain adjustment parameter Kr_X. The gain coefficients K1_Y, K2_Y, K3_Y, K4_Y, K5_Y, and K6_Y relating to each element of the manipulated variable in equation 17Y are set variably according to the gain adjustment parameter Kr_Y. Hereinafter, each of the gain coefficients K1_X, K2_X, K3_X, K4_X, K5_X, and K6_X in equation 17X may be referred to as the first gain coefficient K1_X, the second gain coefficient K2_X, the third gain coefficient K3_X, the fourth gain coefficient K4_X, the fifth gain coefficient K5_X, and the sixth gain coefficient K6_X. This characteristic applies to the gain coefficients K1_Y, K2_Y, K3_Y, K4_Y, K5_Y, and K6_Y in equation 17Y as well.

The i-th gain coefficient Ki_X (i=1, 2, 3, 4, 5, 6) in equation 17X and the i-th gain coefficient Ki_Y (i=1, 2, 3, 4, 5, 6) in equation 17Y are determined, as indicated in the comments shown in FIGS. 25 and 26, according to the gain adjustment parameters Kr_X and Kr_Y based on the following equations 18X and 18Y.

$$Ki\_X = (1 - Kr\_X) \cdot Ki\_a\_X + Kr\_X \cdot Ki\_b\_X \quad \text{(equation 18X)}$$

$$Ki\_Y = (1 - Kr\_Y) \cdot Ki\_a\_Y + Kr\_Y \cdot Ki\_b\_Y \quad \text{(equation 18Y)}$$

(i=1, 2, 3, 4, 5, 6)

Here, Ki_a_X and Ki_b_X in equation 18X are constant values predetermined as a gain coefficient value at the side of the minimum value of the i-th gain coefficient Ki_X (closer to the "0" side) and a gain coefficient value at the side of the maximum value of the i-th gain coefficient Ki_X (toward the side moving away from "0"). This characteristic applies to Ki_a_Y and Ki_b_Y in equation 18Y.

Therefore, each of the i-th gain coefficient Ki_X (i=1, 2, 3, 4, 5, 6) used in the equation 17X is determined as a weighted average of the constants Ki_a_X and Ki_b_X corresponding to each of the i-th gain coefficient Ki_X. Further, in this case, the weight on each of Ki_a_X and Ki_b_X is varied according to the gain adjustment parameter Kr_X. Therefore, in the case of Kr_X=0, Ki_X becomes equal to Ki_a_X. In the case of Kr_X=1, Ki_X becomes equal to Ki_b_X. Further, as Kr_X becomes closer to "1" from "0," the i-th gain coefficient Ki_X becomes closer to Ki_b_X from Ki_a_X.

Similarly, each of the i-th gain coefficient Ki_Y (j=1, 2, 3, 4, 5, 6) used in the computation in equation 17Y is determined as a weighted average of the constants Ki_a_Y and Ki_b_Y corresponding to each of the i-th gain coefficient Ki_Y. Further, in this case, the weight on each of Ki_a_Y and Ki_b_Y is varied according to the gain adjustment parameter Kr_Y. Therefore, in a case similar to Ki_X, as the value of Kr_Y varies between "0" and "1," the value of the i-th gain coefficient Ki_Y varies between Ki_a_Y and Ki_b_Y.

To supplement, the constant values Ki_a_X, Ki_b_X, Ki_a_Y, and Ki_b_Y (i=1, 2, 3, 4, 5, 6) are included in the constant parameters whose values are determined in step S6 or S8 (see FIG. 7).

The posture control calculator 80 performs the computation in the equation 17X using the first to sixth gain coefficients K1_X, K2_X, K3_X, K4_X, K5_X, and K6_X determined as described above. In this way, the posture control calculator 80 computes the imaginary wheel rotational angular acceleration command ωwdoT_X_cmd relating to the imaginary wheel 62_X rotating in the x axis direction.

In further detail, in reference to FIG. 25, the posture control calculator 80 computes the manipulated variable component u1_X and the manipulated variable component u2_X respectively in the processors 80a and 80b. The manipulated variable component u1_X is obtained by multiplying the first gain coefficient K1_X with the base body tilt angle deviation observed value θbe_X_s. The manipulated variable component u2_X is obtained by multiplying the base body tilting angular velocity observed value θbdot_X_s with the second gain coefficient K2_X. Furthermore, the posture control calculator 80 computes the deviation between the center-of-gravity point velocity estimation value Vb_X_s and the target center-of-gravity point velocity for control Vb_X_mdfd (=Vb_X_s−Vb_X_mdfd) at the calculator 80d. The posture control calculator 80 then computes the manipulated variable element u3_X at the processor 80c obtained by multiplying the deviation with the third gain coefficient K3_X.

In addition, the posture control calculator 80 computes the manipulated variable component u4_X, the manipulated variable component u5_X, and the manipulated variable component u6_X respectively in the processors 80g, 80h, and 80i of the processor 700X. The manipulated variable component u4_X is obtained by multiplying the forth gain coefficient K4_X with the tensional force T1_X_s(T1a_X_s). The manipulated variable component u5_X is obtained by multiplying the fifth gain coefficient K5_X with the rate of change T1doT_X(T1adoT_X) of the tensional force T1_X(T1a_X). The manipulated variable component u6_X is obtained by multiplying the sixth gain coefficient K6_X with the X1b axis element F_X_s of the resultant force F.

Further, the posture control calculator 80 computes the imaginary wheel rotational angular acceleration command ωwdoT_X_cmd by adding up these manipulated variable components u1_X, u2_X, u3_X, u4_X, u5_X, and u6_X at the calculator 80e.

Similarly, referring to FIG. 26, the posture control calculator 80 performs the computation of the equation 17Y by using the first to sixth gain coefficients K1_Y, K2_Y, K3_Y, K4_Y, K5_Y, and K6_Y determined as described above. In this way, the posture control calculator 80 computes the imaginary wheel rotational angular acceleration command ωwdoT_Y_cmd concerning the imaginary wheel 62_Y rolling in the y axis direction.

In this case, the posture control calculator 80 computes the manipulated variable component u1_Y and the manipulated variable component u2_Y respectively in the processors 80a and 80b. The manipulated variable component u1_Y is obtained by multiplying the first gain coefficient K1_Y with the base body tilt angle deviation observed value θbe_Y_s. The manipulated variable component u2_Y is obtained by multiplying the base body tilting angular velocity observed value θbdot_Y_s with the second gain coefficient K2_Y. Furthermore, the posture control calculator 80 computes the deviation between the center-of-gravity point velocity estimation value Vb_Y_s and the target center-of-gravity point velocity for control Vb_Y_mdfd (=Vb_Y_s−Vb_Y_mdfd) at the calculator 80d. The posture control calculator 80 then computes the manipulated variable element u3_Y at the processor 80c obtained by multiplying the deviation with the third gain coefficient K3_Y.

Furthermore, the posture control calculator 80 computes the manipulated variable component u4_Y, the manipulated variable component u5_Y, and the manipulated variable component u6_Y respectively in the processors 80j, 80k, and 80p of the processor 700Y. The manipulated variable component u4_Y is obtained by multiplying the fourth gain coefficient K4_Y with the deviation amount L_err. The manipulated variable component u5_Y is obtained by multiplying the rate of change LdoT_err of the deviation amount L_err with the fifth gain coefficient K5_Y. The manipulated variable component u6_Y is obtained by multiplying the sixth gain coefficient K6_Y with the Y1b axis element F_Y_s (see FIG. 23) of the resultant force F.

Further, the posture control calculator 80 computes the imaginary wheel rotational angular acceleration command ωwdoT_X_cmd by adding up these manipulated variable components u1_Y, u2_Y, u3_Y, u4_Y, u5_Y, and u6_Y at the calculator 80e.

Here, the first element (=the first manipulated variable component u1_X) and the second element (=the second manipulated variable component u2_X) of the right side of the equation 17X is a feedback manipulated variable element for converging the base body tilting angular deviation observed value θbe_X_s around the Y axis direction to zero according to the PD law (proportional-differential law), being the feedback control law. In other words, the base body tilt angle observed value θb_X_s is converged to the target value θb_X_obj.

Further, the third element (=the third manipulated variable component u3_X) of the right side of the equation 17X is a feedback manipulated variable element for converging the deviation between the center-of-gravity point velocity estimation value Vb_X_s and the target center-of-gravity point velocity Vb_X_mdfd to zero according to the proportionality law being the feedback control law. In other words, Vb_X_s is converged to Vb_X_mdfd.

In addition, the fourth element (=the fourth manipulated variable component u4_X) and the fifth element (=the fifth manipulated variable component u5_X) of the right side of the equation 17X is an manipulated variable element for controlling the tensional force T1_X_s in the x axis direction according to the PD law (proportional-differential law).

Further, the sixth element (=the sixth manipulated variable component u6_X) of the right side of the equation 17X is an manipulated variable element for controlling the resultant force of each tensional force in the X axis direction, according to the proportionality law.

In addition, the fourth element (=the fourth manipulated variable component u4_Y) and the fifth element (=the fifth manipulated variable component u5_Y) of the right side of the equation 17Y is an manipulated variable element for controlling the deviation amount L_err in the Y axis direction according to the PD law (proportional-differential law).

Further, the sixth element (=the sixth manipulated variable component u6_Y) of the right side of the equation 17Y is an manipulated variable element for controlling the resultant force of each tensional force in the Y axis direction, and for preventing a deviation from the trajectory, according to the proportionality law.

As described above, the posture control calculator 80 computes the imaginary wheel rotational velocity commands ωw_X_cmd and ωw_Y_cmd by first computing the imaginary wheel rotational angular acceleration commands ωwdoT_X_cmd and ωwdoT_Y_cmd, then integrating ωwdoT_X_cmd and ωwdoT_Y_cmd by the integrator 80f.

Above is a detailed description of the processing by the posture control calculator 80.

In particular, the imaginary wheel rotational angular acceleration command ωwdoT_X_cmd may be computed based on an equation obtained by separating the third element of the right side of the equation 17X to the manipulated variable component according to Vb_X_s (=K3_X·Vb_X_s) and the manipulated variable component according to Vb_X_mdfd (=−K3_X·Vb_X_mdfd). Similarly, the imaginary wheel rotational angular acceleration command ωwdoT_Y_cmd may be computed by the equation obtained by separating the third element of the right side of the equation 17Y to the manipulated variable component according to Vb_Y_s (=−K3_Y·Vb_Y_s) and the manipulated variable component according to Vb_Y_mdfd (=−K3_Y·Vb_Y_mdfd).

Further, in the present embodiment, the rotational angular acceleration commands ωw_X_cmd and ωw_Y_cmd of the imaginary wheel 62_X and 62_Y were used as the operational amount (control input) for controlling the behavior of the vehicle system center of gravity. However, it is possible to use the driving torque of the imaginary wheels 62_X and 62_Y or a translational force obtained by multiplying the driving torque with the radius Rw_X and Rw_Y of the imaginary wheels 62_X and 62_Y. Here, the translational force is the frictional force between the floor surface and the imaginary wheels 62_X and 62_Y.

Returning to the description of FIG. 24, the control unit 50 next inputs the imaginary wheel rotational velocity commands ωw_X_cmd and ωw_Y_cmd, determined at the posture control calculator 80 as described above, into the motor command calculator 82, and then executes the processing of this motor command calculator 82. In this way, the velocity command ω_R_cmd of the electric motor 31R and the velocity command ω_L_cmd of the electric motor 31L are determined. The processing of this motor command calculator 82 is the same as the processing of the XY-RL converter 86b of the limiting processor 86 (see FIG. 11).

In particular, the motor command calculator 82 determines the velocity commands ω_R_cmd and ω_L_cmd of the electric motors 31R and 31L by solving the simultaneous equation of the unknowns ω_R_cmd and ω_L_cmd obtained by replacing the variables ωw_X, ωw_Y, ω_R, and ω_L in the equations 01a and 01b into ωw_X_cmd, w_Y_cmd, ω_R_cmd, and ω_L_cmd.

In this way, the computational processing for controlling the vehicle in step S9 (see FIG. 7) is completed.

As described above, the omnidirectional vehicle 1b (the inverted pendulum type moving body) may move along a predetermined trajectory (for example, the trajectory 400) while the base body 9 is in the posture of an inverted pendulum.

Furthermore, when the omnidirectional vehicle 1b is deviating from a predetermined track (for example, the trajectory 400), the omnidirectional vehicle 1b makes the wheel assembly 5 translate in an orthogonal direction with respect to the trajectory. As a result, the omnidirectional vehicle 1b may reach the trajectory by moving a minimum distance, and may move along the trajectory without turning the base body 9.

Further, the omnidirectional vehicle 1b controls the actuator 7 so that the tensional force T1a and T1c applied to the base body 9 via the hook 500 balances out the force applied to the cord member 200 and 300 due to the tilting of the base body 9. Therefore, even if the trajectory 400 is bent due to the turning of the vehicle 1a, the omnidirectional vehicle 1b may move without deviating from the bent trajectory 400.

Further, the omnidirectional vehicle 1b computes the coordinate (position) of the vehicle 1a running ahead, based on the tensional force T1a and the direction in which the tensional force T1a applies. The tensional force T1a applies to the cord member 200 connecting the inverted pendulum type moving body (such as the vehicle 1b) and the vehicle 1a running ahead. Further, the omnidirectional vehicle 1b connects the plurality of coordinates (positions) which were calculated. In this way, the omnidirectional vehicle 1b determines the trajectory 400. Consequently, the omnidirectional vehicle 1b may move along the trajectory 400 which is determined by connecting the plurality of computed coordinates (positions) in chronological order.

While a preferred embodiment of the present invention has been described above, it should be understood that these are exemplary of the invention and are not to be considered as limiting the present invention. Additions, omissions, substitutions, and other modifications can be made without departing from the scope of the present invention.

For example, it is not indispensable that the trajectory 400 of the omnidirectional vehicle 1a be computed based on the tensional force applied to the cord member 200, and the direction in which the tensional force applies. For example, the trajectory 400 of the omnidirectional vehicle 1a may be predetermined. Further, the trajectory calculator 602 may output the predetermined trajectory to the deviation computational unit 603. Therefore, the omnidirectional 1b may move along this predetermined trajectory without being linked to another omnidirectional vehicle 1.

In addition, for example, the predetermined trajectory may be stored in the trajectory calculator 602. Further, the trajectory calculator 602 may obtain the predetermined trajectory from the memory unit (not diagrammed) which stores a predetermined trajectory.

In addition, for example, the omnidirectional vehicle 1b may comprise an imaging device and an image processor. Further, the omnidirectional vehicle 1b may obtain an image of the omnidirectional vehicle 1a running ahead with the imaging device, and may compute the position of the omnidirectional vehicle 1a running ahead (for example, the direction and the distance away from the omnidirectional vehicle 1b) by the image recognizing feature of the image processor. Incidentally, an appropriate algorithm may be used based on need in order to recognize the image of this image processing device. Further, this algorithm may be a known algorithm.

In addition, the cord member need not be an elastic body. Further, when the cord member is sagging, it is possible to compute the direction in which the tensional force is applied and the like using the catenary curve shaped as an elastic body.

Incidentally, the invention is not to be considered as being limited by the foregoing description, and is only limited by the scope of the appended claims.

What is claimed is:

1. An inverted pendulum moving body comprising:
   a base body;
   a moving behavior unit movable in all directions on a floor surface;
   an actuator driving the moving behavior unit; and
   a control unit controlling the actuator so that at least a tilt angle of the base body equals a predetermined target angle, the control unit also controlling the actuator so that the moving behavior unit moves along a trajectory stored in the control unit.

2. The inverted pendulum moving body according to claim 1, wherein when the moving behavior unit is deviating from the trajectory, the control unit controls the actuator so that the moving behavior unit is translated in a direction orthogonal to the trajectory, and so that the moving behavior unit is placed onto the trajectory.

3. The inverted pendulum moving body according to claim 2 further comprising:
   a cord member attaching member attachable to a cord member; and
   a tensional force sensor outputting a signal according to a tensional force of the cord member attached to the cord member attaching member and a signal indicating a direction in which the tensional force is applied, wherein the control unit controls the actuator based on the signal according to the tensional force and based on the signal indicating a direction in which the tensional force is applied, so that the tensional force acting on the base body through the cord member attaching member balances out a force acting on the cord member due to a tilting of the base body.

4. The inverted pendulum moving body according to claim 3 further comprising:

a position calculator computing a position of an another moving body based on a signal according to a tensional force and based on a direction in which the tensional force is applied; and a memory unit storing a plurality of different positions computed by the position calculator as the trajectory, wherein the control unit controls the actuator so that the moving behavior unit moves along the trajectory stored in the memory unit.

5. The inverted pendulum moving body according to claim 2 further comprising:

a position calculator computing a position of an another moving body based on a signal according to a tensional force and based on a direction in which the tensional force is applied; and a memory unit storing a plurality of different positions computed by the position calculator as the trajectory, wherein the control unit controls the actuator so that the moving behavior unit moves along the trajectory stored in the memory unit.

6. The inverted pendulum moving body according to claim 2, wherein the control section controls the actuator based on the amount of deviation from the trajectory.

7. The inverted pendulum moving body according to claim 1, further comprising:

a cord member attaching member; and a tensional force sensor outputting a signal according to a tensional force applied to the cord member attaching member and a signal indicating a direction in which the tensional force is applied, wherein the control unit controls the actuator based on the signal according to the tensional force and based on the signal indicating a direction in which the tensional force is applied, so that the tensional force acting on the base body through the cord member attaching member balances out a force generated due to a tilting of the base body.

8. The inverted pendulum moving body according to claim 7 further comprising:

a position calculator computing a position of an another moving body based on a signal according to a tensional force and based on a direction in which the tensional force is applied; and a memory unit storing a plurality of different positions computed by the position calculator as the trajectory, wherein the control unit controls the actuator so that the moving behavior unit moves along the trajectory stored in the memory unit.

9. The inverted pendulum moving body according to claim 1 further comprising:

a position calculator computing a position of an another moving body based on a signal according to a tensional force and based on a direction in which the tensional force is applied; and a memory unit storing a plurality of different positions computed by the position calculator as the trajectory, wherein the control unit controls the actuator so that the moving behavior unit moves along the trajectory stored in the memory unit.

* * * * *